(12) United States Patent
Sakurai et al.

(10) Patent No.: US 11,601,685 B2
(45) Date of Patent: *Mar. 7, 2023

(54) IMAGE PROCESSING DEVICE AND METHOD USING ADAPTIVE OFFSET FILTER IN UNITS OF LARGEST CODING UNIT

(71) Applicant: Sony Corporation, Tokyo (JP)

(72) Inventors: Hironari Sakurai, Tokyo (JP); Ohji Nakagami, Tokyo (JP); Takuya Kitamura, Tokyo (JP); Yoichi Yagasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,473

(22) Filed: Nov. 7, 2019

(65) Prior Publication Data

US 2020/0077121 A1 Mar. 5, 2020

Related U.S. Application Data

(63) Continuation of application No. 14/362,527, filed as application No. PCT/JP2012/083285 on Dec. 21, 2012, now Pat. No. 10,567,805.

(30) Foreign Application Priority Data

Jan. 6, 2012 (JP) ................................ 2012-001559
Jun. 29, 2012 (JP) ................................ 2012-146416

(51) Int. Cl.
*H04N 19/82* (2014.01)
*H04N 19/176* (2014.01)
(Continued)

(52) U.S. Cl.
CPC ........... *H04N 19/82* (2014.11); *H04N 19/176* (2014.11); *H04N 19/44* (2014.11); *H04N 19/46* (2014.11);
(Continued)

(58) Field of Classification Search
None
See application file for complete search history.

(56) References Cited

U.S. PATENT DOCUMENTS

2004/0076237 A1 * 4/2004 Kadono ............... H04N 19/625
375/240.16
2010/0177822 A1 7/2010 Karczewicz et al.
(Continued)

FOREIGN PATENT DOCUMENTS

| JP | 2015024180 A | 2/2015 |
|---|---|---|
| JP | 6282237 B2 | 2/2018 |
| WO | 2011/152518 A1 | 12/2011 |

OTHER PUBLICATIONS

Extended European Search Report dated Dec. 12, 2019 in European Patent Application No. 19190256.8, 9 pages.
(Continued)

*Primary Examiner* — Mohammed Jebari
(74) *Attorney, Agent, or Firm* — Xsensus LLP

(57) ABSTRACT

Aspects of the present disclosure provide an image processing device that includes circuitry configured to perform a decoding process on an encoded stream for generating an image. The encoded stream is arranged into largest coding units (LCUs), and filtering parameters applicable to each LCU are provided at a beginning portion of the corresponding LCU. The circuitry is further configured to perform adaptive offset filtering on portions of the image that correspond to the LCUs using the filtering parameters set at the beginning portions of the LCUs, respectively.

18 Claims, 32 Drawing Sheets

(51) Int. Cl.

|            |           |
|------------|-----------|
| *H04N 19/44*  | (2014.01) |
| *H04N 19/46*  | (2014.01) |
| *H04N 19/60*  | (2014.01) |
| *H04N 19/96*  | (2014.01) |
| *H04N 19/86*  | (2014.01) |
| *H04N 19/117* | (2014.01) |
| *H04N 19/70*  | (2014.01) |
| *H04N 19/174* | (2014.01) |
| *H04N 19/577* | (2014.01) |

(52) U.S. Cl.
CPC ........... *H04N 19/86* (2014.11); *H04N 19/117* (2014.11); *H04N 19/174* (2014.11); *H04N 19/577* (2014.11); *H04N 19/60* (2014.11); *H04N 19/70* (2014.11); *H04N 19/96* (2014.11)

(56) References Cited

U.S. PATENT DOCUMENTS

| | | | |
|---|---|---|---|
| 2011/0305274 A1 | 12/2011 | Fu et al. | |
| 2012/0051438 A1 | 3/2012 | Chong et al. | |
| 2012/0082242 A1* | 4/2012 | Narroschke | H04N 19/86 375/E7.193 |
| 2012/0134425 A1* | 5/2012 | Kossentini | H04N 19/463 375/E7.027 |
| 2012/0177103 A1 | 7/2012 | Fu et al. | |
| 2012/0207227 A1 | 8/2012 | Tsai et al. | |
| 2012/0287988 A1 | 11/2012 | Chong et al. | |
| 2012/0294353 A1 | 11/2012 | Fu et al. | |
| 2013/0022104 A1* | 1/2013 | Chen | H04N 19/61 375/240.02 |
| 2013/0044809 A1 | 2/2013 | Chong et al. | |
| 2013/0051454 A1* | 2/2013 | Sze | H04N 19/70 375/240.02 |
| 2013/0051455 A1 | 2/2013 | Sze et al. | |
| 2013/0114701 A1* | 5/2013 | Lim | H04N 19/157 375/240.03 |
| 2013/0136167 A1* | 5/2013 | Chong | H04N 19/61 375/240.02 |
| 2013/0142262 A1 | 6/2013 | Ye et al. | |
| 2013/0259118 A1 | 10/2013 | Fu et al. | |
| 2013/0322523 A1 | 12/2013 | Huang et al. | |
| 2014/0241417 A1 | 8/2014 | Chong et al. | |
| 2014/0269913 A1* | 9/2014 | Lee | H04N 19/86 375/240.12 |
| 2014/0369420 A1 | 12/2014 | Alshina et al. | |
| 2015/0071356 A1 | 3/2015 | Kim et al. | |
| 2015/0326886 A1* | 11/2015 | Chen | H04N 19/107 375/240.02 |

OTHER PUBLICATIONS

Ching-Yeh Chen et al., "Non-CE8: One-stage non-deblocking loop filtering", Joint Collaborative Team on Video Coding (JCT-VC) of ITU-T SG16 WP3 and ISO/IEC JTC1/SC29/WG11, 7th Meeting: Geneva, CH, Nov. 21-30, 2011, 4 pages.
Japanese Office Action dated Apr. 3, 2018 in Application No. 2017-036279 (with English translation), 5 pages.
Ching-Yeh Chen et al., "Non-CE8: Sample Adaptive Offset with LCU-based Syntax", Joint Collaborative Team on Video Coding (JCT-VC) of ITU-T SG16 WP3 and ISO/IEC JTC1/SC29/WG11, 7th Meeting: Geneva, CH, Nov. 21-30, 2011, 6 pages.
Chih-Ming Fu et al., "Sample Adaptive Offset with LCU-based Syntax", Joint Collaborative Team on Video Coding (JCT-VC) of ITU-T SG16 WP3 and ISO/IEC JTC1/SC29/WG11, 6th Meeting: Torino, IT, Jul. 14-22, 2011, 8 pages.
Combined Chinese Office Action and Search Report dated Nov. 16, 2017 in corresponding Patent Application No. 201410830735.7 (with English Translation), 23 pages.
Chinese Office Action notification dated Jun. 20, 2017 issued in Application No. 201280064900.1 with English translation, 16 pages.
Japanese Office Action dated May 30, 2017 issued in Application No. 2013-552409, 2 pages.
Japanese Office Action dated May 30, 2017 issued in Application No. 2015-024180, 2 pages.
Ken McCann et al., HM3: High Efficiency Video Coding (HEVC) Test Model 3 Encoder Description. Joint Collaborative Team on Video Coding (JCT-VC) of ITU-T SG16 WP3 and 1SO/IEC JTC1/SC29/WG11, 5th Meeting: Geneva, CH, Mar. 16-23, 2011, 4 pages.
Chinese Office Action dated Mar. 27, 2017 in Chinese Application No. 201410830735.7 with English translation, 20 pages.
Office Action dated Dec. 1, 2016 in Japanese Patent Application No. 2013-552409.
Office Action dated Dec. 6, 2016 in Japanese Patent Application No. 2015-024180 (with English translation).
Combined Chinese Office Action and Search Report dated Dec. 13, 2016 in Patent Application No. 201280064900.1 (with English translation).
International Search Report dated Mar. 12, 2013, in PCT/JP2012/083285.
Benjamin Bross, et al., "WO: Working Draft of High-Efficiency Video Coding", Joint Collaborative Team on Video Coding (JTC-VC) of ITU-T SG16 WP3 and ISO/IEC JTC1/SC29/WG11 JCTVC-03, Jul. 2011, 219 pages.
A. Fuldseth., "Improved ALF with low latency and reduced complexity", Cisco Systems, Joint Collaborative Team on Video Coding (JCT-VC) of ITU-T SG16 WP3 and ISO/IEC JTC1/SC29/WG11,7th Meeting: Geneva, CH, 21-30, JCTVCG499,Nov. 2011, 7 pages.
Office Action dated Oct. 13, 2015 in Japanese Patent Application No. 2015-024180.
Extended European Search Report dated Nov. 13, 2015 in Patent Application No. 12864029.9.
Chih-Wei Hsu, et al., "Non-CE1: Decoupling SAO on/off from SAO type with neighbor-based contexts" Joint Collaborative Team on Video Coding (JCT-VC) of ITU-T SG16 WP3 and ISO/IEC JTC1/SC29NVG11, XP030111962, Apr./May 2012, 6 Pages.
Woo-Shik Kim, et al., "AhG6: SAO Complexity Reduction with SAO LCU Flag Coding" Joint Collaborative Team on Video Coding (JCT-VG) of ITU-T SG16 WP3 and ISO/IEC JTC1/SC29NVG11, XP030112502, Jul. 11-20, 2012, 12 Pages.
Office Action dated Jun. 7, 2016 in Japanese Patent Application No. 2015-024180 (with English language translation).
U.S. Appl. No. 14/402,188, filed Nov. 19, 2014 (Related case).
U.S. Appl. No. 14/402,200, filed Nov. 19, 2014 (Related case).
Office Action dated Aug. 4, 2020, issued in corresponding Japanese Patent Application No. 2019-150916, 4 pages.
Chih-Ming Fu et al., "Sample Adaptive Offset with LCU-based Syntax", Joint Collaborative Team on Video Coding (JCT-VC), Jul. 15, 2011, [JCTVC-F056] (version 5).

\* cited by examiner

FIG. 6

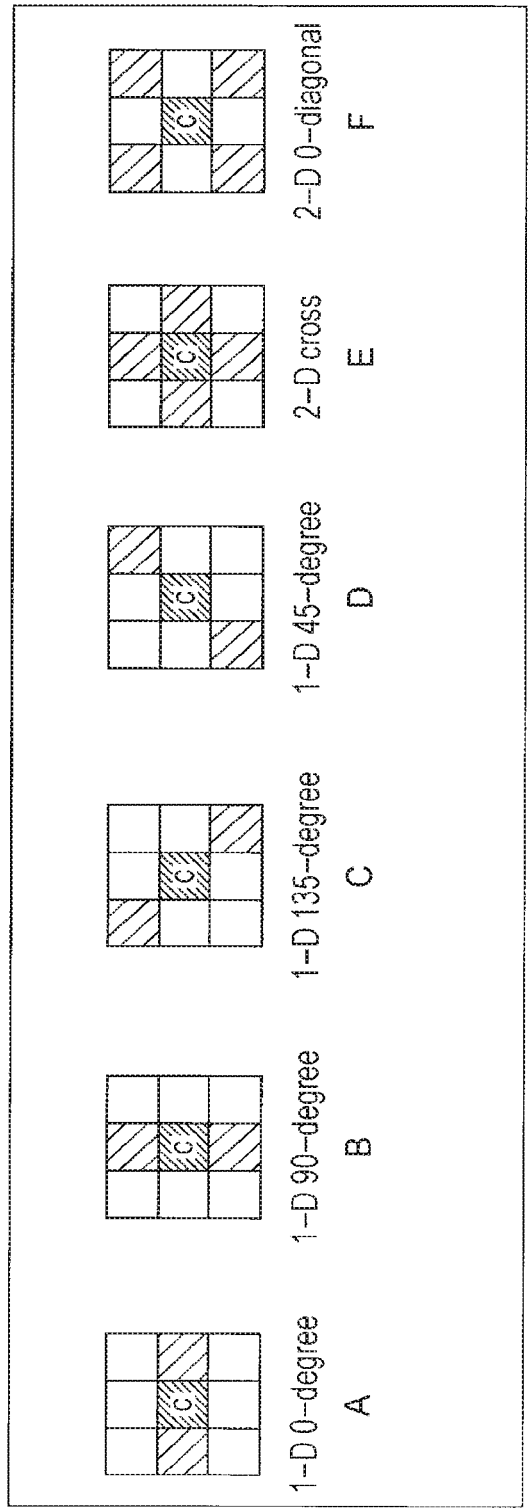

FIG. 8

| Category | Condition |
|---|---|
| 1 | C < 2 neighboring pixels |
| 2 | C < 1 neighbor && c == 1 neighbor |
| 3 | C > 1 neighbor && c == 1 neighbor |
| 4 | C > 2 neighbors |
| 0 | None of the above |

A Classification rule for 1-D patterns

| Category | Condition |
|---|---|
| 1 | C < 4 neighbors |
| 2 | C < 3 neighbors && C = 4th neighbor |
| 3 | C < 3 neighbors && C > 4th neighbor |
| 4 | C > 3 neighbors && C < 4th neighbor |
| 5 | C > 3 neighbors && C = 4th neighbor |
| 6 | C > 4 neighbors |
| 0 | None of the above |

B Classification rule for 2-D patterns

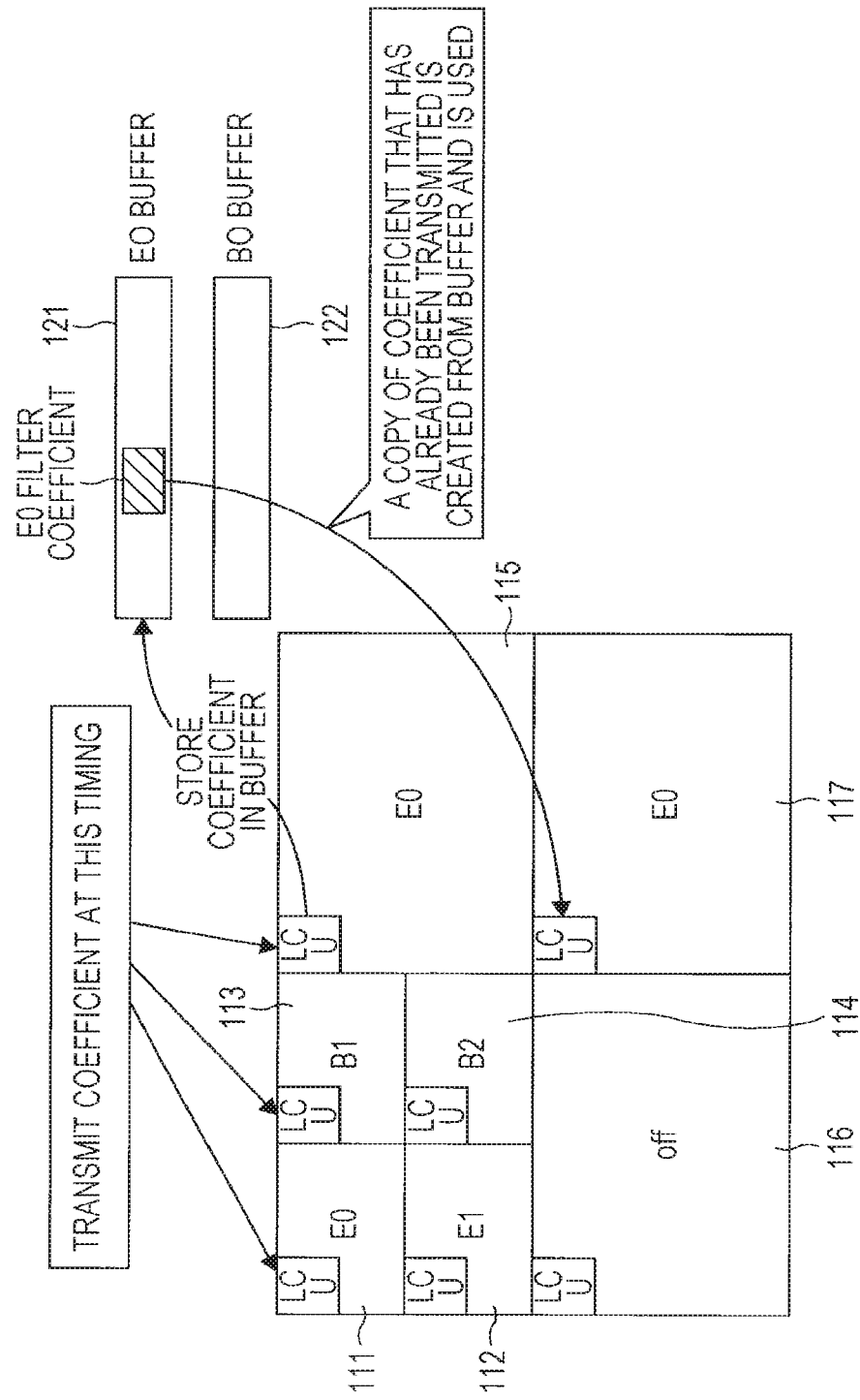

FIG. 11

| 1 | sao_param(){ | Descriptor |
|---|---|---|
| 2 |     sample_adaptive_offset_flag | u(1) |
| 3 |     sao_flag_cb | u(1) |
| 4 |     sao_flag_cr | u(1) |
| 5 | } | |
| 6 | | |
| 7 | SAO_information(){ | Descriptor |
| 8 |     if( sample_adaptive_offset_flag ){ | |
| 9 |         sao_offset_param( 0 ) | |
| 10 |         if( sao_flag_cb ) | |
| 11 |             sao_offset_param( 1 ) | |
| 12 |         if( sao_flag_cr ) | |
| 13 |             sao_offset_param( 2 ) | |
| 14 |     } | |
| 15 | } | |
| 16 | | |
| 17 | sao_offset_param( cIdx ){ | Descriptor |
| 18 |     sao_type_idx[ cIdx ] | ue(v) \| ae(v) |
| 19 |     if( sao_type_idx != 0 ){ | |
| 20 |         copy_flag[ cIdx ] | u(1) \| ae(v) |
| 21 |         if( copy_flag ){ | |
| 22 |             copy_idx[ cIdx ] | u(n) \| ae(v) |
| 23 |         }else{ | |
| 24 |             for( i=0; i<NumSaoClass[ sao_type_idx ]; i++) | |
| 25 |                 sao_offset[ cIdx ][ i ] | se(v) \| ae(v) |
| 26 |         } | |
| 27 |     } | |
| 28 | } | |
| 29 | | |

FIG. 12

| sao_type_idx | NumSaoCategory | Edge or band type |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | Central band |
| 6 | 16 | Side band |

Edge Offset (EO): rows 1–4
Band Offset (BO): rows 5–6

IMAGE PROCESSING DEVICE AND METHOD USING ADAPTIVE OFFSET FILTER IN UNITS OF LARGEST CODING UNIT

CROSS-REFERENCE TO RELATED APPLICATIONS

This application is a continuation of U.S. application Ser. No. 14/362,527, filed Jun. 3, 2014, which is based on PCT filing PCT/JP2012/083285, filed on Dec. 21, 2012, and claims priority to JP Application Nos. 2012-001559, filed on Jan. 6, 2012, and 2012-146416, filed Jun. 29, 2012, the entire contents of each are incorporated herein by reference.

TECHNICAL FIELD

The present disclosure relates to image processing devices and methods, and more specifically to an image processing device and method that enable improvement in processing efficiency in encoding or decoding.

BACKGROUND ART

In recent years, devices which handle image information in the digital form and, in this case, utilize redundancy specific to the image information to achieve compression and coding of images by using a coding scheme for compression based on an orthogonal transform such as a discrete cosine transform and motion compensation in order to efficiently transmit and accumulate information are becoming widespread. Examples of this coding scheme include MPEG (Moving Picture Experts Group) and H.264 and MPEG-4 Part 10 (Advanced Video Coding, hereinafter referred to as H.264/AVC).

In addition, standardization of a coding scheme called HEVC (High Efficiency Video Coding) is currently being undertaken by JCTVC (Joint Collaboration Team—Video Coding), which is a joint standardization organization of the ITU-T and the ISO/IEC, for achieving more improved coding efficiency than H.264/AVC (see, for example, NPL 1).

In the present working draft of HEVC, a deblocking filter, an adaptive loop filter, and an adaptive offset filter (Sample Adaptive Offset: SAO) are employed as in-loop filters.

In HEVC, parameters of the adaptive loop filter are collectively sent to the decoder side in groups of one frame. In contrast, NPL 2 has proposed that an adaptive loop filter process is performed in units of a largest coding unit, or LCU.

CITATION LIST

Non Patent Literature

NPL 1: Thomas Wiegand, Woo-Jin Han, Benjamin Bross, Jens-Rainer Ohm, Gary J. Sullivan, "Working Draft 4 of High-Efficiency Video Coding", JCTVC-F803, Joint Collaborative Team on Video Coding (JCT-VC) of ITU-T SG16 WP3 and ISO/IEC JTC1/SC29/WG11 6th Meeting: Torino, IT, 14-22 Jul. 2011

NPL 2: A. Fuldseth, Cisco Systems, G. bjontegaard, Cisco Systems, "Improved ALF with low latency and reduced complexity", JCTVC-G499, Joint Collaborative Team on Video Coding (JCT-VC) of ITU-T SG16 WP3 and ISO/IEC JTC1/SC29/WG11 7th Meeting: Geneva, CH, 21-30 Nov. 2011

SUMMARY OF INVENTION

Technical Problem

In HEVC, furthermore, the adaptive offset filter is adapted to regions called quad-tree regions, which are uniquely defined for the adaptive offset filter. In addition, the parameters of the adaptive offset filter are collectively defined in sao_param( ) in groups of one frame.

sao_param( ) is placed before the data (video information) in an encoded stream. On the encoder side, therefore, it is necessary to hold data for one frame in a buffer until the completion of the adaptive offset filter process, the determination of the coefficients of the adaptive offset filter, and the creation of sao_param( ).

The present disclosure has been made in view of such a situation, and enables improvement in processing efficiency in encoding or decoding.

Solution to Problem

An image processing device of a first aspect of the present disclosure includes an acquisition unit that acquires parameters of an adaptive offset filter in units of a largest coding unit from an encoded stream in which the parameters of the adaptive offset filter are set using the largest coding unit as a unit of transmission; a decoding unit that performs a decoding process on the encoded stream and that generates an image; and an adaptive offset filter unit that performs adaptive offset filtering on the image generated by the decoding unit, in units of a largest coding unit using the parameters acquired by the acquisition unit.

The parameters of the adaptive offset filter can include a type of the adaptive offset filter and an offset value.

The image processing device can further include a deblocking filter unit that performs deblocking filtering on the image generated by the decoding unit, and the adaptive offset filter unit can perform adaptive offset filtering on an image on which the deblocking filter unit has performed deblocking filtering.

The acquisition unit can acquire, from the encoded stream, identification data identifying a parameter of a previous largest coding unit on which adaptive offset filtering has been performed before a current largest coding unit as being the same as a parameter of the current largest coding unit, and the adaptive offset filter unit can perform adaptive offset filtering on the image generated by the decoding unit, in units of a largest coding unit using the identification data acquired by the acquisition unit.

The acquisition unit can acquire, from the encoded stream, identification data identifying whether or not to use a parameter of a previous largest coding unit on which adaptive offset filtering has been performed before a current largest coding unit, and the adaptive offset filter unit can perform adaptive offset filtering on the image generated by the decoding unit, in units of a largest coding unit using the identification data acquired by the acquisition unit.

The acquisition unit can acquire, from the encoded stream, identification data identifying whether or not to use a copy of a parameter of a previous largest coding unit on which adaptive offset filtering has been performed before a current largest coding unit, and the adaptive offset filter unit can perform adaptive offset filtering on the image generated by the decoding unit, in units of a largest coding unit using the identification data acquired by the acquisition unit.

The acquisition unit can acquire, from the encoded stream, identification data specifying a largest coding unit that is identical to a current largest coding unit in terms of a parameter, from within previous largest coding units on which adaptive offset filtering has been performed before the current largest coding unit, and the adaptive offset filter unit can perform adaptive offset filtering on the image generated by the decoding unit, in units of a largest coding unit using the identification data acquired by the acquisition unit.

The parameters of the adaptive offset filter are transmitted at timing of the beginning of a largest coding unit.

The decoding unit can perform a decoding process in units each having a hierarchical structure.

An image processing method of the first aspect of the present disclosure is performed by an image processing device, including acquiring parameters of an adaptive offset filter in units of a largest coding unit from an encoded stream in which the parameters of the adaptive offset filter are set using the largest coding unit as a unit of transmission; performing a decoding process on the encoded stream to generate an image; and performing adaptive offset filtering on the generated image in units of a largest coding unit using the acquired parameters.

An image processing device of a second aspect of the present disclosure includes a setting unit that sets parameters of an adaptive offset filter using a largest coding unit as a unit of transmission; an adaptive offset filter unit that performs adaptive offset filtering on an image which has been subjected to a local decoding process in a case where an image is encoded, in units of a largest coding unit using the parameters set by the setting unit; an encoding unit that performs an encoding process on an image on which the adaptive offset filter unit has performed adaptive offset filtering, and that generates an encoded stream using the image; and a transmission unit that transmits the parameters set by the setting unit and the encoded stream generated by the encoding unit.

The parameters of the adaptive offset filter can include a type of the adaptive offset filter and an offset value.

The image processing device can further include a deblocking filter unit that performs deblocking filtering on a locally decoded image, and the adaptive offset filter unit can perform adaptive offset filtering on an image on which the deblocking filter unit has performed deblocking filtering.

The setting unit can set identification data identifying a parameter of a previous largest coding unit on which adaptive offset filtering has been performed before a current largest coding unit as being the same as a parameter of the current largest coding unit, and the transmission unit can transmit the identification data set by the setting unit and the encoded stream generated by the encoding unit.

The setting unit can set identification data identifying whether or not to use a parameter of a previous largest coding unit on which adaptive offset filtering has been performed before a current largest coding unit, and the transmission unit can transmit the identification data set by the setting unit and the encoded stream generated by the encoding unit.

The setting unit can set identification data identifying whether or not to use a copy of a parameter of a previous largest coding unit on which adaptive offset filtering has been performed before a current largest coding unit, and the transmission unit can transmit the identification data set by the setting unit and the encoded stream generated by the encoding unit.

The setting unit can set identification data specifying a largest coding unit that is identical to a current largest coding unit in terms of a parameter, from within previous largest coding units on which adaptive offset filtering has been performed before the current largest coding unit, and the transmission unit can transmit the identification data set by the setting unit and the encoded stream generated by the encoding unit.

The transmission unit can transmit the parameters of the adaptive offset filter set by the setting unit at timing of the beginning of a largest coding unit.

The encoding unit can perform an encoding process in units each having a hierarchical structure.

An image processing method of the second aspect of the present disclosure is performed by an image processing device, including setting parameters of an adaptive offset filter using a largest coding unit as a unit of transmission; performing adaptive offset filtering on an image which has been subjected to a local decoding process in a case where an image is encoded, in units of a largest coding unit using the set parameters; performing an encoding process on an image on which adaptive offset filtering has been performed, to generate an encoded stream using the image; and transmitting the set parameters and the generated encoded stream.

In the first aspect of the present disclosure, parameters of an adaptive offset filter are acquired in units of a largest coding unit from an encoded stream in which the parameters of the adaptive offset filter are set using the largest coding unit as a unit of transmission; and a decoding process is performed on the encoded stream to generate an image. Then, adaptive offset filtering is performed on the generated image in units of a largest coding unit using the acquired parameters.

In the second aspect of the present disclosure, parameters of an adaptive offset filter are set using a largest coding unit as a unit of transmission; and adaptive offset filtering is performed on an image which has been subjected to a local decoding process in a case where an image is encoded, in units of a largest coding unit using the set parameters. Then, an encoding process is performed on an image on which adaptive offset filtering has been performed, to generate an encoded stream using the image; and the set parameters and the generated encoded stream are transmitted.

Note that each of the image processing devices described above may be an independent device or an internal block included in a single image encoding device or image decoding device.

According to the first aspect of the present disclosure, it is possible to decode an image. In particular, it is possible to improve processing efficiency.

According to the second aspect of the present disclosure, it is possible to encode an image. In particular, it is possible to improve processing efficiency.

BRIEF DESCRIPTION OF DRAWINGS

FIG. 6 is a diagram depicting band offset.

FIG. 7 is a diagram depicting edge offset.

FIG. 8 is a diagram illustrating classification rules for edge offset.

FIG. 9 is a diagram depicting an overview of the present technology.

FIG. 11 is a diagram illustrating an example of the syntax of sao_param( ).

FIG. 12 is a diagram depicting sao_type_idx.

DESCRIPTION OF EMBODIMENTS

Modes for carrying out the present disclosure (hereinafter referred to as embodiments) will be described hereinafter. Note that the description will be given in the following order.
1. Overview of devices and operations
2. Explanation of related art techniques
3. First embodiment (image processing device)
4. Second embodiment (multi-view image encoding/multi-view image decoding device)
5. Third embodiment (layered image encoding/layered image decoding device)
6. Fourth embodiment (computer)
7. Exemplary applications
8. Exemplary applications of scalable coding 1. Overview of Devices and Operations

[Example Configuration of Image Encoding Device]

Figure 1:
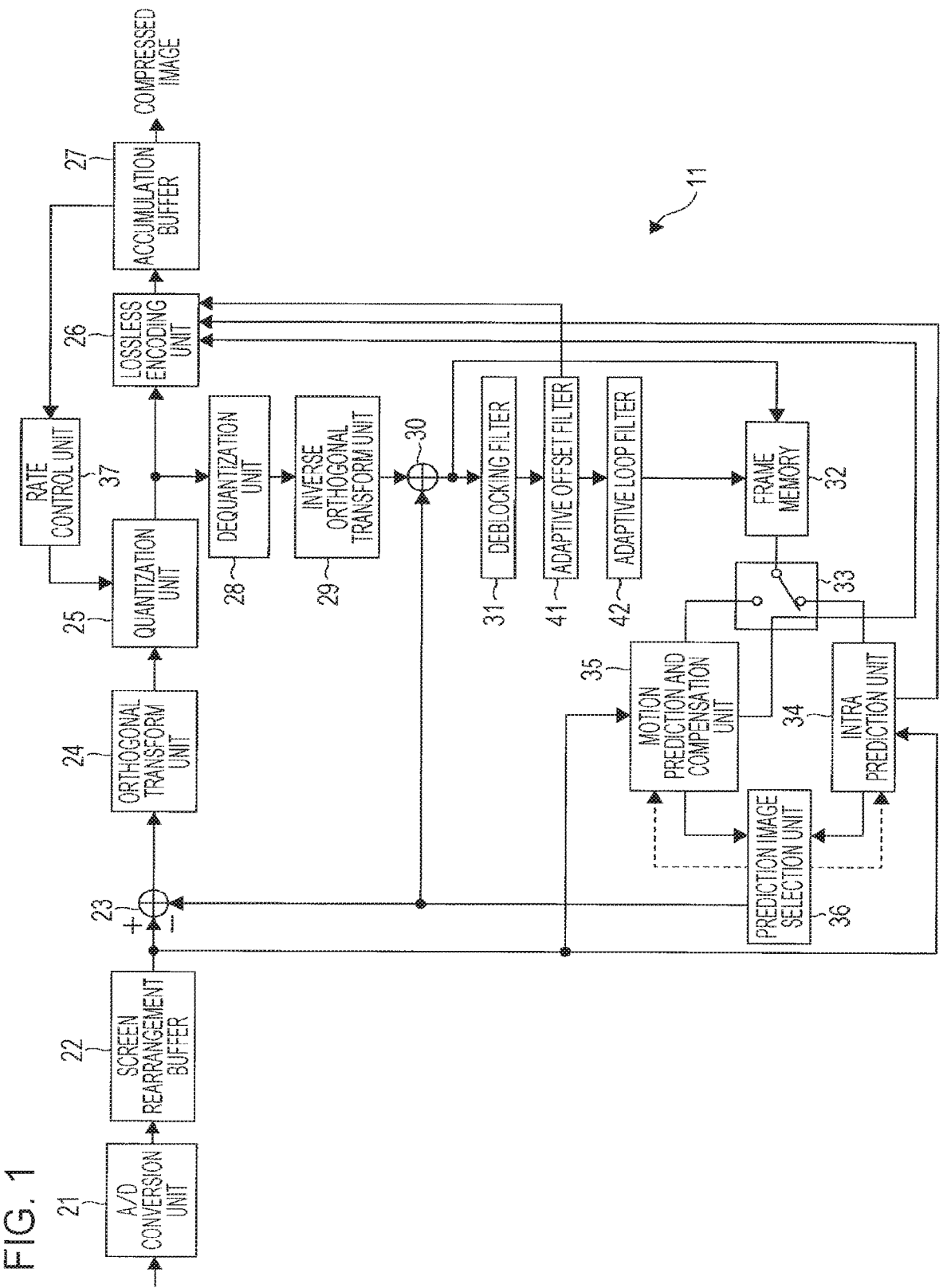
FIG. 1 is a block diagram illustrating a main example configuration of an image encoding device.

FIG. 1 illustrates a configuration of an embodiment of an image encoding device serving as an image processing device to which the present disclosure is applied.

An image encoding device 11 illustrated in FIG. 1 encodes image data using a prediction process. Examples of a coding scheme, as used here, include the HEVC (High Efficiency Video Coding) scheme. In the HEVC scheme, a coding unit CU, a largest coding unit LCU, a smallest coding unit SCU, a prediction unit PU, and a transform unit TU are specified, and encoding/decoding is performed in units each having a hierarchical structure.

In the example of FIG. 1, the image encoding device 11 includes an A/D (Analog/Digital) conversion unit 21, a screen rearrangement buffer 22, a computation unit 23, an orthogonal transform unit 24, a quantization unit 25, a lossless encoding unit 26, and an accumulation buffer 27. The image encoding device 11 further includes a dequantization unit 28, an inverse orthogonal transform unit 29, a computation unit 30, a deblocking filter 31, a frame memory 32, a selection unit 33, an intra prediction unit 34, a motion prediction and compensation unit 35, a prediction image selection unit 36, and a rate control unit 37.

The image encoding device 11 further includes an adaptive offset filter 41 and an adaptive loop filter 42 between the deblocking filter 31 and the frame memory 32.

The A/D conversion unit 21 performs A/D conversion on input image data, and outputs the resulting image data to the screen rearrangement buffer 22 for storage.

The screen rearrangement buffer 22 rearranges a stored image having frames arranged in display order into an image having frames arranged in order for coding in accordance with a GOP (Group Of Picture) structure. The screen rearrangement buffer 22 supplies an image in which the frames have been reordered to the computation unit 23. The screen rearrangement buffer 22 also supplies the image in which the frames have been reordered to the intra prediction unit 34 and the motion prediction and compensation unit 35.

The computation unit 23 subtracts a prediction image to be supplied from the intra prediction unit 34 or the motion prediction and compensation unit 35 through the prediction image selection unit 36 from the image read from the screen rearrangement buffer 22, and outputs difference information on the difference therebetween to the orthogonal transform unit 24.

For example, in the case of an image to be intra-coded, the computation unit 23 subtracts a prediction image supplied from the intra prediction unit 34 from the image read from the screen rearrangement buffer 22. Further, for example, in the case of an image to be inter-coded, the computation unit 23 subtracts a prediction image supplied from the motion prediction and compensation unit 35 from the image read from the screen rearrangement buffer 22.

The orthogonal transform unit 24 performs an orthogonal transform, such as a discrete cosine transform or a Karhunen-Loève transform, on the difference information supplied from the computation unit 23, and supplies obtained transform coefficients to the quantization unit 25.

The quantization unit 25 quantizes the transform coefficients output from the orthogonal transform unit 24. The quantization unit 25 supplies the quantized transform coefficients to the lossless encoding unit 26.

The lossless encoding unit 26 performs lossless encoding, such as variable-length coding or arithmetic coding, on the quantized transform coefficients.

The lossless encoding unit 26 acquires parameters such as information indicating an intra prediction mode from the intra prediction unit 34, and acquires parameters such as information indicating an inter prediction mode and motion vector information from the motion prediction and compensation unit 35.

The lossless encoding unit 26 encodes the quantized transform coefficients and the acquired respective parameters (syntax elements), and organizes (multiplexes) the encoded quantized transform coefficients and parameters into part of header information of the encoded data. The lossless encoding unit 26 supplies the encoded data obtained by encoding to the accumulation buffer 27 for accumulation.

In the lossless encoding unit 26, for example, a lossless encoding process such as variable-length coding or arithmetic coding is performed. Examples of the variable-length encoding include CAVLC (Context-Adaptive Variable Length Coding). Examples of the arithmetic coding include CABAC (Context-Adaptive Binary Arithmetic Coding).

The accumulation buffer 27 temporarily holds the encoded stream (data) supplied from the lossless encoding unit 26, and outputs the encoded stream (data) to an unillustrated downstream device such as a recording device and a transmission path at certain timing as encoded image which has been subjected to encoding. That is, the accumulation buffer 27 also serves as a transmission unit that transmits encoded streams.

Further, the transform coefficients quantized by the quantization unit 25 are also supplied to the dequantization unit 28. The dequantization unit 28 dequantizes the quantized transform coefficients using a method corresponding to the method of quantization performed by the quantization unit: 25. The dequantization unit 28 supplies the obtained transform coefficients to the inverse orthogonal transform unit 29.

The inverse orthogonal transform unit 29 performs an inverse orthogonal transform on the supplied transform coefficients using a method corresponding to the orthogonal transform process performed by the orthogonal transform unit 24. The output subjected to the inverse orthogonal transform (restored difference information) is supplied to the computation unit 30.

The computation unit 30 adds the prediction image supplied from the intra prediction unit 34 or the motion prediction and compensation unit 35 through the prediction image selection unit 36 to the result of the inverse orthogonal transform supplied from the inverse orthogonal transform unit 29, that is, to the restored difference information, to obtain a locally decoded image (decoded image).

For example, if the difference information corresponds to an image to be intra-coded, the computation unit 30 adds the prediction image supplied from the intra prediction unit 34 to the difference information. Further, for example, if the difference information corresponds to an image to be inter-coded, the computation unit 30 adds the prediction image supplied from the motion prediction and compensation unit 35 to the difference information.

The decoded image, which is a result of the addition, is supplied to the deblocking filter 31 and the frame memory 32.

The deblocking filter 31 appropriately performs a deblocking filter process to remove block distortion from the decoded image. The deblocking filter 31 supplies a result of the filter process to the adaptive offset filter 41.

The adaptive offset filter 41 performs an offset filter (SAO: Sample adaptive offset) process on the image filtered by the deblocking filter 31 to mainly remove ringing.

There are nine offset filter types in total: two types of band offset, six types of edge offset, and no offset. The adaptive offset filter 41 determines a kind (type) of offset filter and an offset (value) for each LCU, which is the largest coding unit, and performs a filter process on the image filtered by the deblocking filter 31 using the determined type and offset. In the offset filter 41, the offset described above is the coefficient of the filter. The offset is hereinafter also referred to as the coefficient, as necessary.

Note that, as the details of the adaptive offset filter 41 will be described below with reference to FIG. 13, the adaptive offset filter 41 has a buffer for storing coefficients. If the buffer has stored therein the same coefficient as a coefficient determined for each LCU, the adaptive offset filter 41 supplies a flag indicating the storage of the coefficient, an index indicating the storage position of the coefficient in the buffer, and information indicating the type to the lossless encoding unit 26 to encode them.

On the other hand, if the buffer does not have stored therein the same coefficient as a coefficient determined for each LCU, the adaptive offset filter 41 supplies a flag indicating no storage of the coefficient, the coefficient, and information indicating the type to the lossless encoding unit 26 to encode them.

The adaptive offset filter 41 supplies the image that has been subjected to the filter process to the adaptive loop filter 42.

The adaptive loop filter 42 performs an adaptive loop filter (ALF) process, for example, for each LCU, which is the largest coding unit. In the adaptive loop filter 42, for example, a two-dimensional Wiener filter is used as a filter. As a matter of course, any filter other than a Wiener filter may be used.

The adaptive loop filter 42 performs a filter process on the image filtered by the adaptive offset filter 41 for each LCU using a filter coefficient, and supplies a result of the filter process to the frame memory 32.

Note that, in the image encoding device 11, a filter coefficient is calculated by the adaptive loop filter 42 for each LCU so as to minimize the residue from the original image from the screen rearrangement buffer 12, and is used, which will not be described in detail herein. The calculated filter coefficient is encoded by the lossless encoding unit 26, and is transmitted to an image decoding device 51 of FIG. 3 described below. Furthermore, while an example in which processing is performed for each LUC is described herein, the processing unit of the adaptive loop filter 42 is not limited thereto.

The frame memory 32 outputs a reference image accumulated therein to the intra prediction unit 34 or the motion prediction and compensation unit 35 through the selection unit 33 at certain timing.

For example, in the case of an image to be intra-coded, the frame memory 32 supplies a reference image to the intra prediction unit 34 through the selection unit 33. Further, for example, in a case where inter coding is to be performed, the frame memory 32 supplies a reference image to the motion prediction and compensation unit 35 through the selection unit 33.

If the reference image supplied from the frame memory 32 is an image for intra coding, the selection unit 33 supplies the reference image to the intra prediction unit 34. Further, if a reference image supplied from the frame memory 32 is an image for inter coding, the selection unit 33 supplies the reference image to the motion prediction and compensation unit 35.

The intra prediction unit 34 performs intra prediction (intra-screen prediction) to generate a prediction image using pixel values in a screen. The intra prediction unit 34 performs intra prediction using a plurality of modes (intra prediction modes).

The intra prediction unit 34 generates a prediction image in all the intra prediction modes, evaluates each prediction image, and selects an optimum mode. Upon selection of an optimum intra prediction mode, the intra prediction unit 34 supplies the prediction image generated in the optimum mode to the computation unit 23 and the computation unit 30 through the prediction image selection unit 36.

In addition, as described above, the intra prediction unit 34 supplies parameters, such as intra-prediction mode information indicating the intra prediction mode that has been adopted, to the lossless encoding unit 26, as necessary.

The motion prediction and compensation unit 35 performs motion prediction on an image to be inter-coded, using the input image supplied from the screen rearrangement buffer 22 and the reference image supplied from the frame memory 32 through the selection unit 33. The motion prediction and compensation unit 35 further performs a motion compensation process in accordance with motion vectors detected through motion prediction, and generates a prediction image (inter prediction image information).

The motion prediction and compensation unit 35 performs an inter prediction process for all the candidate inter prediction modes, and generates a prediction image. The motion prediction and compensation unit 35 supplies the generated prediction image to the computation unit 23 and the computation unit 30 through the prediction image selection unit 36.

The motion prediction and compensation unit 35 further supplies parameters, such as the inter-prediction mode information indicating the inter prediction mode that has been adopted, and motion vector information indicating the calculated motion vectors, to the lossless encoding unit 26.

In the case of an image to be intra-coded, the prediction image selection unit 36 supplies the output of the intra prediction unit 34 to the computation unit 23 and the computation unit 30. In the case of an image to be inter-coded, the prediction image selection unit 36 supplies the output of the motion prediction and compensation unit 35 to the computation unit 23 and the computation unit 30.

The rate control unit 37 controls the rate of the quantization operation of the quantization unit 25 on the basis of the compressed image accumulated in the accumulation buffer 27 so that overflow or underflow will not occur.

[Operation of Image Encoding Device]

The flow of the encoding process executed by the image encoding device 11 as described above will be described with reference to FIG. 2.

In step S11, the A/D conversion unit 21 performs A/D conversion on an input image. In step S12, the screen rearrangement buffer 22 stores the image subjected to A/D conversion, and rearranges pictures in display order into coding order.

If the image to be processed supplied from the screen rearrangement buffer 22 is an image of a block to be subjected to intra-processing, the decoded image to be referenced is read from the frame memory 32, and is supplied to the intra prediction unit 34 through the selection unit 33.

In step S13, based on these images, the intra prediction unit 34 performs intra prediction on pixels in the processing target block in all the candidate intra prediction modes. Note that the decoded pixel to be referenced may be a pixel that is not subjected to filtering by the deblocking filter 31.

Through the process described above, intra prediction is performed in all the candidate intra prediction modes, and cost functions are calculated for all the candidate intra prediction modes. Then, an optimum intra-prediction mode is selected on the basis of the calculated cost functions, and a prediction image generated through intra prediction in the optimum intra-prediction mode and its cost function are supplied to the prediction image selection unit 36.

If the image to be processed supplied from the screen rearrangement buffer 22 is an image to be subjected to inter-processing, an image to be referenced is read from the frame memory 32, and is supplied to the motion prediction and compensation unit 35 through the selection unit 33. In step S14, based on these images, the motion prediction and compensation unit 35 performs a motion prediction and compensation process.

Through the process described above, a motion prediction process is performed in all the candidate inter prediction modes, and cost functions are calculated for all the candidate inter prediction modes. An optimum inter-prediction mode is determined on the basis of the calculated cost functions. Then, a prediction image generated in the optimum inter-prediction mode and its cost function are supplied to the prediction image selection unit 36.

In step S15, the prediction image selection unit 36 determines one of the optimum intra-prediction mode and the optimum inter-prediction mode as an optimum prediction mode on the basis of the respective cost functions output from the intra prediction unit 34 and the motion prediction and compensation unit 35. Then, the prediction image selection unit 36 selects a prediction image of the determined optimum prediction mode, and supplies the selected prediction image to the computation units 23 and 30. This prediction image is used for computation in steps S16 and S21 described below.

Note that selection information on this prediction image is supplied to the intra prediction unit 34 or the motion prediction and compensation unit 35. If a prediction image of the optimum intra-prediction mode is selected, the intra prediction unit 34 supplies information indicating the optimum intra-prediction mode (i.e., parameters related to intra prediction) to the lossless encoding unit 26.

If a prediction image of the optimum inter-prediction mode is selected, the motion prediction and compensation unit 35 outputs information indicating the optimum inter-prediction mode and information corresponding to the optimum inter-prediction mode (i.e., parameters related to motion prediction) to the lossless encoding unit 26. Examples of the information corresponding to the optimum inter-prediction mode include motion vector information and reference frame information.

In step S16, the computation unit 23 computes a difference between the image subjected to rearrangement in step S12 and the prediction image selected in step S15. The prediction image is supplied to the computation unit 23 through the prediction image selection unit 36 from the motion prediction and compensation unit 35 for inter prediction or from the intra prediction unit 34 for intra prediction.

The difference data has a smaller amount of data than the original image data. Accordingly, the amount of data can be reduced compared to that for an image that is encoded as it is.

In step S17, the orthogonal transform unit 24 performs an orthogonal transform on the difference information supplied from the computation unit 23. Specifically, an orthogonal transform such as a discrete cosine transform or a Karhunen-Loève transform is performed, and transform coefficients are output.

In step S18, the quantization unit 25 quantizes the transform coefficients. In this quantization, as described with reference to the processing of step S28 described below, the rate is controlled.

The difference information quantized in the way described above is locally decoded in the following way: In step S19, the dequantization unit 28 dequantizes the transform coefficients quantized by the quantization unit 25, using the characteristics corresponding to the characteristics of the quantization unit 25. In step S20, the inverse orthogonal transform unit 29 performs an inverse orthogonal transform on the transform coefficients dequantized by the dequantization unit 28 using the characteristics corresponding to the characteristics of the orthogonal transform unit 24.

In step S21, the computation unit 30 adds a prediction image input through the prediction image selection unit 36 to the locally decoded difference information, and generates a locally decoded image (an image corresponding to the input to the computation unit 23).

In step S22, the deblocking filter 31 performs a deblocking filter process on the image output from the computation unit 30. Accordingly, block distortion is removed. The filtered image obtained from the deblocking filter 31 is output to the adaptive offset filter 41.

In step S23, the adaptive offset filter 41 performs an adaptive offset filter process. Through this process, the type and coefficient of the offset filter are determined for each LCU, which is the largest coding unit, and a filter process is performed on the image filtered by the deblocking filter 31, using the type and coefficient of the offset filter. Note that the details of this adaptive offset filter process will be described below with reference to FIG. 14.

Then, if the buffer has stored therein the same coefficient as a coefficient determined for each LCU, a flag indicating the storage of the coefficient, an index indicating the storage position in the buffer, and information indicating the type are supplied to the lossless encoding unit 26. On the other hand, if the buffer does not have stored therein the same coefficient as a coefficient determined for each LCU, a flag indicating no storage of the coefficient, the coefficient, and information indicating the type are supplied to the lossless encoding unit 26.

These pieces of information supplied to the lossless encoding unit 26 (hereinafter collectively referred to as adaptive offset parameters) are encoded in step S26 described below.

In step S24, the adaptive loop filter 42 performs an adaptive loop filter process on the image filtered by the adaptive offset filter 41. For example, the image filtered by the adaptive offset filter 41 undergoes a filter process for each LCU using a filter coefficient, and a result of the filter process on the image is supplied to the frame memory 32.

As described above, making the processing unit of the adaptive offset filter 41 match the processing unit of the adaptive loop filter 42 can provide efficient processing.

In step S25, the frame memory 32 stores the filtered image. Note that an image that is not filtered by the deblocking filter 31, the adaptive offset filter 41, or the adaptive loop filter 42 is also supplied to the frame memory 32 from the computation unit 30, and is stored in the frame memory 32.

On the other hand, the transform coefficients quantized in step S18, described above, are also supplied to the lossless encoding unit 26. In step S26, the lossless encoding unit 26 encodes the quantized transform coefficients output from the quantization unit 25 and also encodes the supplied parameters. That is, a difference image is losslessly encoded using variable-length coding, arithmetic coding, or the like, and is compressed.

In step S27, the accumulation buffer 27 accumulates the encoded difference image (i.e., an encoded stream) as a compressed image. A compressed image accumulated in the accumulation buffer 27 is read, as necessary, and is transmitted to the decoder side through a transmission path.

In step S28, the rate control unit 37 controls the rate of the quantization operation of the quantization unit 25 on the basis of the compressed image accumulated in the accumulation buffer 27 so that overflow or underflow will not occur.

After the completion of the processing of step S28, the encoding process ends.

[Example Configuration of Image Decoding Device]

Figure 3:
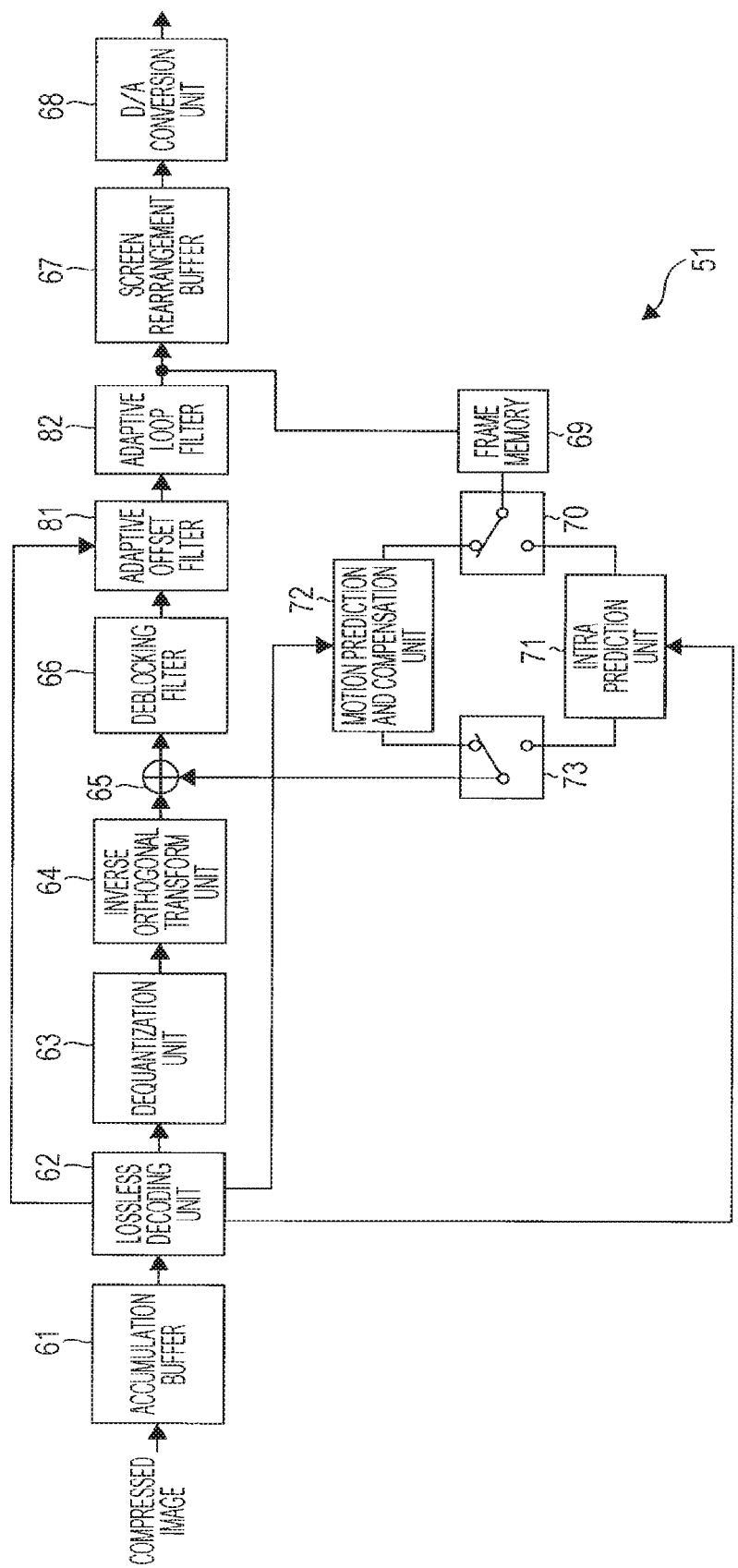
FIG. 3 is a block diagram illustrating a main example configuration of an image decoding device.

FIG. 3 illustrates a configuration of an embodiment of an image decoding device serving as an image processing device to which the present disclosure is applied. The image decoding device 51 illustrated in FIG. 3 is a decoding device corresponding to the image encoding device 11 of FIG. 1.

It is assumed that an encoded stream (data) which has been subjected to encoding by the image encoding device 11 is transmitted to the image decoding device 51 corresponding to the image encoding device 11 through a certain transmission path, and is decoded.

As illustrated in FIG. 3, the image decoding device 51 includes an accumulation buffer 61, a lossless decoding unit 62, a dequantization unit 63, an inverse orthogonal transform unit 64, a computation unit 65, a deblocking filter 66, a screen rearrangement buffer 67, and a D/A conversion unit 68. The image decoding device 51 further includes a frame memory 69, a selection unit 70, an intra prediction unit 71, a motion prediction and compensation unit 72, and a selection unit 73.

The image decoding device 51 further includes an adaptive offset filter 81 and an adaptive loop filter 82 between the deblocking filter 66 and the screen rearrangement buffer 67 and between the deblocking filter 66 and the frame memory 69.

The accumulation buffer 61 is also a receiving unit for receiving transmitted encoded data. The accumulation buffer 61 receives and accumulates transmitted encoded data. The encoded data has been subjected to encoding by the image encoding device 11. The lossless decoding unit 62 decodes encoded data read from the accumulation buffer 61 at certain timing, using a scheme corresponding to the coding scheme of the lossless encoding unit 26 of FIG. 1.

The lossless decoding unit 62 supplies the decoded parameters such as information indicating the intra prediction mode to the intra prediction unit 71, and supplies the parameters such as information indicating the inter prediction mode and motion vector information to the motion prediction and compensation unit 72. The lossless decoding unit 62 further supplies the decoded adaptive offset parameters (such as a flag indicating the presence or absence of a coefficient stored in the buffer, the coefficient, information indicating a type, and an index indicating the storage position of the coefficient in the buffer) to the adaptive offset filter 81.

The dequantization unit 63 dequantizes the coefficient data (quantization coefficients) obtained by the lossless decoding unit 62 through decoding, using a scheme corresponding to the quantization scheme of the quantization unit 25 of FIG. 1. That is, the dequantization unit 63 dequantizes the quantization coefficients using a method similar to that of the dequantization unit 28 of FIG. 1 by using the quantization parameters supplied from the image encoding device 11.

The dequantization unit 63 supplies the dequantized coefficient data, that is, the orthogonal transform coefficients, to the inverse orthogonal transform unit 64. The inverse orthogonal transform unit 64 performs an inverse orthogonal transform on the orthogonal transform coefficients using the scheme corresponding to the orthogonal transform scheme of the orthogonal transform unit 24 of FIG. 1, and obtains decoded residual data corresponding to the residual data that has not been orthogonally transformed in the image encoding device 11.

The decoded residual data obtained by the inverse orthogonal transform is supplied to the computation unit 65. The computation unit 65 is also supplied with a prediction image from the intra prediction unit 71 or the motion prediction and compensation unit 72 through the selection unit 73.

The computation unit 65 adds together the decoded residual data and the prediction image, and obtains decoded image data corresponding to the image data from which the prediction image has not been subtracted by the computation unit 23 of the image encoding device 11. The computation unit 65 supplies the decoded image data to the deblocking filter 66.

The deblocking filter 66 appropriately performs a deblocking filter process to remove block distortion from the decoded image. The deblocking filter 66 supplies a result of the filter process to the adaptive offset filter 81.

The adaptive offset filter 81 performs an offset filter (SAO) process on the image filtered by the deblocking filter 66 to mainly remove ringing.

The adaptive offset filter 81 performs a filter process on the image filtered by the deblocking filter 66 for each LCU, which is the largest coding unit, using the adaptive offset parameters supplied from the lossless decoding unit 62. The adaptive offset filter 81 supplies the image that has been subjected to the filter process to the adaptive loop filter 82.

Note that, as the details of the adaptive offset filter 81 will be described below with reference to FIG. 12 and the following drawings, the adaptive offset filter 81 has a buffer for storing coefficients. If the flag sent from the lossless decoding unit 62 indicates the presence of a coefficient stored in the buffer, the adaptive offset filter 81 reads the coefficient from the buffer by referring to the information indicating the type and the index indicating the storage position of the coefficient in the buffer, and performs a filter process using the read coefficient.

On the other hand, if the flag sent from the lossless decoding unit 62 indicates the absence of a coefficient stored in the buffer, the adaptive offset filter 81 performs a filter process using the coefficient acquired from the lossless decoding unit 62. After that, the adaptive offset filter 81 writes the acquired coefficient to the buffer.

The adaptive loop filter 82 has a basically similar configuration to that of the adaptive loop filter 42 of the image encoding device 11 of FIG. 1, and performs an adaptive loop filter process for each LCU, which is the largest coding unit. The adaptive loop filter 82 performs a filter process on the image filtered by the adaptive offset filter 81 for each LCU using a filter coefficient, and supplies a result of the filter process to the frame memory 69 and the screen rearrangement buffer 67.

Note that, in the image decoding device 51, a filter coefficient, which has been calculated for each LUC and has been encoded by and sent from the adaptive loop filter 42 of the image encoding device 11, is decoded by the lossless decoding unit 62 and is used, which will not be described in detail herein.

The screen rearrangement buffer 67 performs rearrangement on the image. That is, the order of the frames rearranged in coding order by the screen rearrangement buffer 22 of FIG. 1 is changed LO the original display order. The D/A conversion unit 68 performs D/A conversion on the image supplied from the screen rearrangement buffer 67, and outputs the resulting image to a display (not illustrated) for display.

The output of the adaptive loop filter 82 is further supplied to the frame memory 69.

The frame memory 69, the selection unit 70, the intra prediction unit 71, the motion prediction and compensation unit 72, and the selection unit 73 correspond to the frame memory 32, the selection unit 33, the intra prediction unit 34, the motion prediction and compensation unit 35, and the prediction image selection unit 36 of the image encoding device 11, respectively.

The selection unit 70 reads an image to be subjected to inter-processing and an image to be referenced from the frame memory 69, and supplies the read images to the motion prediction and compensation unit 72. Further, the selection unit 70 reads an image to be used for intra prediction from the frame memory 69, and supplies the read image to the intra prediction unit 71.

The intra prediction unit 71 is supplied with information indicating an intra prediction mode and the like, which are obtained by decoding the header information, from the lossless decoding unit 62, as appropriate. The intra prediction unit 71 generates a prediction image, based on this information, from the reference image acquired from the frame memory 69, and supplies the generated prediction image to the selection unit 73.

The motion prediction and compensation unit 72 is supplied with information obtained by decoding the header information (prediction mode information, motion vector information, reference frame information, flag, various parameters, etc.) from the lossless decoding unit 62.

The motion prediction and compensation unit 72 generates a prediction image, based on these pieces of information supplied from the lossless decoding unit 62, from the reference image acquired from the frame memory 69, and supplies the generated prediction image to the selection unit 73.

The selection unit 73 selects the prediction image generated by the motion prediction and compensation unit 72 or the intra prediction unit 71, and supplies the selected prediction image to the computation unit 65.

[Operation of Image Decoding Device]

An example of the flow of the decoding process executed by the image decoding device 51 as described above will be described with reference to FIG. 4.

When a decoding process starts, in step S51, the accumulation buffer 61 receives and accumulates a transmitted encoded stream (data). In step S52, the lossless decoding unit 62 decodes the encoded data supplied from the accumulation buffer 61. I-pictures, P-pictures, and B-pictures, which have been encoded by the lossless encoding unit 26 of FIG. 1, are decoded.

Before the decoding of the pictures, information on parameters such as motion vector information, reference frame information, and prediction mode information (the intra prediction mode or the inter prediction mode) is also decoded.

If the prediction mode information is intra-prediction mode information, the prediction mode information is supplied to the intra prediction unit 71. If the prediction mode information is inter-prediction mode information, the motion vector information and the like corresponding to the prediction mode information are supplied to the motion prediction and compensation unit 72. In addition, the adaptive offset parameters are also decoded and supplied to the adaptive offset filter 81.

In step S53, the intra prediction unit 71 or the motion prediction and compensation unit 72 performs a corresponding prediction image generation process in accordance with the prediction mode information supplied from the lossless decoding unit 62.

Specifically, if intra-prediction mode information is supplied from the lossless decoding unit 62, the intra prediction unit 71 generates an intra prediction image for the intra prediction mode. If inter-prediction mode information is supplied from the lossless decoding unit 62, the motion prediction and compensation unit 72 performs a motion prediction and compensation process of the inter prediction mode, and generates an inter prediction image.

Through the process described above, the prediction image (intra prediction image) generated by the intra prediction unit 71 or the prediction image (inter prediction image) generated by the motion prediction and compensation unit 72 is supplied to the selection unit 73.

In step S54, the selection unit 73 selects a prediction image. That is, the prediction image generated by the intra prediction unit 71 or the prediction image generated by the motion prediction and compensation unit 72 is supplied. Accordingly, the supplied prediction image is selected and is supplied to the computation unit 65, so that the prediction image is added to the output of the inverse orthogonal transform unit 64 in step S57 described below.

In step S52 described above, the transform coefficients decoded by the lossless decoding unit 62 are also supplied to the dequantization unit 63. In step S55, the dequantization unit 63 dequantizes the transform coefficients decoded by the lossless decoding unit 62, using the characteristics corresponding to the characteristics of the quantization unit 25 of FIG. 1.

In step S56, the inverse orthogonal transform unit 29 performs an inverse orthogonal transform on the transform coefficients dequantized by the dequantization unit 28, using the characteristics corresponding to the characteristics of the orthogonal transform unit 24 of FIG. 1. Accordingly, difference information corresponding to the input of the orthogonal transform unit 24 of FIG. 1 (the output of the computation unit 23) is decoded.

In step S57, the computation unit 65 adds the prediction image selected in the processing of step S54 described above and input through the selection unit 73 to the difference information. Accordingly, the original image is decoded.

In step S58, the deblocking filter 66 performs a deblocking filter process on the image output from the computation unit 65. Accordingly, block distortion is removed. The decoded image sent from the deblocking filter 66 is output to the adaptive offset filter 81.

In step S59, the adaptive offset filter 81 performs an adaptive offset filter process. The adaptive offset filter 81 performs a filter process on the image filtered by the deblocking filter 66, using the adaptive offset parameters sent from the lossless decoding unit 62. The adaptive offset filter 81 supplies the image that has been subjected to the filter process to the adaptive loop filter 82.

Note that, as the details of the adaptive offset filter 81 will be described below with reference to FIG. 12 and the following drawings, the adaptive offset filter 81 has a buffer for storing coefficients. If the flag sent from the lossless decoding unit 62 indicates the presence of a coefficient stored in the buffer, the coefficient is read from the buffer with reference to the information indicating the type and the index indicating the storage position of the coefficient in the buffer, and a filter process is performed using the read coefficient.

On the other hand, if the flag sent from the lossless decoding unit 62 indicates the absence of a coefficient stored in the buffer, a filter process is performed using the coefficient acquired from the lossless decoding unit 62. After that, the acquired coefficient is written to the buffer.

In step S60, the adaptive loop filter 82 performs an adaptive loop filter process on the image filtered by the adaptive offset filter 81. The adaptive loop filter 82 performs a filter process on an input image for each LCU, which is the largest coding unit, using a filter coefficient computed for each LCU, and supplies a result of the filter process to the screen rearrangement buffer 67 and the frame memory 69.

In step S61, the frame memory 69 stores the filtered image.

In step S62, the screen rearrangement buffer 67 performs rearrangement on the image after the application of the adaptive loop filter 82. That is, the order of the frames rearranged by the screen rearrangement buffer 22 of the image encoding device 11 for coding is changed to the original display order.

In step S63, the D/A conversion unit 68 performs D/A conversion on the image sent from the screen rearrangement buffer 67. This image is output to a display (not illustrated), and an image is displayed.

After the completion of the processing of step S63, the decoding process ends.

Explanation of Related Art Techniques

[Adaptive Offset Process in HEVC Scheme]

Next, an adaptive offset filter in the HEVC scheme will be described. In the HEVC scheme, the Sample Adaptive Offset scheme is adopted.

On the encoder side, the adaptive offset filter 41 is disposed between the deblocking filter (DB) 31 and the adaptive loop filter (ALF) 42. Also on the decoder side, the adaptive offset filter 81 is disposed between the deblocking filter (DB) 66 and the adaptive loop filter (ALF) 82.

The adaptive offset types (kinds) include two types of offset called band offset, and six types of offset called edge offset, and no application of offset is also possible. Furthermore, it is possible to partition an image into quad-tree regions and to select, for each region, which of the adaptive offset types described above to use for coding.

This selection information is coded as PQAO Info. by a coding unit (Entropy Coding), a bit stream is generated, and the generated bit stream is transmitted to the decoder side. Using this method, coding efficiency can be improved.

Here, a quad-tree structure will be described with reference to FIG. 5.

Figure 5:
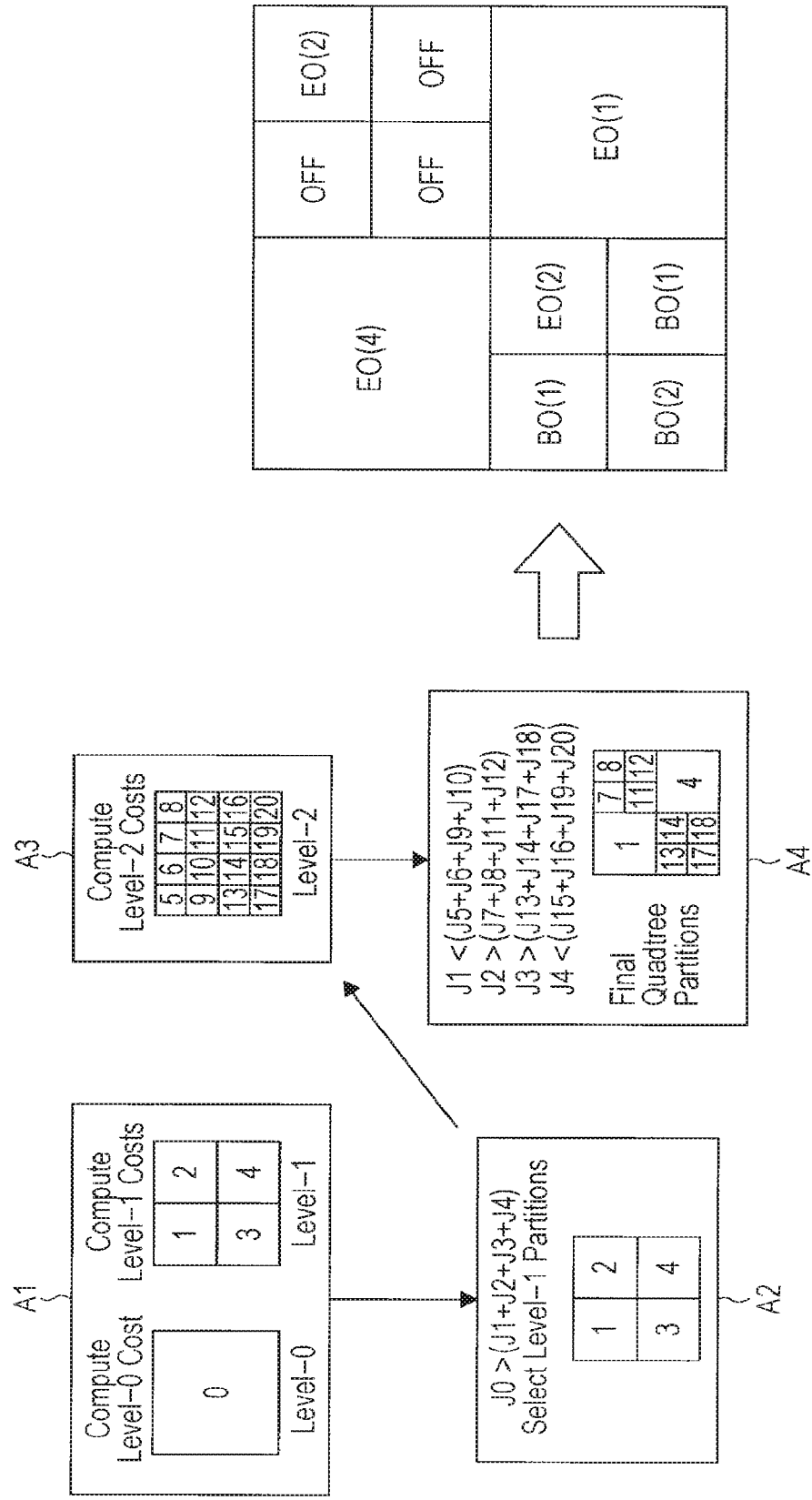
FIG. 5 is a diagram depicting a quad-tree structure in the HEVC scheme.

For example, on the encoder side, as indicated by A1 in FIG. 5, a cost function J0 of Level-0 (a partition depth of 0) indicating that a region 0 is not partitioned is computed. Further, cost functions J1, J2, J3, and J4 of Level-1 (a partition depth of 0) indicating that the region 0 is partitioned into four regions 1 to 4 are computed.

Then, as indicated by A2, the cost functions are compared, and the partition regions (Partitions) of Level-1 are selected in accordance with J0>(J1+J2+J3+J4).

Similarly, as indicated by A3, cost functions J5 to J20 of Level-2 (a partition depth of 2) indicating that the region 0 is partitioned into 16 regions 5 to 20 are computed.

Then, as indicated by A4, the cost functions are compared, and the partition region (Partition) of Level-1 is selected in the region 1 in accordance with J1<(J5+J6+J9+J10). In the region 2, the partition regions (Partitions) of Level-2 are selected in accordance with J2>(J7+J8+J11+J12). In the region 3, the partition regions (Partitions) of Level-2 are selected in accordance with J3>(J13+J14+J17+J18). In the region 4, the partition region (Partitions) of Level-1 is selected in accordance with J4>(J15+J16+J19+J20).

As a result, final quad tree regions (Partitions) indicated by A4 in the quad-tree structure are determined. Then, cost functions for all the types, namely, two types of band offset, six types of edge offset, and no offset, are calculated for each of the determined regions in the quad-tree structure, and which offset to use for coding is determined.

For example, in the example of FIG. 5, as indicated by the white arrow, EO(4), that is, the fourth type among the types of edge offset, is determined for the region 1. For the region 7, OFF, that is, no offset, is determined. For the region 8, EO(2), that is, the second type among the types of edge offset, is determined. For the regions 11 and 12, OFF, that is, no offset, is determined.

Further, for the region 13, BO(1), that is, the first type among the types of band offset, is determined. For the region 14, EO(2), that is, the second type among the types of edge offset, is determined. For the region 17, BO(2), that is, the second type among the types of band offset, is determined. For the region 18, BO(1), that is, the first type among the types of band offset, is determined. For the region 4, EO(1), that is, the first type among the types of edge offset, is determined.

Next, the details of band offset will be described with reference to FIG. 6.

Figure 6:
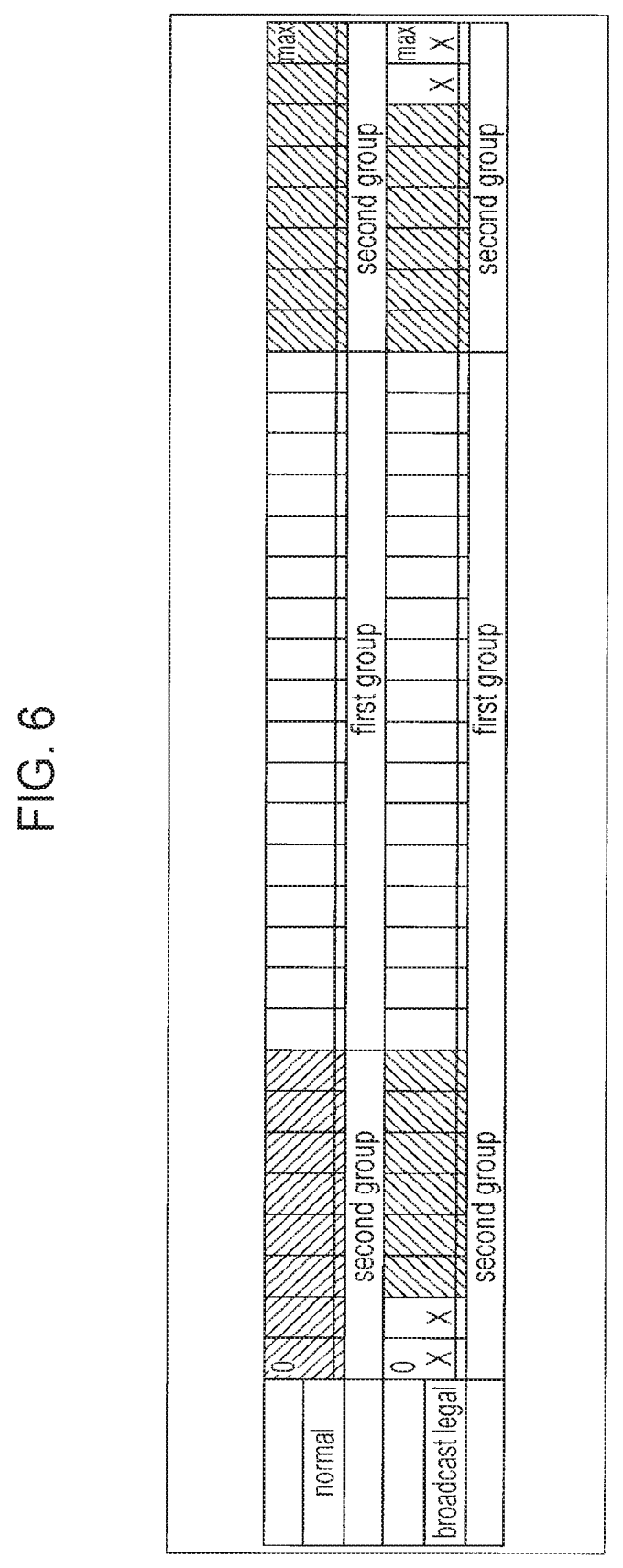

In band offset, in the example of FIG. 6, each scale represents one band=8 pixels, and luminance pixel values are separated into 32 bands, each band having an individual offset value.

That is, in the example of FIG. 6, the center 16 bands out of the 0th to 255th pixels (32 bands) are grouped in a first group, and the 8 bands at either side are grouped in a second group.

Then, the offsets in only either the first group or the second group are encoded and are sent to the decoder side. In general, each region is often a high-contrast white and black region or a low-contrast tint region, and it is rare that both the first group and the second group all contain pixels. For this reason, sending the offsets in only one group can suppress an increase in the amount of coding which is caused by the transmission of the pixel values of the values that are not included in each quad-tree region.

Note that if an input signal is broadcasted, the value of the luminance signal is limited to the range of 16,235, and the values of the chrominance signals are limited to the range of 16,240. In this case, the broadcast-legal given in the lower part of FIG. 6 is applied, and the offset values for 2 bands at either side, which are marked by a cross, are not transmitted.

Next, the details of edge offset will be described with reference to FIG. 7.

In edge offset, a comparison is made between the target pixel value and a neighboring pixel value adjacent to the target pixel value, and an offset value is transmitted in accordance with the corresponding category.

Edge offset has four one-dimensional patterns illustrated in part A of FIG. 7 to part D of FIG. 7, and two two-dimensional patterns illustrated in part E of FIG. 7 and part F of FIG. 7, and offsets for the categories illustrated in FIG. 7 are transmitted.

Part A of FIG. 7 illustrates a 1-D 0-degree pattern in which neighboring pixels are arranged one-dimensionally to the right and left of the target pixel C, that is, a 1-D 0 degree pattern which defines an angle of 0 degrees with the pattern in part A of FIG. 7. Part B of FIG. 7 illustrates a 1-D 90-degree pattern in which neighboring pixels are arranged one-dimensionally above and below the target pixel C, that is, a 1-D 90-degree pattern which defines an angle of 90 degrees with the pattern in part A of FIG. 7.

Part C of FIG. 7 illustrates a 1-D 135-degree pattern in which neighboring pixels are arranged one-dimensionally at positions upper left and lower right from the target pixel C, that is, a 1-D 135-degree pattern which defines an angle of 135 degrees with the pattern in part A of FIG. 7. Part D of FIG. 7 illustrates a 1-D 135-degree pattern in which neighboring pixels are arranged one-dimensionally to the upper right and lower left of the target pixel C, that is, a 1-D 135-degree pattern which defines an angle of 45 degrees with the pattern in part A of FIG. 7.

Part E of FIG. 7 illustrates a 2-D cross pattern in which neighboring pixels are arranged two-dimensionally above and below and to the right and left of the target pixel C, that is, a 2-D cross pattern which crosses the target pixel C. Part F of FIG. 7 illustrates a 2-D diagonal pattern in which neighboring pixels are arranged two-dimensionally to the upper right and lower left and to the upper left and lower right of the target pixel C, that is, a 2-D diagonal pattern which diagonally crosses the target pixel C.

Part A of FIG. 8 illustrates classification rules for one-dimensional patterns (Classification rule for 1-D patterns). The patterns in part A of FIG. 7 to part D of FIG. 7 are classified into five categories as illustrated in part A of FIG. 8. An offset is calculated in accordance with the categories, and is sent to the decoding unit.

If the pixel value of the target pixel C is smaller than the pixel values of two neighboring pixels, the pattern is classified in category 1. If the pixel value of the target pixel C is smaller than the pixel value of one neighboring pixel and is equal to the pixel value of the other neighboring pixel, the pattern is classified in category 2. If the pixel value of the target pixel C is larger than the pixel value of one neighboring pixel and is equal to the pixel value of the other neighboring pixel, the pattern is classified in category 3. If the pixel value of the target pixel C is larger than the pixel values of the two neighboring pixels, the pattern is classified in category 4. Otherwise, the pattern is classified in category 0.

Part B of FIG. 8 illustrates classification rules for two-dimensional patterns (Classification rule for 2-D patterns). The patterns in part E of FIG. 7 and part F of FIG. 7 are classified into seven categories as illustrated in part B of FIG. 8. An offset is sent to the decoder side in accordance with the categories.

If the pixel value of the target pixel C is smaller than the pixel values of four neighboring pixels, the pattern is classified in category 1. If the pixel value of the target pixel C is smaller than the pixel values of three neighboring pixel and is equal to the pixel value of the fourth neighboring pixel, the pattern is classified in category 2. If the pixel value of the target pixel C is smaller than the pixel values of three neighboring pixel and is larger than the pixel value of the fourth neighboring pixel, the pattern is classified in category 3.

If the pixel value of the target pixel C is larger than the pixel values of three neighboring pixel and is smaller than the pixel value of the fourth neighboring pixel, the pattern is classified in category 4. If the pixel value of the target pixel C is larger than the pixel values of three neighboring pixel and is equal to the pixel value of the fourth neighboring pixel, the pattern is classified in category 5. If the pixel value of the target pixel C is larger than the pixel values of the four neighboring pixels, the pattern is classified in category 6. Otherwise, the pattern is classified in category 0.

As described above, in edge offset, one-dimensional patterns require a smaller amount of computation because a comparison is merely made between neighboring two pixels. Note that in a high efficiency coding condition, a 1-bit offset value is made more accurate than that in a low delay coding condition and is sent to the decoder side.

The adaptive offset process described above is a process performed in the HEVC scheme for each of the determined regions in the quad-tree structure. That is, in the adaptive offset process, it is necessary to uniquely define regions for the adaptive offset filter, called a quad-tree structure.

In addition, the parameters of the adaptive offset filter are collectively defined in sao_param( ), which is placed before the data (video information), in groups of one frame. On the encoder side, therefore, it is necessary to hold data for one frame in a buffer until the completion of the adaptive offset filter process, the determination of the coefficients of the adaptive offset filter, and the creation of sao_param( ).

In light of the foregoing, in some embodiments, as described in the later section with reference to FIG. 9, adaptive offset filtering is performed in units of an LCU, which is the largest coding unit, correspondingly to the LCU-by-LCU processing of adaptive loop filter, which was proposed in NPL 2.

3. First Embodiment

[Overview of Present Technology]

In the example of FIG. 9, an image that is partitioned into LCU 111 to LCU 117 is illustrated. The adaptive offset filter 41 on the encoder side determines the type and coefficient (offset value) of adaptive offset filter in units of an LCU, which is the largest coding unit, and sends the type and coefficient to the decoder side at the timing of the beginning of each LCU. In this case, if the coefficient matches any of the coefficients that have already been transmitted and have been stored in the buffer, the adaptive offset filter 81 on the decoder side uses a copy of the coefficient in the buffer.

For example, the type E0 of the LCU 111 (the edge offset of category 0) and its coefficient are determined on the encoder side, and the type and the coefficient of the LCU 11L are sent to the decoder side at the beginning of the LCU 111. The type B1 of the LCU 112 (the band offset of category 1) and its coefficient are determined on the encoder side, and the type and the coefficient of the LCU 111 are sent to the decoder side at the beginning of the LCU 112. The type E1 of the LCU 113 (the edge offset of category 1) and its coefficient are determined on the encoder side, and the type and the coefficient of the LCU 111 are sent to the decoder side at the beginning of the LCU 113. The type B2 of the LCU 114 (the band offset of category 2) and its coefficient are determined on the encoder side, and the type and the coefficient of the LCU 111 are sent to the decoder side at the beginning of the LCU 114.

On the decoder side, the adaptive offset filter 81 has an EO (edge offset) buffer 121 and a BO (band offset) buffer 122, and performs a filter process in units of an LCU. In addition, the transmitted coefficients are stored.

Here, the type E0 of the LCU 115 (the edge offset of category 0) and its coefficient are determined on the encoder side. The coefficient of the type E0 has already been sent to the decoder side at the time of the LCU 111, and has been stored in the EO (edge offset) buffer 121 included in the adaptive offset filter 81 on the decoder side.

For the LCU 115, therefore, a copy of the coefficient of the type E0 in the EO buffer 121 is used on the decoder side without the sending of the coefficient of the type E0. Note that, for the LCU 116, no adaptive offset (off) is determined on the encoder side, and thus no coefficient is used.

Furthermore, the type E0 of the LCU 117 (the edge offset of category 0) and its coefficient are determined on the encoder side. The coefficient of the type E0 has already been sent to the decoder side at the time of the LCU 111, and has been stored in the EO (edge offset) buffer 121 included in the adaptive offset filter 81 on the decoder side.

For the LCU 117, therefore, a copy of the coefficient of the type E0 in the EO buffer 121 is used on the decoder side without the sending of the coefficient of the type E0.

As described above, the parameters of the adaptive offset filter, which are transmitted in one batch at the beginning of a frame in the related art, are sent sequentially at the beginning of each LCU. Thus, whereas a buffer with a capacity corresponding to one frame is required in the related art, a buffer with a reduced capacity corresponding to an LCU can be used.

In addition, a coefficient that has already been used is not sent, thus reducing the increase in the number of sent coefficients, which is caused by sending a coefficient for each LCU.

Figure 10:
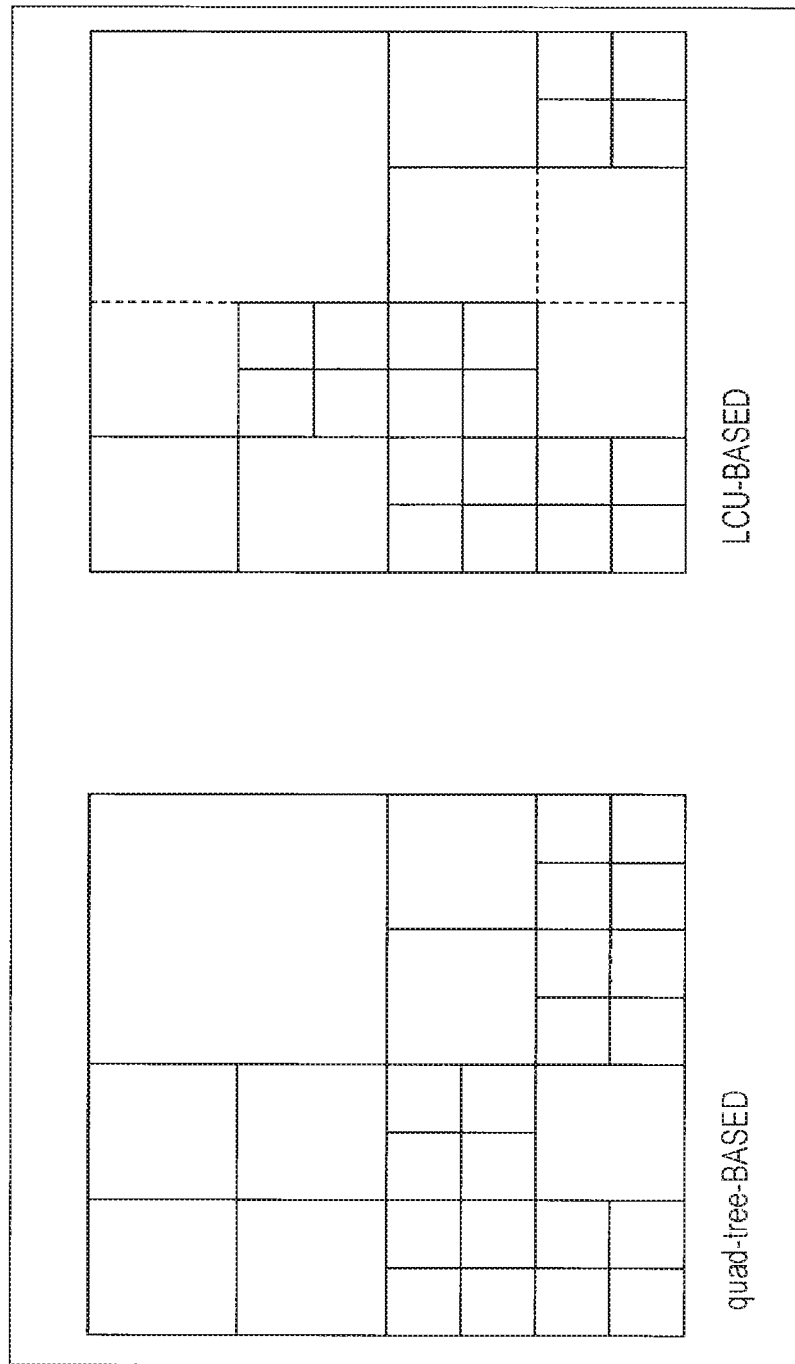
FIG. 10 is a diagram depicting advantages of the present technology.

FIG. 10 illustrates examples of partitioning of the adaptive offset filter. The left part of FIG. 10 illustrates an example of quad-tree-based partitioning of the related art, and the right part of FIG. 10 illustrates an example of LCU-based partitioning of the present technology.

In the case of a quad-tree structure, as illustrated in the right part of FIG. 10, an image can only be partitioned into square regions. In contrast, in the LCU-based filter, as illustrated in the right part of FIG. 10, an image can be partitioned into convex-shaped regions or concave-shaped regions.

In actuality, as indicated by a dotted line, a convex-shaped region is composed of, for example, an 8×8 LCU and a 16×16 LCU, where the same type and the use of the same coefficient are depicted. Similarly, as indicated by a dotted line, a concave-shaped region is composed of, for example, three 8×8 LCUs, where the same type and the use of the same coefficient are depicted.

As described above, a region is split in units of an LCU, thus increasing flexibility in partitioning, compared to that based on a quad-tree structure in the related art. Adaptive offset filtering can be performed in accordance with the characteristics of an input image.

Furthermore, the processing unit of the adaptive offset filter and the processing unit of the adaptive loop filter are made to match, allowing both filter processes to be performed concurrently, in parallel, in pipeline fashion, or the like. Accordingly, processing efficiency can be increased.

Example of Syntax

FIG. 11 is a diagram illustrating an example of the syntax of sao_param( ) generated by the image encoding device 11. The numerals appearing at the left side of the respective rows are row numbers given for the purpose of description.

In the example of FIG. 11, sample_adaptive_offset_flag in the eighth row is a flag of whether or not to perform adaptive offset filtering. sao_flag_cb in the tenth row indicates the application of the adaptive offset filter of cb when it is equal to 1. sao_flag_cr in the twelfth row indicates the application of the adaptive offset filter of cr when it is equal to 1. Note that sample_adaptive_offset_flag, sao_flag_cb, and sao_flag_cr are not described herein in particular.

sao_type_idx in the eighteenth row refers to an offset type. copy_flag in the twentieth row specifies whether or not to copy sao_type_idx (type) and sao_offset (coefficient) of the preceding LCU. That is, copy_flag is identification data identifying the parameters (type and offset) of a preceding LCU on which adaptive offset filtering has been performed before the current LCU being processed as being the same as the parameters of the current LCU. In other words, furthermore, copy_flag is identification data identifying whether to use the parameters of the preceding LCU as the parameters of the current LCU. In other words, furthermore, copy_flag is identification data identifying whether to use a copy of the parameters of the preceding LCU as the parameters of the current LCU.

copy_idx in the twenty-second row refers to previous (processed) sao_type_idx (type) and sao_offset (coefficient) which are to be copied. That is, copy_idx is identification data specifying the same LCU (to be copied) as the current LCU in terms of parameters from within previous LCUs.

sao_offset in the twenty-fifth row refers to the offset (coefficient) of each category.

Example of Type Index

FIG. 12 is a diagram depicting sao_type_idx. In the example of FIG. 12, sao_type_idx, NumSaoCategory, and Edge or Band type are given in sequence from left to right.

sao_type_idx is an index indicating a type of adaptive offset filter. NumSaoCategory is information indicating the number of categories for the index. Edge or Band type is information indicating what edge (or band) type the index corresponds to. Note that, roughly, sao_type_idx is Edge Offset (EO) when the value of sao_type_idx is in the range of 1 to 4, and sao_type_idx is Band Offset (BO) when the value of sao_type_idx is in the range of 5 and 6.

That is, if the value of sao_type_idx is 0, NumSaoCategoriy (the number of categories) is 0 and an adaptive offset process is not performed.

If the value of sao_type_idx is 1, NumSaoCategoriy (the number of categories) is 4 and the type of edge is the 1D 0-degree edge illustrated in part A of FIG. 7. If the value of sao_type_idx is 2, NumSaoCategoriy (the number of categories) is 4 and the type of edge is the 1D 90-degree edge illustrated in part B of FIG. 7. If the value of sao_type_idx is 3, NumSaoCategoriy (the number of categories) is 4 and the type of edge is the 1D 135-degree edge illustrated in part C of FIG. 7. If the value of sao_type_idx is 4, NumSaoCategoriy (the number of categories) is 4 and the type of edge is the 1D 45-degree edge illustrated in part D of FIG. 7.

If the value of sao_type_idx is 5, NumSaoCategoriy (the number of categories) is 16 and the type of band is Center Band (the first group in FIG. 6). If the value of sao_type_idx is 6, NumSaoCategoriy (the number of categories) is 16 and the type of band is Side Band (the second group in FIG. 6).

Note that while two-dimensional patterns of edge offset are not illustrated in the example of FIG. 7, a two-dimensional pattern of edge offset can also be handled by increasing the value or sao_type_idx.

[Example Configuration of Adaptive Offset Filter]

Figure 13:
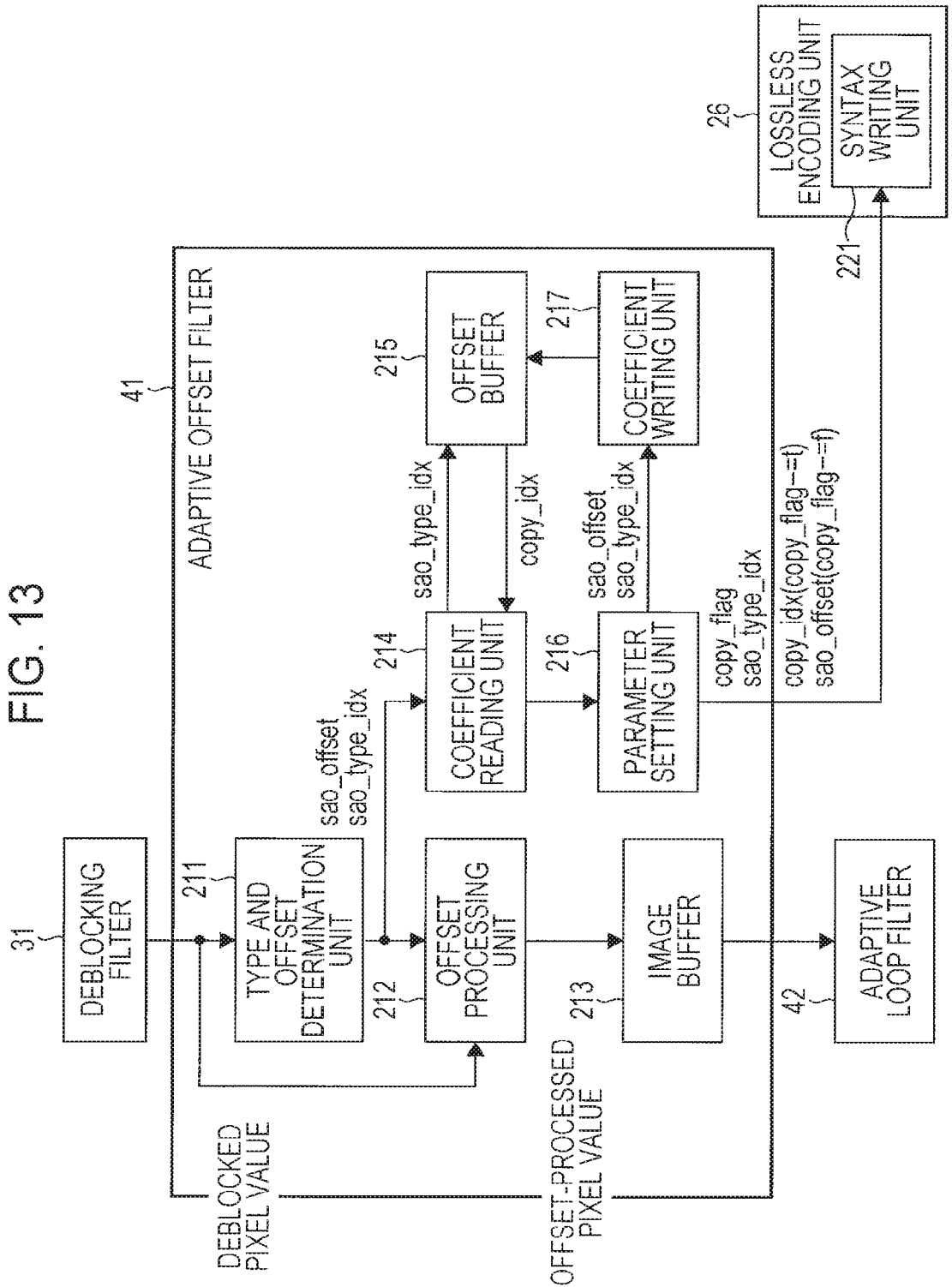
FIG. 13 is a block diagram illustrating an example configuration of an adaptive offset filter to which the present disclosure is applied.

FIG. 13 is a block diagram illustrating an example configuration of the adaptive offset filter and the lossless encoding unit in the image encoding device of FIG. 1.

In the example of FIG. 13, the adaptive offset filter 41 is constructed to include a type and offset determination unit 211, an offset processing unit 212, an image buffer 213, a coefficient reading unit 214, and an offset buffer 215. The adaptive offset filter 41 is constructed to further include a parameter setting unit 216 and a coefficient writing unit 217.

The loss less encoding unit 26 is constructed to include at least a syntax writing unit 221.

A deblocked pixel value sent from the deblocking filter 31 is input to the type and offset determination unit 211 and the offset processing unit 212. The type and offset determination unit 211 determines a type of adaptive offset filter and the offset of the type in units of an LCU. In this case, by way of example, a cost function is computed in units of an LCU, and the type and offset that are optimum for each LCU, where the cost function is minimum, are determined. The type and offset determination unit 211 supplies a type index (sao_type_idx) indicating the determined type and the offset (sao_offset) to the offset processing unit 212 and the coefficient reading unit 214.

Note that the offset (coefficient) is a coefficient of 5 for edge offset, and a coefficient of 9 for band offset.

The offset processing unit 212 performs an adaptive offset filter process on deblocked pixel values sent from the deblocking filter 31, for each LCU using the type and offset indicated by the type index sent from the type and offset determination unit 211. The offset processing unit 212 supplies the pixel values that have been subjected to the offset process to the image buffer 213.

The image buffer 213 temporarily stores the pixel values that have been subjected to the offset process by the offset processing unit 212, and supplies the pixel values to the adaptive loop filter 42 at certain timing.

The coefficient reading unit 214 searches the offset buffer 215 for an offset that matches the offset sent from the type and offset determination unit 211. Note that the coefficient reading unit 214 checks the buffer of the type (edge offset buffer or band offset buffer) indicated by the type index sent from the offset buffer 215.

If there is any matching coefficient, the coefficient reading unit 214 supplies a copy index (copy_idx) indicating the position at which the matching coefficient is stored in the offset buffer 215 to the parameter setting unit 216 together with the type index. If there is no matching coefficient, the coefficient reading unit 214 supplies the offset and the type index to the parameter setting unit 216.

The offset buffer 215 has a buffer for storing offsets for edge offset, and a buffer for storing offsets for band offset. The offset buffer 215 is constructed in, for example, a FIFO.

If the copy index is supplied together with the type index, the parameter setting unit 216 sets the copy flag (copy_flag) to ture. The parameter setting unit 216 supplies the copy flag, the type index, and the copy index to the syntax writing unit 221 as adaptive offset parameters.

If the copy index is supplied to the parameter setting unit 216 together with the offset, the parameter setting unit 216 sets the copy flag (copy_flag) to false. The parameter setting unit 216 supplies the copy flag, the type index, and the offset to the syntax writing unit 221 as adaptive offset parameters. In this case, the parameter setting unit 216 also supplies the type index and the offset to the coefficient writing unit 217, and causes the offset to be written to an available region in the offset buffer 215.

The coefficient writing unit 217 writes the offset sent from the parameter setting unit 216 to an available region that is close to the beginning among available regions in the buffer of the type indicated by the type index sent from the parameter setting unit 216 within the offset buffer 215. Note that the available region that is close to the beginning is an available region having the lowest index.

The syntax writing unit 221 writes the adaptive offset parameters sent from the parameter setting unit 216 to the header portion (sao_param) of the encoded stream in units of an LCU, as described above with reference to, for example, FIG. 11.

[Adaptive Offset Filter Process on Encoder Side]

Figure 14:
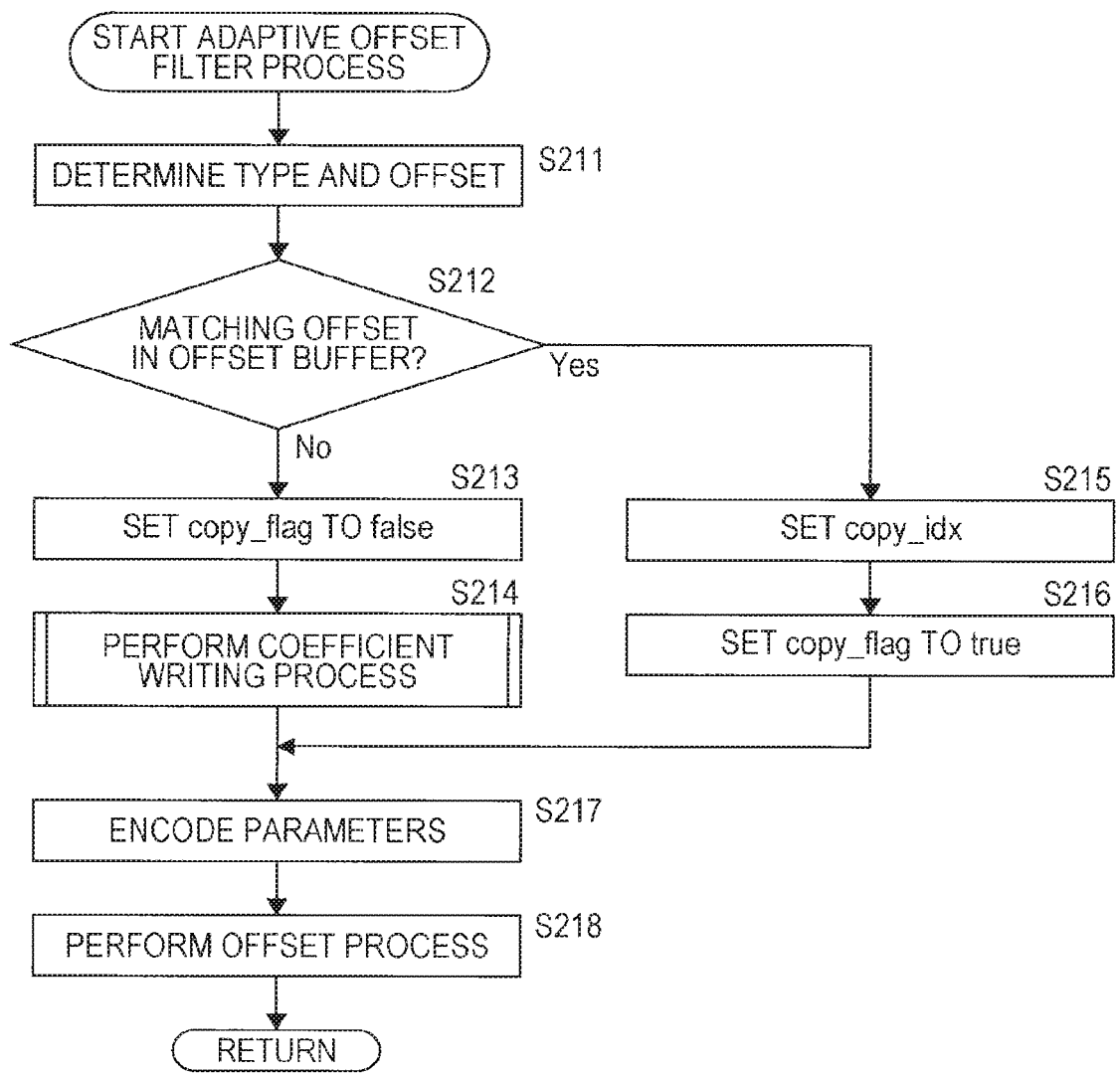
FIG. 14 is a flowchart depicting an adaptive offset filter process.

Next, an adaptive offset filter process performed by the adaptive offset filter 41 of FIG. 13 will be described with reference to a flowchart of FIG. 14. Note that this adaptive offset filter process is the process in step S23 of FIG. 2.

A deblocked pixel value sent from the deblocking filter 31 is input to the type and offset determination unit 211 and the offset processing unit 212. In step S211, the type and offset determination unit 211 determines a type of adaptive offset filter and the offset of the type in units of an LCU. The type and offset determination unit 211 supplies a type index (sao_type_idx) indicating the determined type and the offset (sao_offset) to the coefficient reading unit 214.

The coefficient reading unit 214 searches the offset buffer 215 for an offset that matches the offset sent from the type and offset determination unit 211. In step S212, the coefficient reading unit 214 determines whether or not there is a matching offset in the offset buffer 215. Note that the coefficient reading unit 214 checks the buffer of the type (edge offset buffer or band offset buffer) indicated by the type index sent from the offset buffer 215.

If it is determined in step S212 that there is no matching offset, the coefficient reading unit 214 supplies the offset and the type index to the parameter setting unit 216.

In response to this, in step S213, the parameter setting unit 216 sets the copy flag (copy_flag) to false.

The parameter setting unit 216 also supplies the type index and the offset to the coefficient writing unit 217, and, in step S214, causes a coefficient (offset) writing process to be performed. This coefficient writing process will be described below with reference to FIG. 15.

In step S217, the parameter setting unit 216 supplies the copy flag, the type index, and the offset to the syntax writing unit 221 as adaptive offset parameters, and causes the adaptive offset parameters to be encoded.

Figure 2:
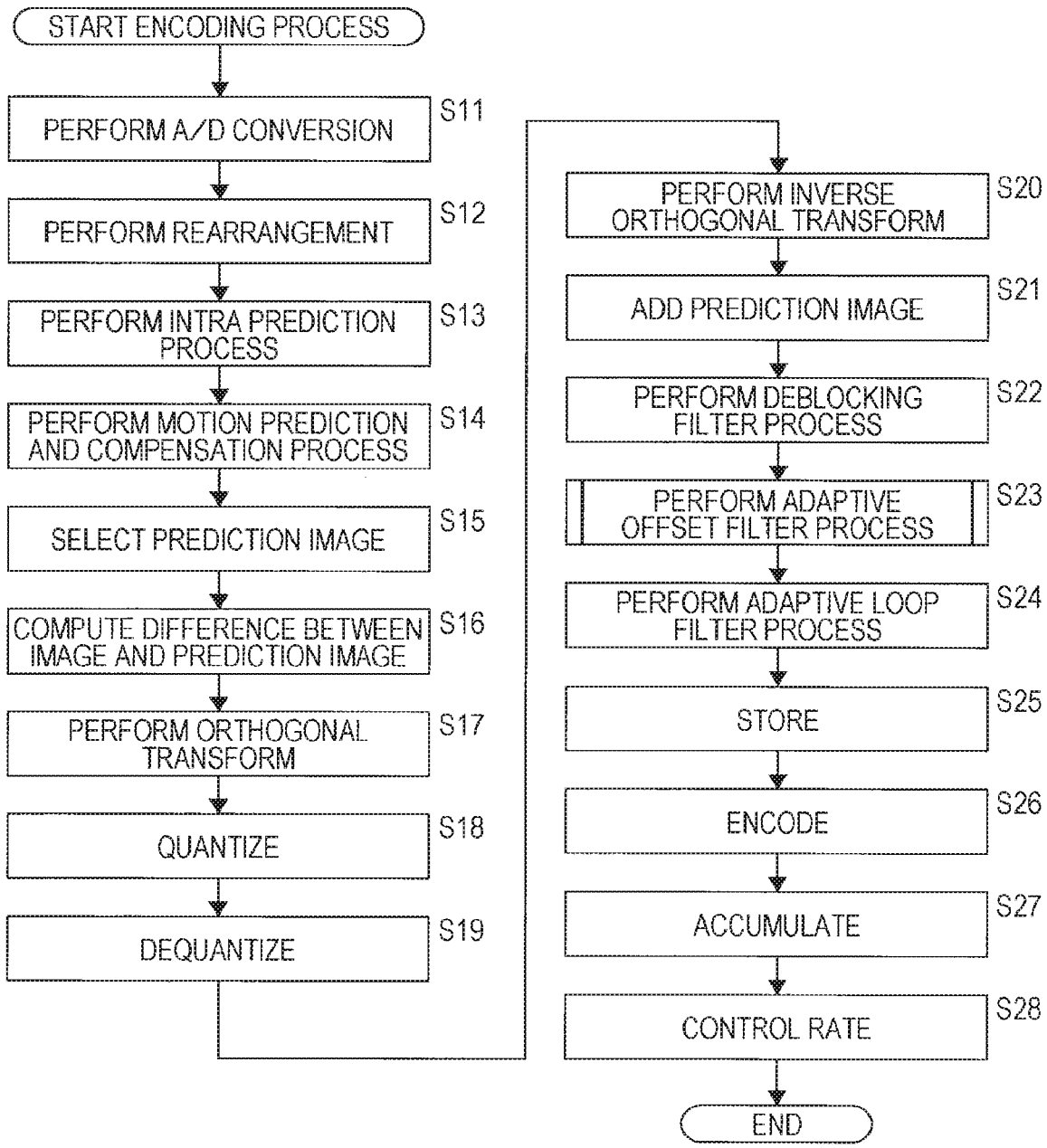
FIG. 2 is a flowchart depicting an example of the flow of an encoding process.

In response to this, in step S26 of FIG. 2 described above, the syntax writing unit 221 writes the adaptive offset parameters sent from the parameter setting unit 216 to the header portion (sao_param) of the encoded stream in units of an LCU.

On the other hand, if it is determined in step S212 that there is a matching offset, the process proceeds to step S215.

In step S215, the coefficient reading unit 214 sets a copy index (copy_idx) indicating the position at which the matching coefficient is stored in the offset buffer 215, and supplies the copy index (copy_idx) to the parameter setting unit 216 together with the type index.

In response to this, in step S216, the parameter setting unit 216 sets the copy flag (copy flag) to ture.

Then, the parameter setting unit 216 supplies the copy flag, the type index, and the copy index to the syntax writing unit 221 as adaptive offset parameters, and causes the adaptive offset parameters to be encoded.

In response to this, in step S26 of FIG. 2 described above, the syntax writing unit 221 writes the adaptive offset parameters sent from the parameter setting unit 216 to the header portion (sao_param) of the encoded stream in units of an LCU.

Meanwhile, the type index (sao_type_idx) and offset (sao_offset) determined in step S211 are also supplied to the offset processing unit 212.

In step S218, the offset processing unit 212 performs an offset process. That is, the offset processing unit 212 performs an adaptive offset filter process on deblocked pixel values sent from the deblocking filter 31, for each LCU using the type and offset indicated by the type index sent from the type and offset determination unit 211. The pixel values that have been subjected to the adaptive offset filter are stored in the image buffer 213, and are supplied to the adaptive loop filter 42 at certain timing.

[Coefficient Writing Process]

Next, the coefficient writing process in step S214 of FIG. 14 will be described with reference to a flowchart of FIG. 15. Note that FIG. 16 is referred to for the description of the coefficient writing process.

Figure 16:
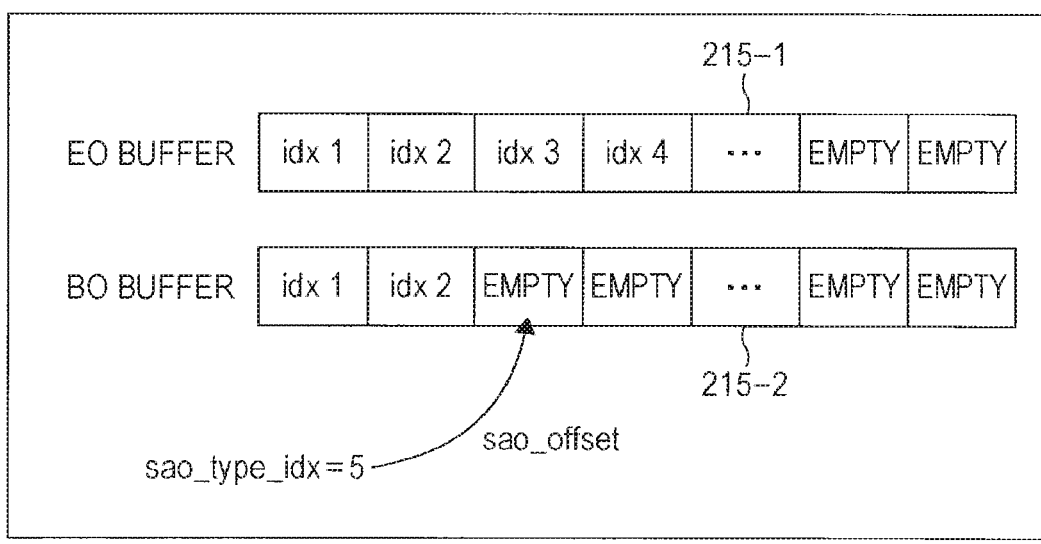
FIG. 16 is a diagram depicting the coefficient writing process.

As illustrated in FIG. 16, the offset buffer 215 includes two buffers, that is, an EO buffer 215-1 in which coefficients for edge offset are stored, and a BO buffer 215-2 in which coefficients for band offset are stored.

The EO buffer 215-1 and the BO buffer 215-2 store coefficients, starting from the position that is close to the beginning (left side). In the EO buffer 215-1 and the BO buffer 215-2, a position marked with copy index (idx) is a region where a coefficient has already been written, and a position marked with "empty" is an available region.

That is, in the EO buffer 215-1, coefficients have already been written to the position marked with copy index (idx)=1, the position marked with copy index=2, the position marked with copy index=3, and the position marked with copy index=4.

For example, in the BO buffer 215-2, coefficients have already been written to the position marked with copy index (idx)=1 and the position marked with copy index=2.

Figure 15:
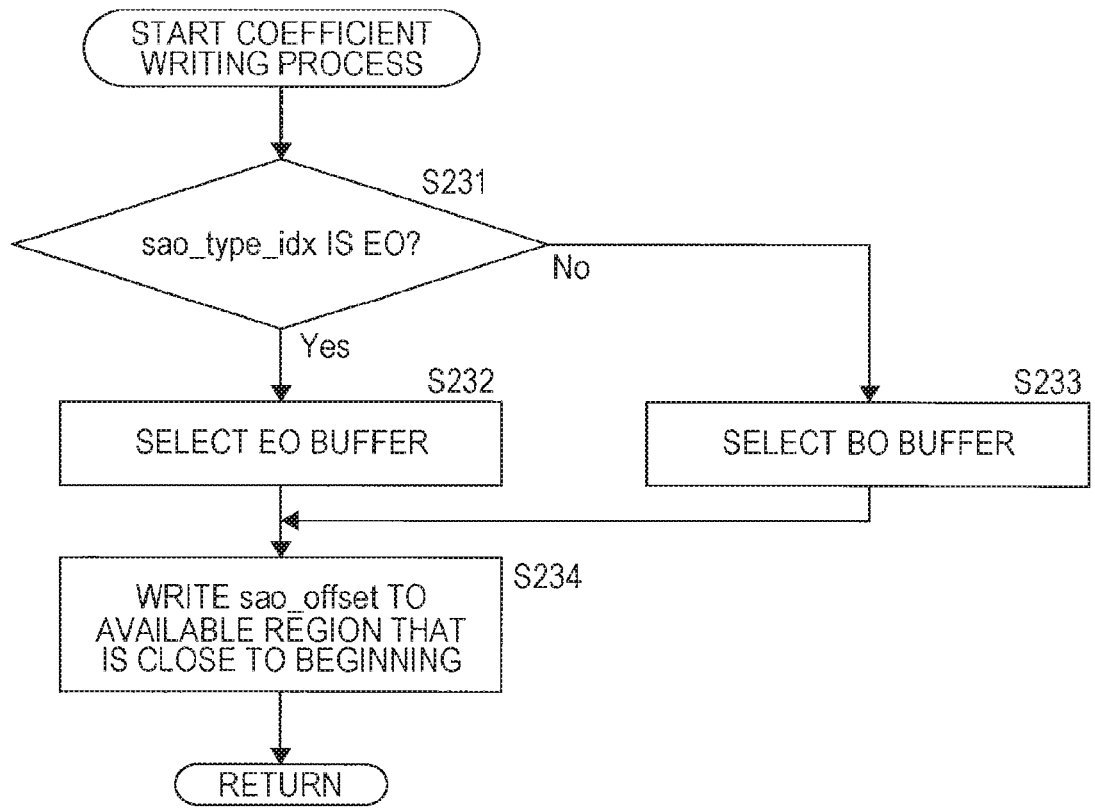
FIG. 15 is a flowchart depicting a coefficient writing process.

In step S231 of FIG. 15, the coefficient writing unit 217 determines whether or not the type index sent from the parameter setting unit 216 is EO (edge offset).

If it is determined in step S231 that the type index is EO (edge offset), in step S232, the coefficient writing unit 217 selects the EO buffer 215-1.

If it is determined in step S231 that the type index is not EO (edge offset), that is, the type index is band offset, in step S233, the coefficient writing unit 217 selects the BO buffer 215-2.

In step S234, the coefficient writing unit 217 writes sao_offset (offset) to the available region that is close to the beginning in the selected buffer.

For example, as illustrated in FIG. 16, if the type index (sao_type_idx) is 5, the type index indicates band offset. Thus, in step S233, the BO buffer 215-2 is selected. Then, in step S234, sao_offset (offset) with a type index of 5 is written to the position right adjacent to the position marked with copy index=2. That is, the position right adjacent to the position marked with copy index=2 is the region that is close to the beginning among available regions.

[Example Configuration of Adaptive Offset Filter]

Figure 17:
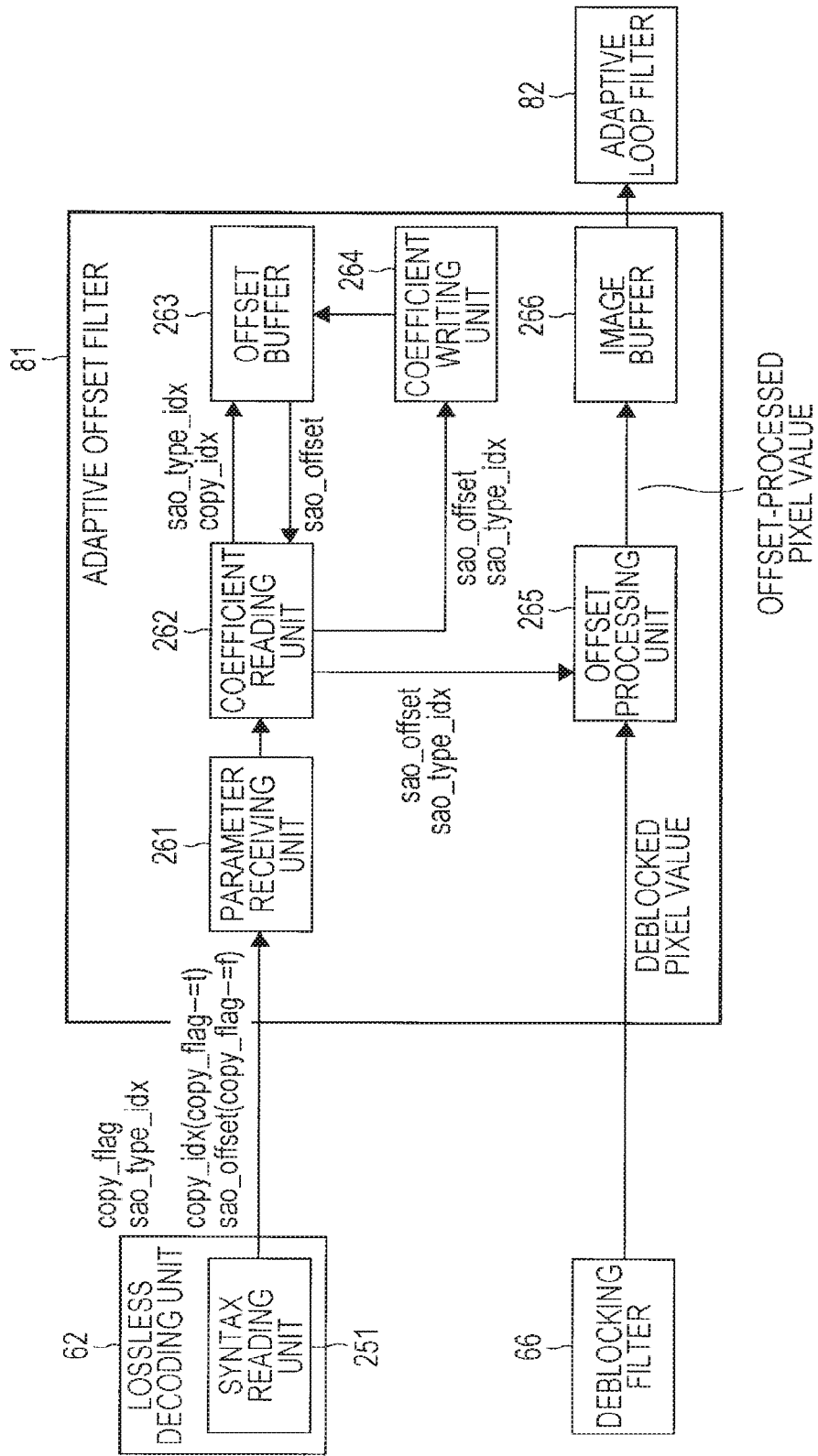
FIG. 17 is a block diagram illustrating an example configuration of an adaptive offset filter to which the present disclosure is applied.

FIG. 17 is a block diagram illustrating an example configuration of the lossless decoding unit and the adaptive offset filter in the image decoding device of FIG. 3.

In the example of FIG. 17, the lossless decoding unit 62 is constructed to include at least a syntax reading unit 251.

The adaptive offset filter 81 is constructed to include a parameter receiving unit 261, a coefficient reading unit 262, an offset buffer 263, a coefficient writing unit 264, an offset processing unit 265, and an image buffer 266.

The syntax reading unit 251 reads syntax from the header portion of the encoded stream, and supplies adaptive offset parameters in the syntax to the parameter receiving unit 261.

Note that, as also described above with reference to the encoder side, if the copy flag is ture, the adaptive offset parameters include a copy flag, a type index, and a copy index. If the copy flag is false, the adaptive offset parameters include a copy flag, a type index, and an offset.

The parameter receiving unit 261 receives adaptive offset parameters supplied from the syntax reading unit 251, and supplies the adaptive offset parameters to the coefficient reading unit 262.

The coefficient reading unit 262 determines whether or not the type index is 0. If the type index is 0, the coefficient reading unit 262 does not cause the offset processing unit 265 to perform adaptive offset filtering.

If the copy flag is ture, the coefficient reading unit 262 reads the offset from the position indicated by the copy index of the buffer of the type indicated by the type index. The coefficient reading unit 262 supplies the read offset and type index to the offset processing unit 265.

If the copy flag is false, the coefficient reading unit 262 supplies the offset and the type index to the offset processing unit 265. In this case, the coefficient reading unit 262 also supplies the offset and the type index to the coefficient writing unit 264, and causes the offset to be written to the offset buffer 263.

The offset buffer 263 has a configuration similar to that of the offset buffer 215 of FIG. 13. That is, the offset buffer 263 has a buffer for storing offsets for edge offset, and a buffer for storing offsets for band offset. The offset buffer 263 is constructed in, for example, a FIFO.

The coefficient writing unit 264 has a basically similar configuration to that of the coefficient writing unit 217 of FIG. 13. That is, the coefficient writing unit 264 writes the offset sent from the coefficient reading unit 262 to an available region that is close to the beginning among available regions in the buffer of the type indicated by the type index sent from the coefficient reading unit 262 within the offset buffer 263.

The offset processing unit 265 has a basically similar configuration to that of the offset processing unit 212 of FIG. 13. That is, the offset processing unit 265 performs an adaptive offset filter process on deblocked pixel values sent from the deblocking filter 66, for each LCU using the type and offset indicated by the type index sent from the coefficient reading unit 262. The offset processing unit 265 supplies the pixel values that have been subjected to the offset process to the image buffer 266.

Note that if the type index is 0, the offset processing unit 265 supplies the filtered pixels sent from the deblocking filter 66 to the image buffer 266 as they are. That is, in this case, an adaptive offset filter process is not performed.

The image buffer 266 has a basically similar configuration to that of the image buffer 213 of FIG. 13. That is, the image buffer 266 temporarily stores the pixel values that have been subjected to the offset process by the offset processing unit 265, and supplies the pixel values to the adaptive loop filter 82 at certain timing.

[Adaptive Offset Filter Process on Decoder Side]

Figure 18:
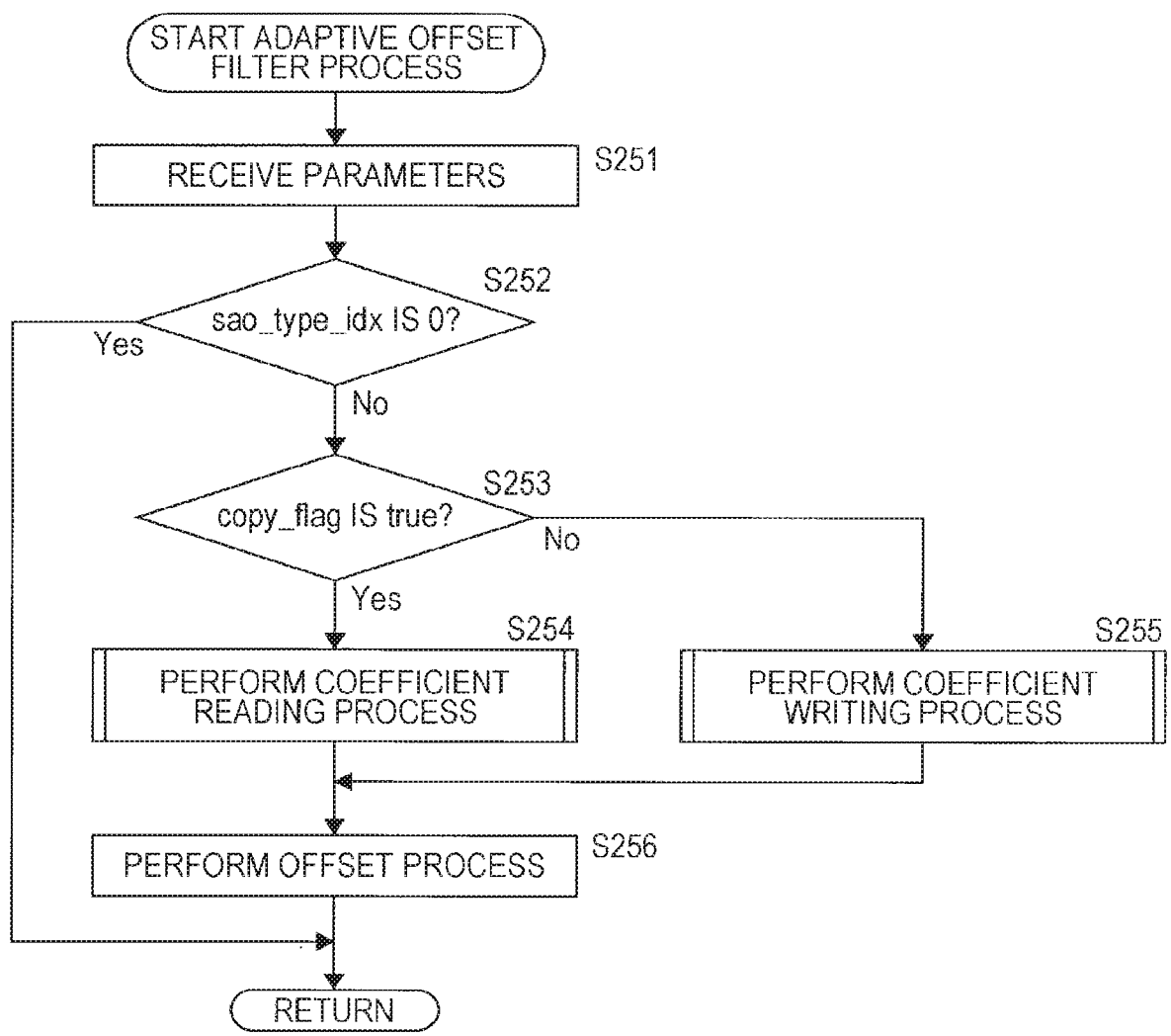
FIG. 18 is a flowchart depicting an adaptive offset filter process.

Next, the adaptive offset filter process performed by the adaptive offset filter 81 of FIG. 17 will be described with reference to a flowchart of FIG. 18. Note that this adaptive offset filter process is the process in step S59 of FIG. 4.

Figure 4:
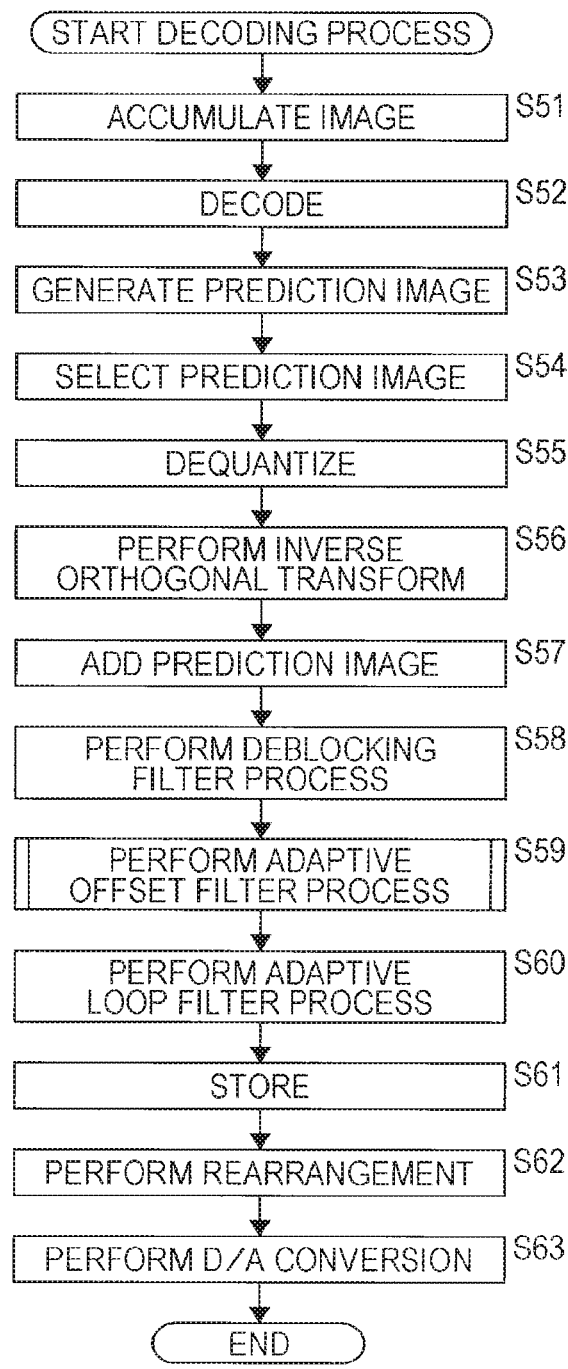
FIG. 4 is a flowchart depicting an example of the flow of a decoding process.

In step S52 of FIG. 4, when an encoded stream is to be decoded, the syntax reading unit 251 reads syntax from the header portion of the encoded stream, and supplies adaptive offset parameters in the syntax to the parameter receiving unit 261.

In step S251, the parameter receiving unit 261 receives the adaptive offset parameters supplied from the syntax reading unit 251, and supplies the adaptive offset parameters to the coefficient reading unit 262.

In step S252, the coefficient reading unit 262 determines whether or not the type index (sao_type_idx) is 0.

If it is determined in step S252 that the type index is 0, the adaptive offset filter process ends. That is, in this case, an adaptive offset filter process is not performed, and the offset processing unit 265 supplies the filtered pixels sent from the deblocking filter 66 to the image buffer 266 as they are.

If it is determined in step S252 that the type index is not 0, in step 3253, the coefficient reading unit 262 determines whether or not the copy flag (copy_flag) is ture.

If it is determined in step S253 that the copy flag is ture, in step S254, the coefficient reading unit 262 performs a coefficient (offset) reading process. This coefficient reading process will be described below with reference to FIG. 19.

Through the process described above, the offset is read from the position indicated by the copy index of the buffer of the type indicated by the type index. The coefficient reading unit 262 supplies the read offset and the type index to the offset processing unit 265.

On the other hand, if it is determined in step S253 that the copy flag is not ture, the coefficient reading unit 262 supplies the offset and type index sent from the parameter receiving unit 261 to the offset processing unit 265.

Then, in step S255, the coefficient reading unit 262 also supplies the offset and type index sent from the parameter receiving unit 261 to the coefficient writing unit. 264, and causes a coefficient writing process for the offset buffer 263 to be performed. This coefficient writing process is basically the same process as the coefficient writing process described above with reference to FIG. 15, and a description thereof is thus omitted.

In step S256, the offset processing unit 265 performs an adaptive offset filter process on deblocked pixel values sent from the deblocking filter 66, for each LCU using the type and offset indicated by the type index sent from the coefficient reading unit 262. The offset processing unit 265 supplies the pixel values that have been subjected to the offset process to the image buffer 266.

[Coefficient Reading Process]

Next, the coefficient reading process in step S254 of FIG. 18 will be described with reference to a flowchart of FIG. 19. Note that FIG. 20 is referred to for the description of the coefficient reading process.

Figure 20:
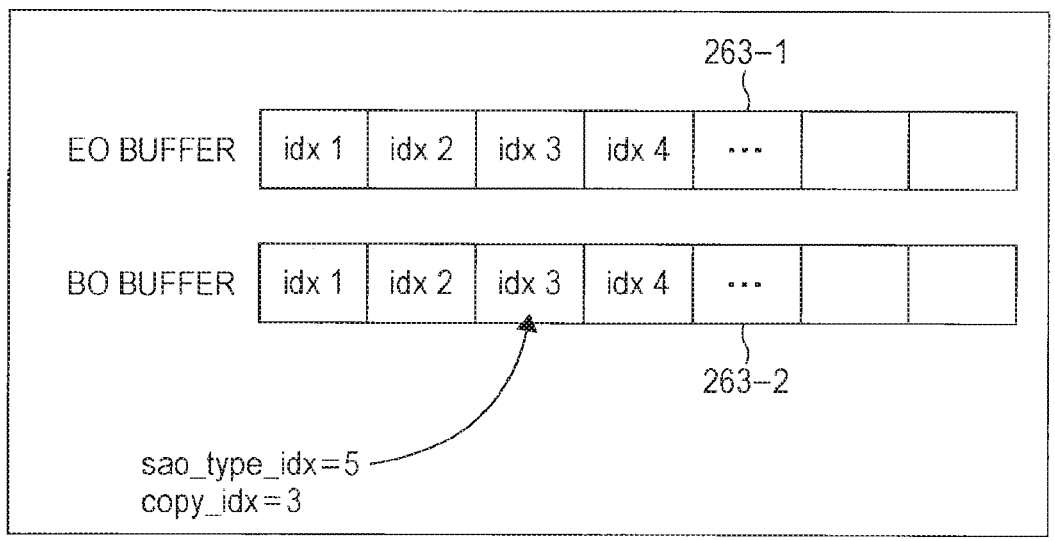
FIG. 20 is a diagram depicting the coefficient reading process.

As illustrated in FIG. 20, the offset buffer 263 includes two buffers, that is, an EO buffer 263-1 in which coefficients for edge offset are stored, and a BO buffer 263-2 in which coefficients for band offset are stored.

The EC buffer 263-1 and the BO buffer 263-2 store coefficients, starting from the position that is close to the beginning (left side). In the EO buffer 263-1 and the BO buffer 263-2, a position marked with copy index (idx) is a region where a coefficient has already been written, and the other positions are available regions.

That is, in the EO buffer 263-1, coefficients have already been written to the position marked with copy index (idx)=1, the position marked with copy index=2, the position marked with copy index=3, and the position marked with copy index=4.

For example, in the BO buffer 263-2, coefficients have already been written to the position marked with copy index (idx)=1, the position marked with copy index=2, the position marked with copy index=3, and position marked with copy index=4.

Figure 19:
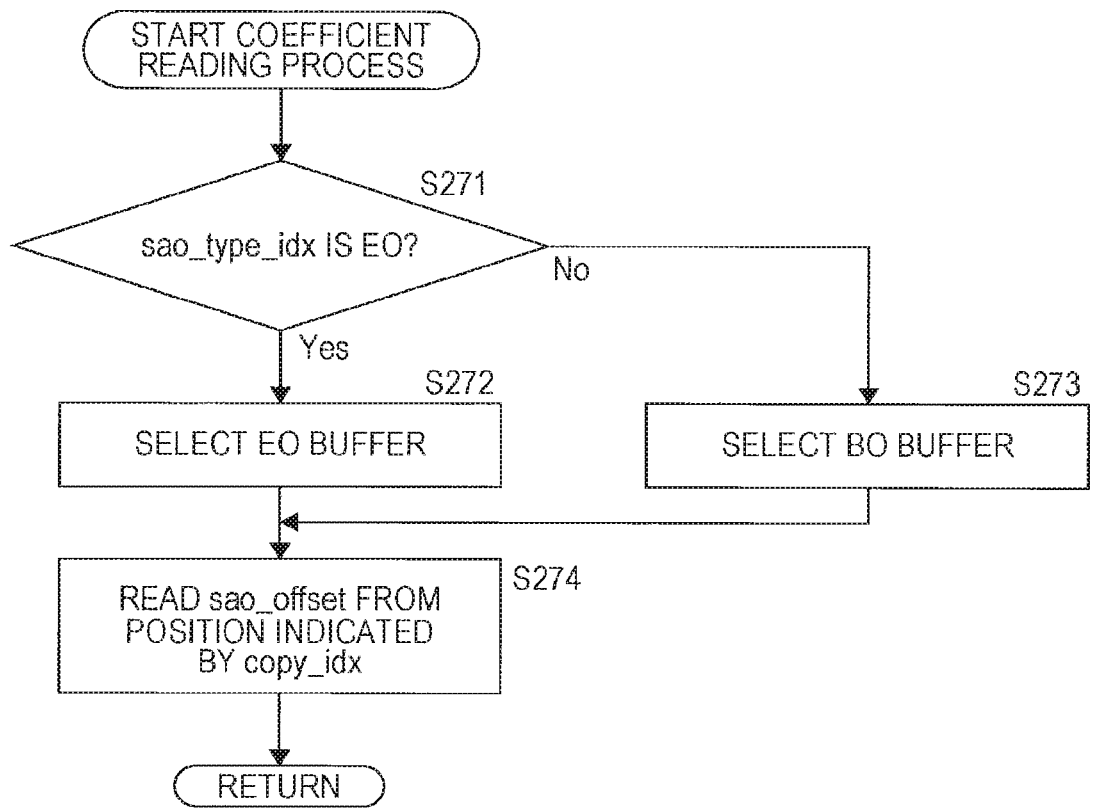
FIG. 19 is a flowchart depicting a coefficient reading process.

In step S271 of FIG. 19, the coefficient reading unit 262 determines whether or not the type index sent from the parameter receiving unit 261 is EO (edge offset).

If it is determined in step S271 that the type index is EO (edge offset), in step S272, the coefficient reading unit 262 selects the EO buffer 263-1.

If it is determined in step S271 that the type index is not EO (edge offset), that is, the type index is band offset, in step S273, the coefficient reading unit 262 selects the BO buffer 263-2.

In step S274, the coefficient reading unit 262 reads sao_offset (offset) from the position indicated by the copy index (copy_idx) in the selected buffer.

For example, as illustrated in FIG. 20, it the type index (sao_type_idx) is 5, the type index indicates band offset. Thus, in step S273, the BO buffer 263-2 is selected. Then, in step S274, sao_offset (offset) is read from the position marked with copy index z 3.

As described above, adaptive offset filtering is performed in units of an LCU, which is the largest coding unit, and the parameters of the adaptive offset filter, which are transmitted in one batch at the beginning of a frame in the related art, are sequentially sent at the beginning of each LCU. Thus, whereas a buffer with a capacity corresponding to one frame is required in the related art, a buffer with a reduced capacity corresponding to an LCU can be used.

In addition, the copy flag and the copy index are sent to the decoder side, and a coefficient that has already been used is not sent, thus reducing the increase in the number of sent coefficients, which is caused by sending a coefficient for each LCU.

Additionally, adaptive offset filtering and adaptive loop filtering can be performed in units of the same LCU. Accordingly, processing efficiency can be improved.

In addition, a region is split in units of an LCU, thus increasing flexibility in partitioning, compared to that based on a quad-tree structure in the related art. Adaptive offset filtering can be performed in accordance with the characteristics of an input image.

Note that in the foregoing description, the offset buffer 215 and the offset buffer 263 are constructed in a FIFO, by way of example. However, an FIFO is not given in a limiting sense. That is, the configuration of the offset buffer 215 and the offset buffer 263 may be any other buffer configuration so long as the same configuration is used on the encoder side and the decoder side.

In the foregoing, the HEVC scheme is basically used as a coding scheme. However, the present disclosure is not limited thereto, and any other coding scheme/decoding scheme including at least adaptive offset filtering as in-loop filtering may be applied.

Note that the present disclosure may be applied to an image encoding device and an image decoding device that are used for receiving image information (bit stream) compressed using an orthogonal transform such as a discrete cosine transform and motion compensation, for example, like the HEVC scheme or the like, via a network medium such as satellite broadcasting, cable television, the Internet, or a mobile phone. The present disclosure may further be applied to an image encoding device and an image decoding device for use in processing on a storage medium such as an optical disk, a magnetic disk, and a flash memory.

4. Second Embodiment

[Application to Multi-View Image Encoding/Multi-View Image Decoding]

Figure 21:
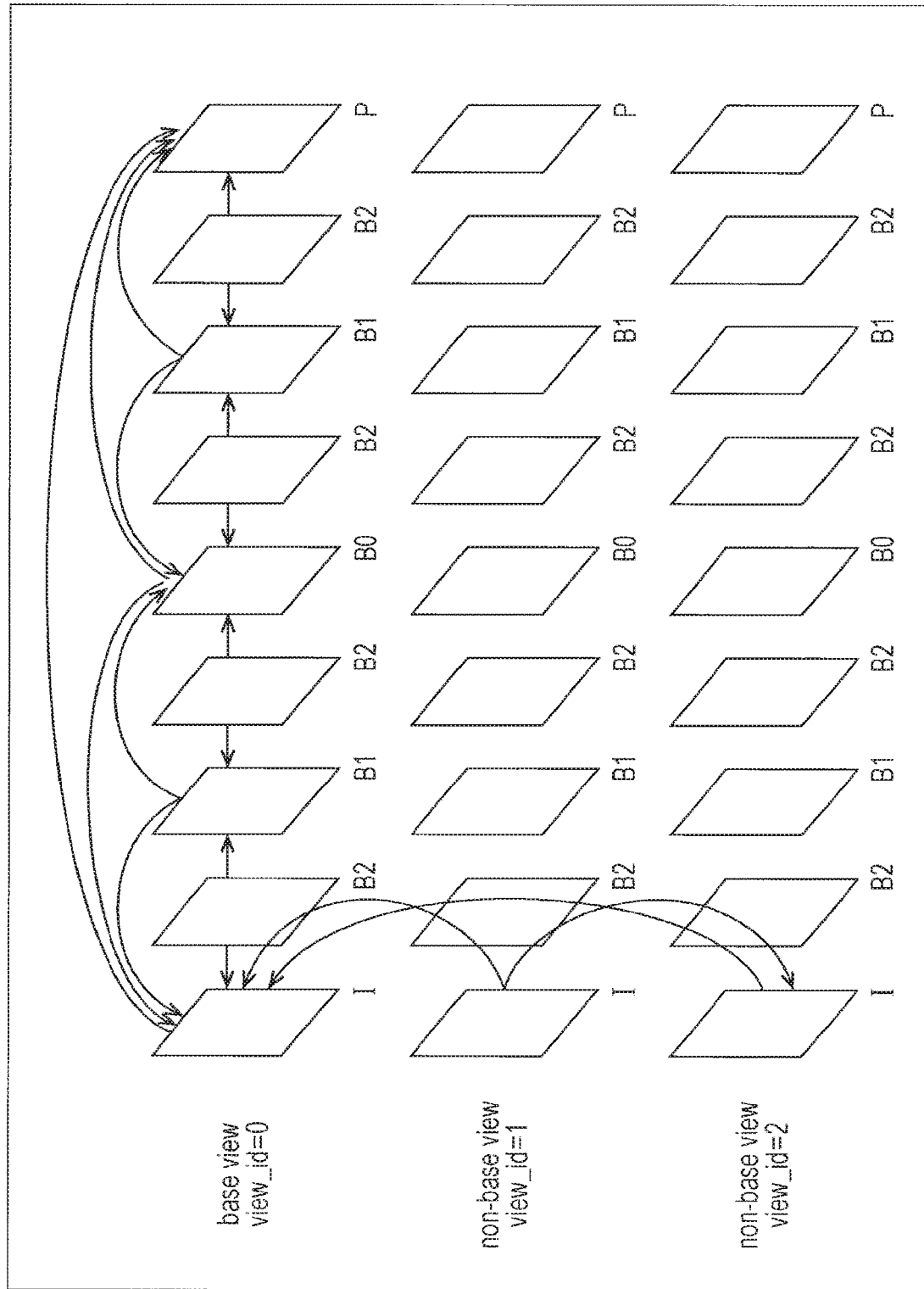
FIG. 21 is a diagram illustrating an example of a multi-view image encoding scheme.

The series of processes described above can be applied to multi-view image encoding and multi-view image decoding. FIG. 21 illustrates an example of a multi-view image encoding scheme.

As illustrated in FIG. 21, multi-view images include images at a plurality of views, and an image at a certain one of the plurality of views is designated as an image of a base view. The images other than the image of the base view are handled as images of non-base views.

In a case where multi-view image encoding as in FIG. 21 is performed, adaptive offset filter parameters (a copy flag, a copy index, etc.) can be set in each view (the same view). In addition, in each view (different views), adaptive offset filter parameters set in another view can also be shared.

In this case, adaptive offset filter parameters set in the base view are used in at least one non-base view. Alternatively, for example, adaptive offset filter parameters set in a non-base view (view id=i) are used in at least one of the base view and non-base view (view id=j).

Accordingly, processing efficiency can be improved.

[Multi-View Image Encoding Device]

Figure 22:
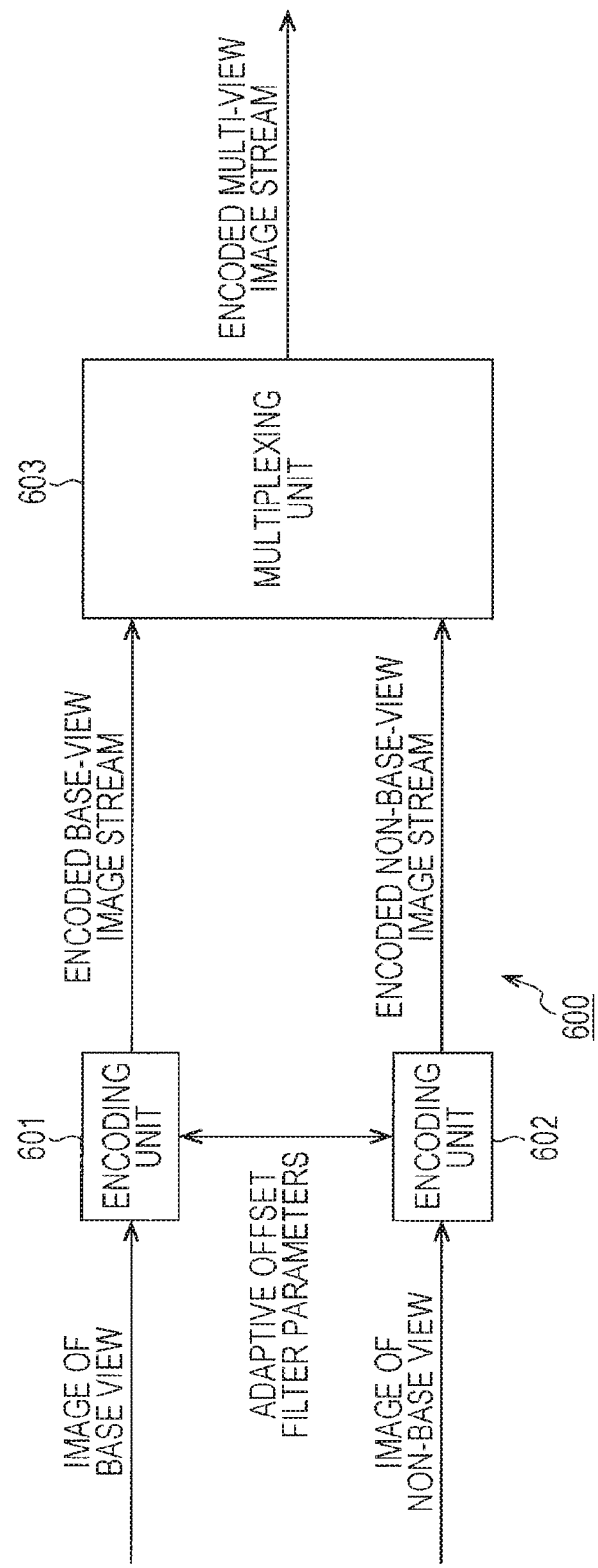
FIG. 22 is a diagram illustrating a main example configuration of a multi-view image encoding device to which the present technology is applied.

FIG. 22 is a diagram illustrating a multi-view image encoding device for performing the multi-view image encoding operation described above. As illustrated in FIG. 22, a multi-view image encoding device 600 includes an encoding unit 601, an encoding unit 602, and a multiplexing unit 603.

The encoding unit 601 encodes an image of a base view to generate an encoded base-view image stream. The encoding unit 602 encodes an image of a non-base view to generate an encoded non-base-view image stream. The multiplexing unit 603 multiplexes the encoded base-view image stream generated by the encoding unit 601 and the encoded non-base-view image stream generated by the encoding unit 602 to generate an encoded multi-view image stream.

The image encoding device 11 (FIG. 1) can be used for each of the encoding unit 601 and the encoding unit 602 of the multi-view image encoding device 600. In this case, the multi-view image encoding device 600 sets the adaptive offset filter parameters set by the encoding unit 601 and the adaptive offset filter parameters set by the encoding unit 602, and transmits the set adaptive offset filter parameters.

Note that, as described above, adaptive offset filter parameters set by the encoding unit 601 may be set so as to be shared and used by the encoding unit 601 and the encoding unit 602, and may be transmitted. Conversely, adaptive offset filter parameters collectively set by the encoding unit 602 may be set so as to be shared and used by the encoding unit 601 and the encoding unit 602, and may be transmitted.

[Multi-View Image Decoding Device]

Figure 23:
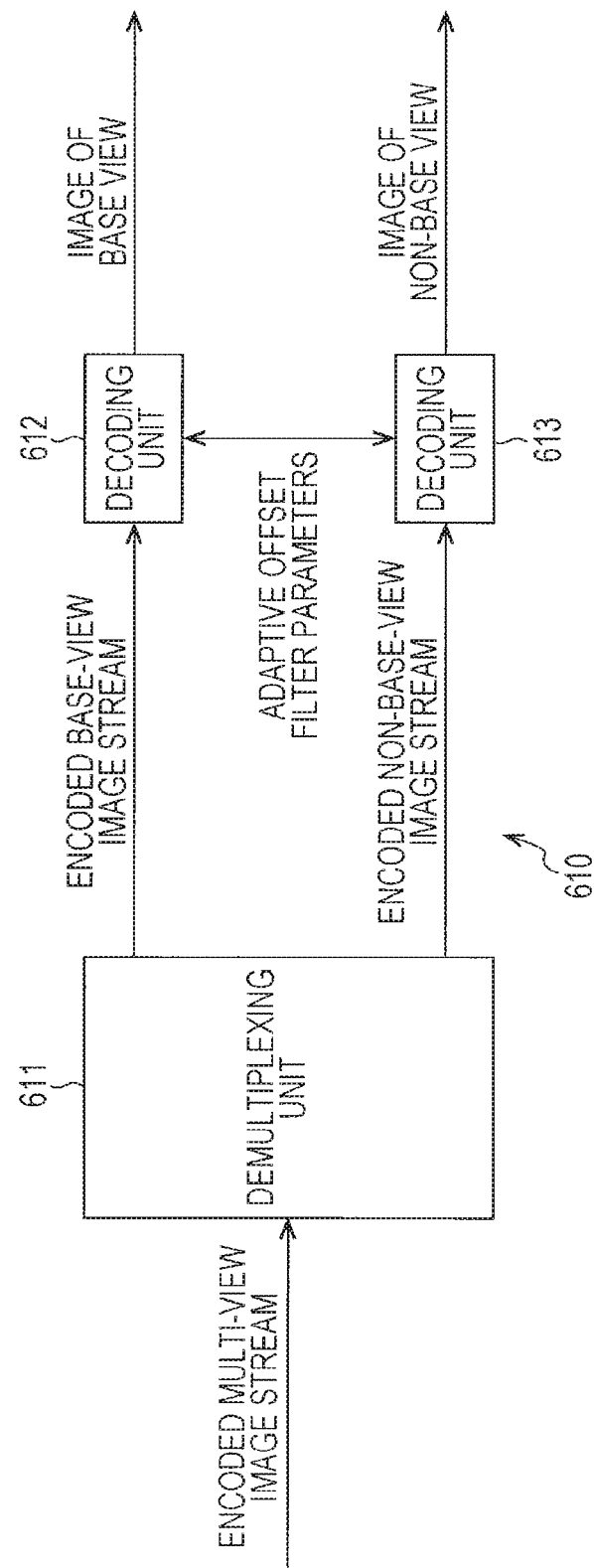
FIG. 23 is a diagram illustrating a main example configuration of a multi-view image decoding device to which the present technology is applied.

FIG. 23 is a diagram illustrating a multi-view image decoding device for performing the multi-view image decoding operation described above. As illustrated in FIG. 23, a multi-view image decoding device 610 includes a demultiplexing unit 611, a decoding unit 612, and a decoding unit 613.

The demultiplexing unit 611 demultiplexes an encoded multi-view image stream in which an encoded base-view image stream and an encoded non-base-view image stream have been multiplexed, and extracts the encoded base-view image stream and the encoded non-base-view image stream. The decoding unit 612 decodes the encoded base-view image stream extracted by the demultiplexing unit 611 to obtain an image of a base view. The decoding unit 613 decodes the encoded non-base-view image stream extracted by the demultiplexing unit 611 to obtain an image of a non-base view.

The image decoding device 51 (FIG. 3) can be used for each of the decoding unit 612 and the decoding unit 613 of the multi-view image decoding device 610. In this case, the multi-view image decoding device 610 performs processing using the adaptive offset filter parameters set by the encoding unit 601 and decoded by the decoding unit 612 and the adaptive offset filter parameters set by the encoding unit 602 and decoded by the decoding unit 613.

Note that, as described above, in some cases, adaptive offset filter parameters set by the encoding unit 601 (or the encoding unit 602) may be set so as to be shared and used by the encoding unit 601 and the encoding unit 602, and may be transmitted. In such cases, in the multi-view image decoding device 610, processing is performed using adaptive offset filter parameters set by the encoding unit 601 (or the encoding unit 602) and decoded by the decoding unit 612 (or the decoding unit 613).

5. Third Embodiment

[Application to Layered Image Encoding/Layered Image Decoding]

Figure 24:
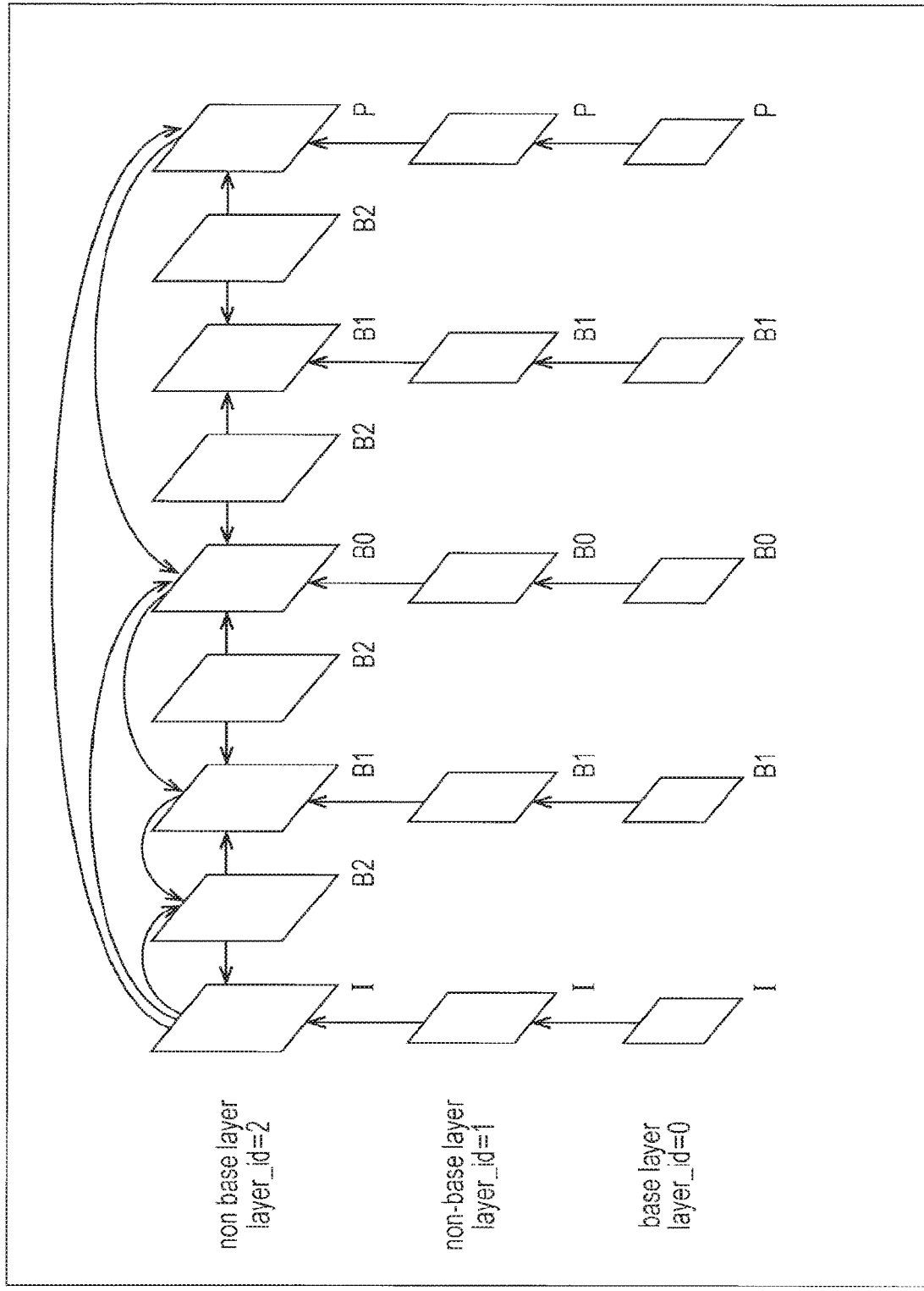
FIG. 24 is a diagram illustrating an example of a layered image encoding scheme.

The series of processes described above may be applied to layered image encoding and layered image decoding. FIG. 24 illustrates an example of a layered image encoding scheme.

As illustrated in FIG. 24, layered images include images of a plurality of layers (resolutions), and an image of a certain one of the plurality of resolutions is designated as an image of a base layer. The images other than the image of the base layer are handled as images of non-base layers (also referred to as enhancement layers).

In a case where layered image encoding (spatial scalability) as in FIG. 24 is performed, adaptive offset filter parameters can be set in each layer (the same layer). In addition, in each layer (different layers), adaptive offset filter parameters set in another layer can also be shared.

In this case, adaptive offset filter parameters set in the base layer are used in at least one non-base layer. Alternatively, for example, adaptive offset filter parameters set in a non-base layer (layer_id=i) are used in at least one of the base layer and non-base layer (layer_id=j).

Accordingly, processing efficiency can be improved.

[Layered Image Encoding Device]

Figure 25:
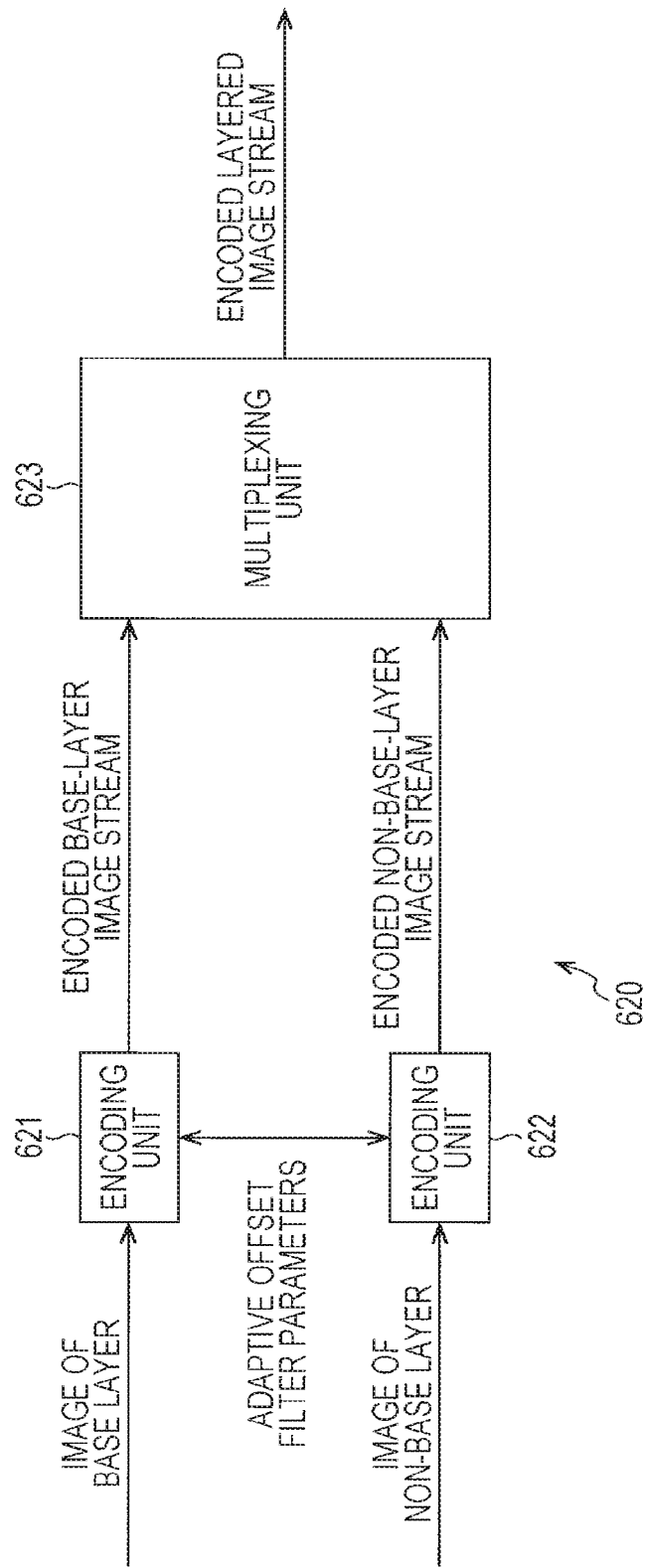
FIG. 25 is a diagram illustrating a main example configuration of a layered image encoding device to which the present technology is applied.

FIG. 25 is a diagram illustrating a layered image encoding device for performing the layered image encoding operation described above. As illustrated in FIG. 25, a layered image encoding device 620 includes an encoding unit 621, an encoding unit 622, and a multiplexing unit 623.

The encoding unit 621 encodes an image of a base layer to generate an encoded base-layer image stream. The encoding unit 622 encodes an image of a non-base layer to generate an encoded non-base-layer image stream. The multiplexing unit 623 multiplexes the encoded base-layer image stream generated by the encoding unit 621 and the encoded non-base-layer image stream generated by the encoding unit 622 to generate an encoded layered-image stream.

The image encoding device 11 (FIG. 1) can be used for each of the encoding unit 621 and the encoding unit 622 of the layered image encoding device 620. In this case, the layered image encoding device 620 sets the adaptive offset filter parameters set by the encoding unit 621 and the adaptive offset filter parameters set by the encoding unit 602, and transmits the set adaptive offset filter parameters.

Note that, as described above, adaptive offset filter parameters set by the encoding unit 621 may be set so as to be shared and used by the encoding unit 621 and the encoding unit 622, and may be transmitted. Conversely, adaptive offset filter parameters set by the encoding unit 622 may be set so as to be shared and used by the encoding unit 621 and the encoding unit 622, and may be transmitted.

[Layered Image Decoding Device]

Figure 26:
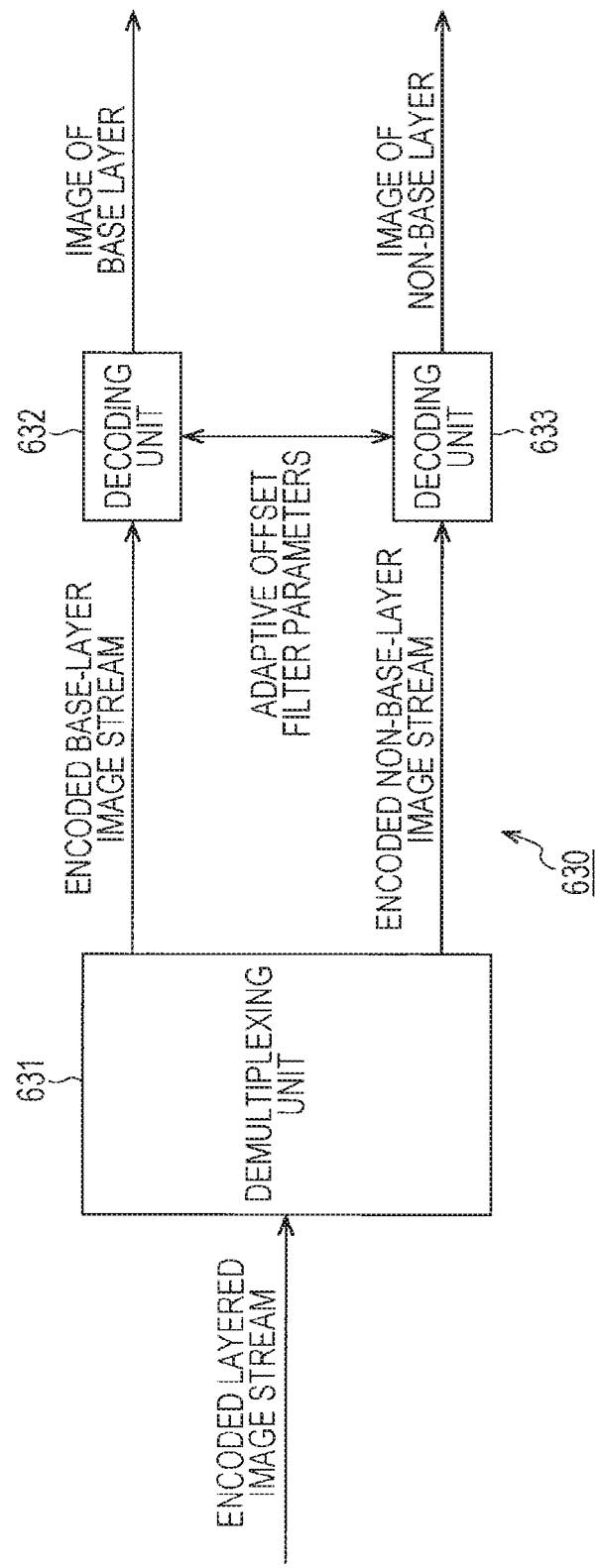
FIG. 26 is a diagram illustrating a main example configuration of a layered image decoding device to which the present technology is applied.

FIG. 26 is a diagram illustrating a layered image decoding device for performing the layered image decoding operation described above. As illustrated in FIG. 26, a layered image decoding device 630 includes a demultiplexing unit 631, a decoding unit 632, and a decoding unit 633.

The demultiplexing unit 631 demultiplexes an encoded layered-image stream in which an encoded base-layer image stream and an encoded non-base-layer image stream have been multiplexed, and extracts the encoded base-layer image stream and the encoded non-base-layer image stream. The decoding unit 632 decodes the encoded base-layer image stream extracted by the demultiplexing unit 631 to obtain an image of a base layer. The decoding unit 633 decodes the encoded non-base-layer image stream extracted by the demultiplexing unit 631 to obtain an image of a non-base layer.

The image decoding device 51 (FIG. 3) can be used for each of the decoding unit 632 and the decoding unit 633 of the layered image decoding device 630. In this case, the layered image decoding device 630 performs processing using the adaptive offset filter parameters set by the encoding unit 621 and decoded by the decoding unit 632 and the adaptive offset filter parameters set by the encoding unit 622 and decoded by the decoding unit 633.

Note that, as described above, in some cases, adaptive offset filter parameters set by the encoding unit 621 (or the encoding unit 622) may be set so as to be shared and used by the encoding unit 621 and the encoding unit 622, and may be transmitted. In this case, in the layered image decoding device 630, processing is performed using adaptive offset filter parameters set by the encoding unit 621 (or the encoding unit 622) and decoded by the decoding unit 632 (or the decoding unit 633).

6. Fourth Embodiment

[Example Configuration of Computer]

The series of processes described above may be executed by hardware or may be executed by software. If the series of processes is to be executed by software, a program constituting the software is installed in a computer. Here, examples of the computer include a computer incorporated in dedicated hardware, and a computer capable of executing various functions by the installation of various programs, for example, a general-purpose personal computer.

Figure 27:
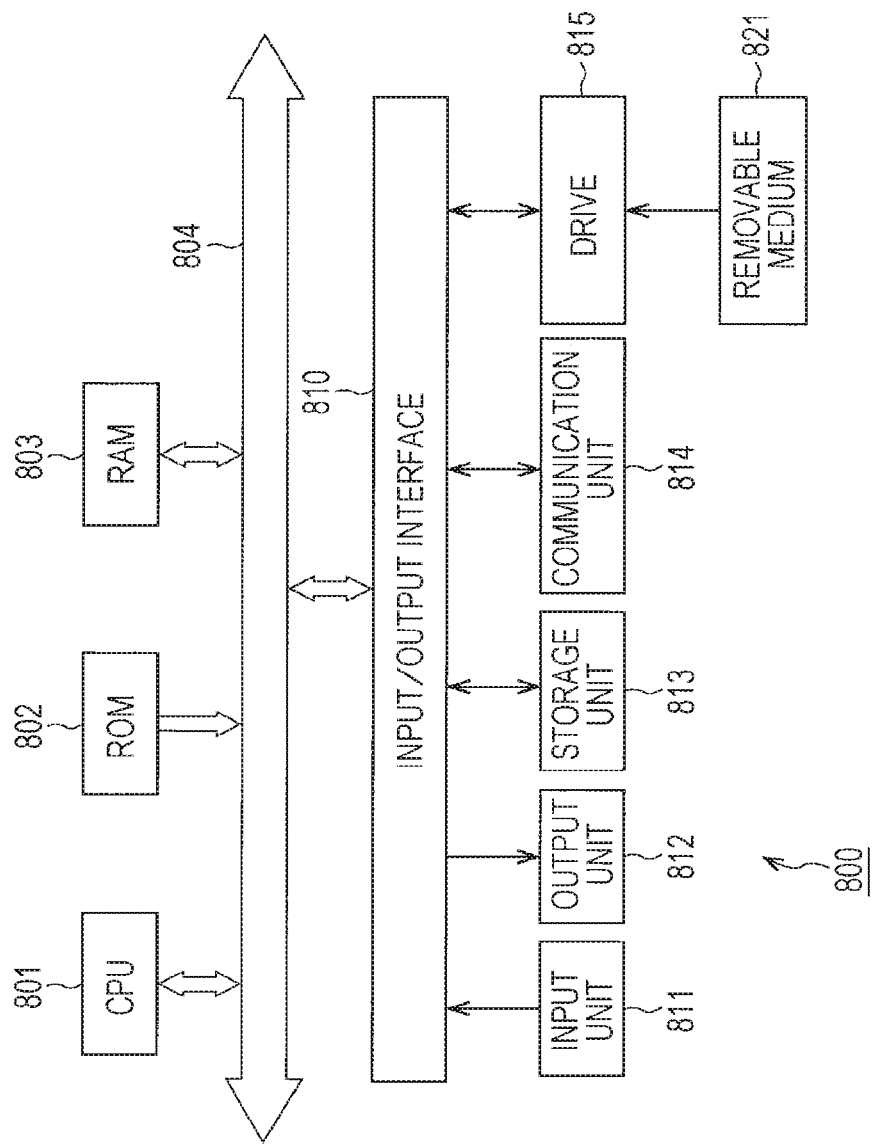
FIG. 27 is a block diagram illustrating a main example configuration of a computer.

FIG. 27 is a block diagram illustrating an example configuration of hardware of a computer that executes the series of processes described above in accordance with a program.

In a computer 800, a CPU (Central Processing Unit) 801, a ROM (Read Only Memory) 802, and a RAM (Random Access Memory) 803 are connected to one another via a bus 804.

An input/output interface 805 is further connected to the bus 804. An input unit 806, an output unit 807, a storage unit 808, a communication unit 809, and a drive 810 are connected to the input/output interface 805.

The input unit 806 includes a keyboard, a mouse, a microphone, and so forth. The output unit 807 includes a display, a speaker, and so forth. The storage unit 808 includes a hard disk, a non-volatile memory, and so forth. The communication unit 809 includes a network interface and so forth. The drive 810 drives a removable medium 811 such as a magnetic disk, an optical disk, a magneto-optical disk, or a semiconductor memory.

In the computer having the configuration described above, the CPU 801 loads a program stored in, for example, the storage unit 808 into the RAM 803 through the input/output interface 805 and the bus 804, and executes the program. Accordingly, the series of processes described above is performed.

The program executed by the computer 800 (the CPU 801) may be provided in the form of being recorded on the removable medium 811, for example, a package medium. In addition, the program may also be provided through a wired or wireless transmission medium such as a local area network, the Internet, or digital satellite broadcasting.

In the computer, the removable medium 811 is set in the drive 810, thereby allowing the program to be installed into the storage unit 808 through the input/output interface 805. In addition, the program may be received by the communication unit 809 through a wired or wireless transmission medium, and may be installed into the storage unit 808. Alternatively, the program may be installed in advance in the ROM 802 or the storage unit 808.

Note that the program which the computer executes may be a program in which processing operations are performed in a time-series manner in the order stated herein, or may be a program in which processing operations are performed in parallel or at necessary timing such as when called.

In addition, steps describing a program stored in a recording medium, as used herein, include, of course, processing operations performed in a time-series manner in the order stated, and processing operations executed in parallel or individually but not necessarily performed in a time-series manner.

Furthermore, the term "system", as used herein, refers to an overall apparatus including a plurality of devices (apparatuses).

In addition, a configuration described above as a single device (or processing unit) may be divided into a plurality of devices (or processing units). Conversely, a configuration described above as a plurality of devices (or processing units) may be combined into a single device (or processing unit). Additionally, of course, a configuration other than that described above may be added to the configuration of each device (or each processing unit). Furthermore, part of the configuration of a certain device (or processing unit) may be included in the configuration of another device (or another processing unit) if the devices (or processing units) have substantially the same configuration and/or operation in terms of a whole system. In other words, embodiments of the present technology are not limited to the foregoing embodiments, and a variety of modifications can be made without departing from the scope of the present technology.

The image encoding device and the image decoding device according to the foregoing embodiments may be applied to various pieces of electronic equipment such as a transmitter or a receiver used to deliver data via satellite broadcasting, wire broadcasting such as cable TV, or the Internet or used to deliver data to or from terminals via cellular communication, a recording apparatus for recording images on media such as an optical disk, a magnetic disk, and a flash memory, and a reproducing apparatus for reproducing images from such storage media. Four exemplary applications will be described hereinafter.

7. Exemplary Applications

First Exemplary Application: Television Receiver

Figure 28:
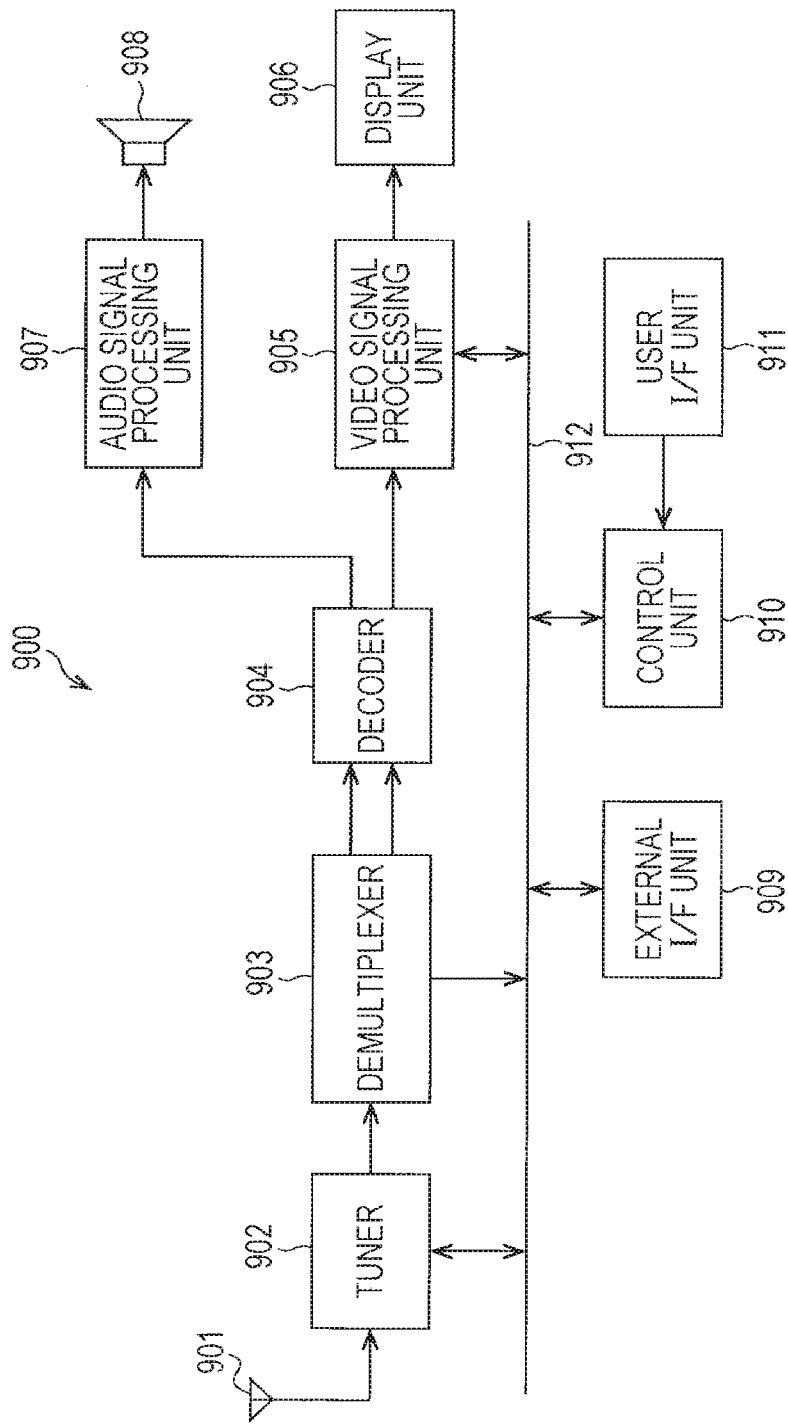
FIG. 28 is a block diagram illustrating an example of a schematic configuration of a television apparatus.

FIG. 28 illustrates an example of a schematic configuration of a television apparatus to which the foregoing embodiments are applied. A television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal on a desired channel from a broadcast signal received via the antenna 901, and demodulates the extracted signal. Then, the tuner 902 outputs an encoded bit stream obtained through demodulation to the demultiplexer 903. In other words, the tuner 902 functions as a transmission means in the television apparatus 900 for receiving an encoded stream including encoded images.

The demultiplexer 903 demultiplexes, from the encoded bit stream, a video stream and an audio stream of a program to be viewed, and outputs the demultiplexed streams to the decoder 904. Further, the demultiplexer 903 extracts auxiliary data such as EPG (Electronic Program Guide) from the encoded bit stream, and supplies the extracted data to the control unit 910. Note that the demultiplexer 903 may also descramble the encoded bit stream if the encoded bit stream has been scrambled.

The decoder 904 decodes the video stream and audio stream input from the demultiplexer 903. Then, the decoder 904 outputs video data obtained by a decoding process to the video signal processing unit 905. The decoder 904 further outputs audio data generated by a decoding process to the audio signal processing unit 907.

The video signal processing unit 905 reproduces the video data input from the decoder 904, and causes video to be displayed on the display unit 906. The video signal processing unit 905 may also cause an application screen supplied via a network to be displayed on the display unit 906. The video signal processing unit 905 may further perform additional processing, such as noise removal, on the video data in accordance with the settings. In addition, the video signal processing unit 905 may also generate a GUI (Graphical User Interface) image such as a menu, a button, or a cursor, and superimpose the generated image on an output image.

The display unit 906 is driven by a drive signal supplied from the video signal processing unit 905, and displays video or an image on a video surface of a display device (such as a liquid crystal display, a plasma display, or an OELD (Organic ElectroLuminescence Display) (organic EL display)).

The audio signal processing unit 907 performs a reproduction process including D/A conversion, amplification, and so forth on the audio data input from the decoder 904, and causes audio to be output from the speaker 908. The audio signal processing unit 907 may further perform additional processing, such as noise removal, on the audio data.

The external interface 909 is an interface for connecting the television apparatus 900 to an external device or a network. For example, a video stream or audio stream received via the external interface 909 may be decoded by the decoder 904. In other words, the external interface 909 also functions as a transmission means in the television apparatus 900 for receiving an encoded stream including encoded images.

The control unit 910 includes a processor such as a CPU, and memories such as a RAM and a ROM. The memories store a program to be executed by the CPU, program data, EPG data, data acquired via a network, and so forth. The program stored in the memories is read and executed by the CPU when, for example, the television apparatus 900 is started. The CPU executes the program to control the operation of the television apparatus 900 in accordance with, for example, an operation signal input from the user interface 911.

The user interface 911 is connected to the control unit 910. The user interface 911 includes, for example, buttons and switches for allowing the user to operate the television apparatus 900, a reception unit for a remote control signal, and so forth. The user interface 911 detects an operation of the user via the above-described components to generate an operation signal, and outputs the generated operation signal to the control unit 910.

The bus 912 serves to connect the tuner 902, the demultiplexer 903, the decoder 904, the video signal processing unit 905, the audio signal processing unit 907, the external interface 909, and the control unit 910 to one another.

In the television apparatus 900 having the configuration described above, the decoder 904 has the function of the image decoding device according to the foregoing embodiments. Accordingly, processing efficiency can be improved when the television apparatus 900 decodes an image.

Second Exemplary Application: Mobile Phone

Figure 29:
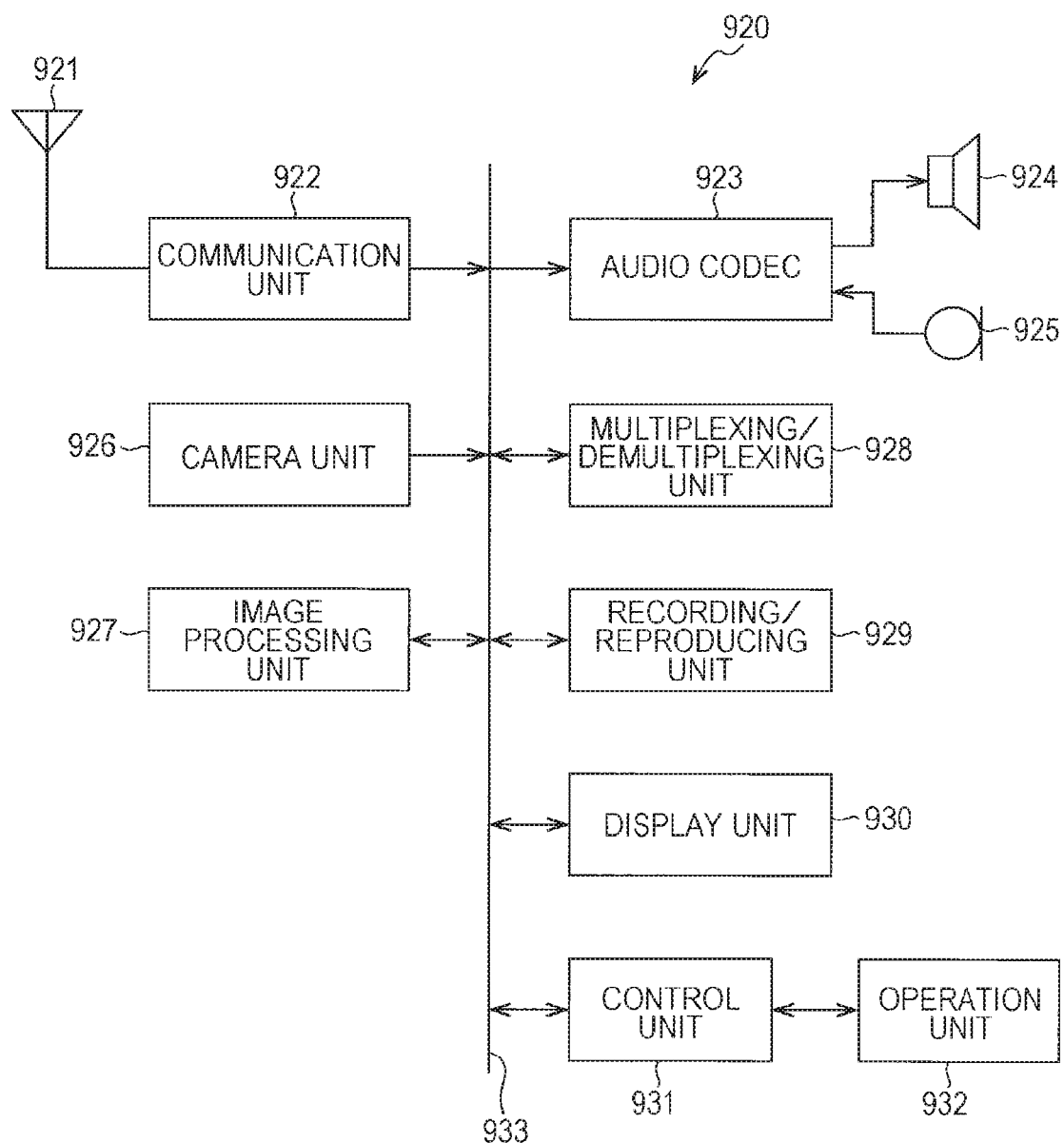
FIG. 29 is a block diagram illustrating an example of a schematic configuration of a mobile phone.

FIG. 29 illustrates an example of a schematic configuration of a mobile phone to which the foregoing embodiments are applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 serves to connect the communication unit 922, the audio codec 923, the camera unit 926, the image processing unit 927, the multiplexing/demultiplexing unit 928, the recording/reproducing unit 929, the display unit 930, and the control unit 931 to one another.

The mobile phone 920 performs operations, such as transmitting and receiving an audio signal, transmitting and receiving an electronic mail or image data, capturing an image, and recording data, in various operation modes including a voice call mode, a data communication mode, an image capture mode, and a videophone mode.

In the voice call mode, an analog audio signal generated by the microphone 925 is supplied to the audio codec 923. The audio codec 923 converts the analog audio signal into audio data, and performs A/D conversion and compression on the converted audio data. The audio codec 923 then outputs the compressed audio data to the communication unit 922. The communication unit 922 encodes and modulates the audio data, and generates a transmission signal. The communication unit 922 then transmits the generated transmission signal to a base station (not illustrated) via the antenna 921. Further, the communication unit 922 amplifies a radio signal received via the antenna 921, and performs frequency conversion on the amplified signal to acquire a reception signal. Then, the communication unit 922 demodulates and decodes the reception signal to generate audio data, and outputs the generated audio data to the audio codec 923. The audio codec 923 expands the audio data, and performs D/A conversion to generate an analog audio signal. The audio codec 923 then supplies the generated audio signal to the speaker 924 to cause audio to be output.

Furthermore, in the data communication mode, for example, the control unit 931 generates text data that forms an electronic mail in accordance with an operation of the user via the operation unit 932. Further, the control unit 931 causes text to be displayed on the display unit 930. The control unit 931 further generates electronic mail data in accordance with a transmission instruction given from the user via the operation unit 932, and outputs the generated electronic mail data to the communication unit 922. The communication unit 922 encodes and modulates the electronic mail data to generate a transmission signal. Then, the communication unit 922 transmits the generated transmission signal to the base station (not illustrated) via the antenna 921. Further, the communication unit 922 amplifies a radio signal received via the antenna 921, and performs frequency conversion on the amplified signal to acquire a reception signal. Then, the communication unit 922 demodulates and decodes the reception signal to restore electronic mail data, and outputs the restored electronic mail data to the control unit 931. The control unit 931 causes the content of the electronic mail to be displayed on the display unit 930, and also causes the electronic mail data to be stored in a storage medium of the recording/reproducing unit 929.

The recording/reproducing unit 929 includes a desired readable/writable storage medium. The storage medium may be, for example, a built-in storage medium such as a RAM or a flash memory, or an external storage medium such as a hard disk, a magnetic disk, a magneto-optical disk, an optical disk, a USB (Unallocated Space Bitmap) memory, or a memory card.

Furthermore, in the image capture mode, for example, the camera unit 926 captures an image of an object to generate image data, and outputs the generated image data to the image processing unit 927. The image processing unit 927 encodes the image data input from the camera unit 926, and causes an encoded stream to be stored in the storage medium of the recording/reproducing unit 929.

Furthermore, in the videophone mode, for example, the multiplexing/demultiplexing unit 928 multiplexes the video stream encoded by the image processing unit 927 and the audio stream input from the audio codec 923, and outputs a multiplexed stream to the communication unit 922. The communication unit 922 encodes and modulates the stream to generate a transmission signal. Then, the communication unit 922 transmits the generated transmission signal to a base station (not illustrated) through the antenna 921. Further, the communication unit 922 amplifies a radio signal received through the antenna 921, and performs frequency conversion on the amplified signal to acquire a reception signal. The transmission signal and the reception signal may include an encoded bit stream. Then, the communication unit 922 demodulates and decodes the reception signal to restore a stream, and outputs the restored stream to the multiplexing/demultiplexing unit 928. The multiplexing/demultiplexing unit 928 demultiplexes, from the input stream, a video stream and an audio stream, and outputs the video stream and the audio stream to the image processing unit 927 and the audio codec 923, respectively. The image processing unit 927 decodes the video stream to generate video data. The video data is supplied to the display unit 930, and a series of images is displayed by the display unit 930. The audio codec 923 expands the audio stream, and performs D/A conversion to generate an analog audio signal. The audio codec 923 then supplies the generated audio signal to the speaker 924 to cause audio to be output.

In the mobile phone 920 having the configuration described above, the image processing unit 927 has the function of the image encoding device and the image decoding device according to the foregoing embodiments. Accordingly, processing efficiency can be improved when the mobile phone 920 encodes and decodes an image.

Third Exemplary Application:
Recording/Reproducing Apparatus

Figure 30:
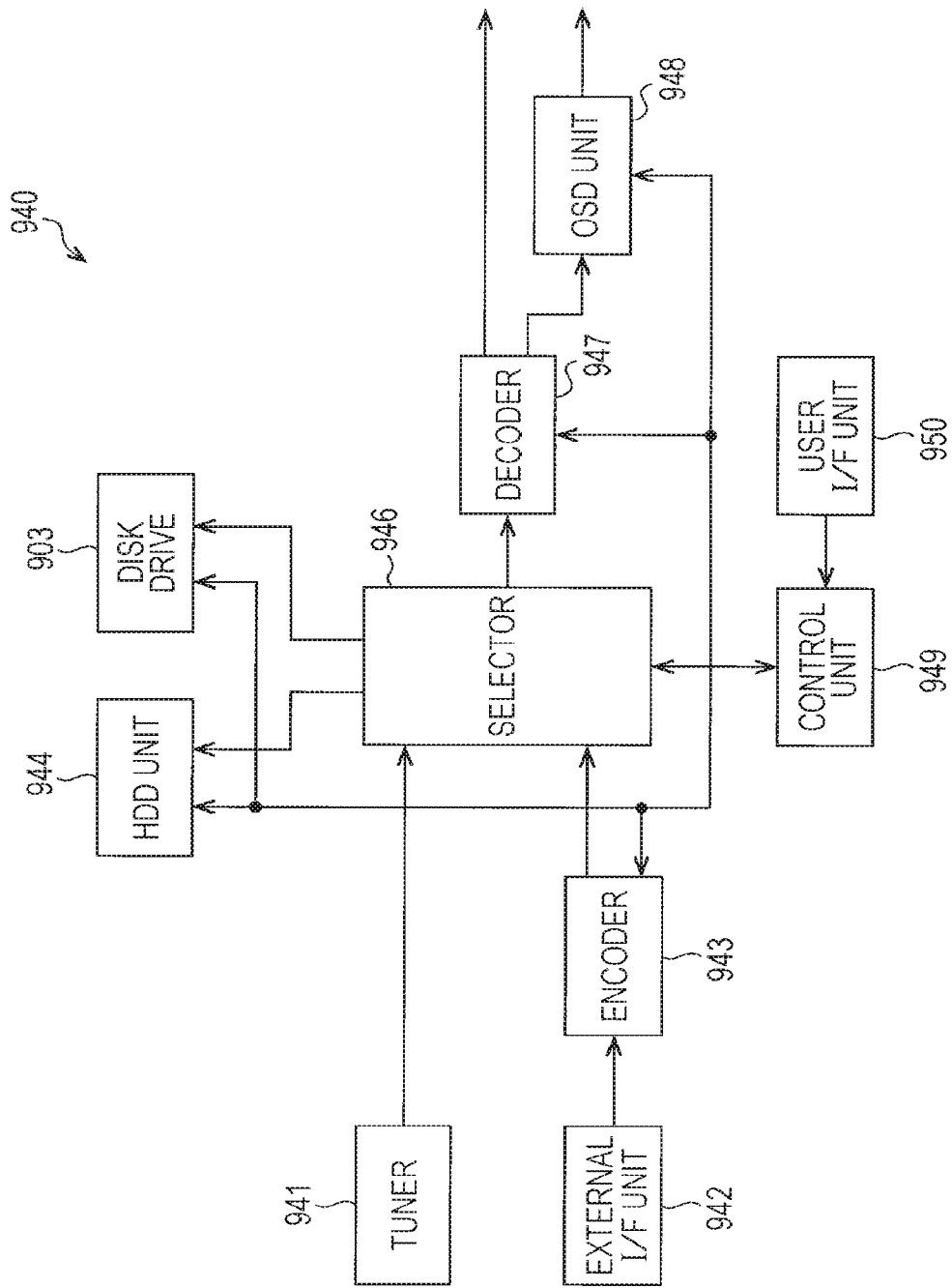
FIG. 30 is a block diagram illustrating an example of a schematic configuration of a recording/reproducing apparatus.

FIG. 30 illustrates an example of a schematic configuration of a recording/reproducing apparatus to which the foregoing embodiments are applied. A recording/reproducing apparatus 940 encodes, for example, audio data and video data of a received broadcast program, and records the encoded audio data and video data on a recording medium. In addition, the recording/reproducing apparatus 940 may also encode audio data and video data acquired from, for example, another apparatus, and record the encoded audio data and video data on a recording medium. Furthermore, the recording/reproducing apparatus 940 reproduces data recorded on a recording medium using a monitor and a speaker in accordance with, for example, an instruction given from a user. In this case, the recording/reproducing apparatus 940 decodes audio data and video data.

The recording/reproducing apparatus 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal on a desired channel from a broadcast signal received via an antenna (not illustrated), and demodulates the extracted signal. The tuner 941 then outputs an encoded bit stream obtained through demodulation to the selector 946. In other words, the tuner 941 functions as a transmission means in the recording/reproducing apparatus 940.

The external interface 942 is an interface for connecting the recording/reproducing apparatus 940 to an external device or a network. The external interface 942 may be, for example, an IEEE 1394 interface, a network interface, a USB interface, a flash memory interface, or the like. For example, video data and audio data received via the external interface 942 are input to the encoder 943. In other words, the external interface 942 functions as a transmission means in the recording/reproducing apparatus 940.

The encoder 943 encodes video data and audio data input from the external interface 942 if the video data and audio data have not been encoded. The encoder 943 then outputs an encoded bit stream to the selector 946.

The HDD 944 records an encoded bit stream including compressed content data such as video and audio, various programs, and other data on an internal hard disk. Further, the HDD 944 reads the above-described data from the hard disk when reproducing video and audio.

The disk drive 945 records and reads data on and from a recording medium placed therein. The recording medium placed in the disk drive 945 may be, for example, a DVD disk (such as DVD-Video, DVD-RAM, DVD-R, DVD-RW, DVD+R, or DVD+RW), a Blu-ray (registered trademark) disc, or the like.

The selector 946 selects an encoded bit stream input from the tuner 941 or the encoder 943 when recording video and audio, and outputs the selected encoded bit stream to the HDD 944 or the disk drive 945. When reproducing video and audio, the selector 946 outputs an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 further outputs the generated audio data to an external speaker.

The OSD 948 reproduces the video data input from the decoder 947, and displays video. In addition, the OSD 948 may also superimpose a GUI image such as a menu, a button, or a cursor on the video to be displayed.

The control unit 949 includes a processor such as a CPU, and memories such as a RAM and a ROM. The memories store a program to be executed by the CPU, program data, and so forth. The program stored in the memories is read and executed by the CPU when, for example, the recording/reproducing apparatus 940 is started. The CPU executes the program to control the operation of the recording/reproducing apparatus 940 in accordance with, for example, an operation signal input from the user interface 950.

The user interface 950 is connected to the control unit 949. The user interface 950 includes, for example, buttons and switches for allowing the user to operate the recording/reproducing apparatus 940, a reception unit for a remote control signal, and so forth. The user interface 950 detects an operation of the user via the above-described components to generate an operation signal, and outputs the generated operation signal to the control unit 949.

In the recording/reproducing apparatus 940 having the configuration described above, the encoder 943 has the function of the image encoding device according to the foregoing embodiments. Further, the decoder 947 has the function of the image decoding device according to the foregoing embodiments. Accordingly, processing efficiency can be improved when the recording/reproducing apparatus 940 encodes and decodes an image.

Fourth Exemplary Application: Imaging Apparatus

Figure 31:
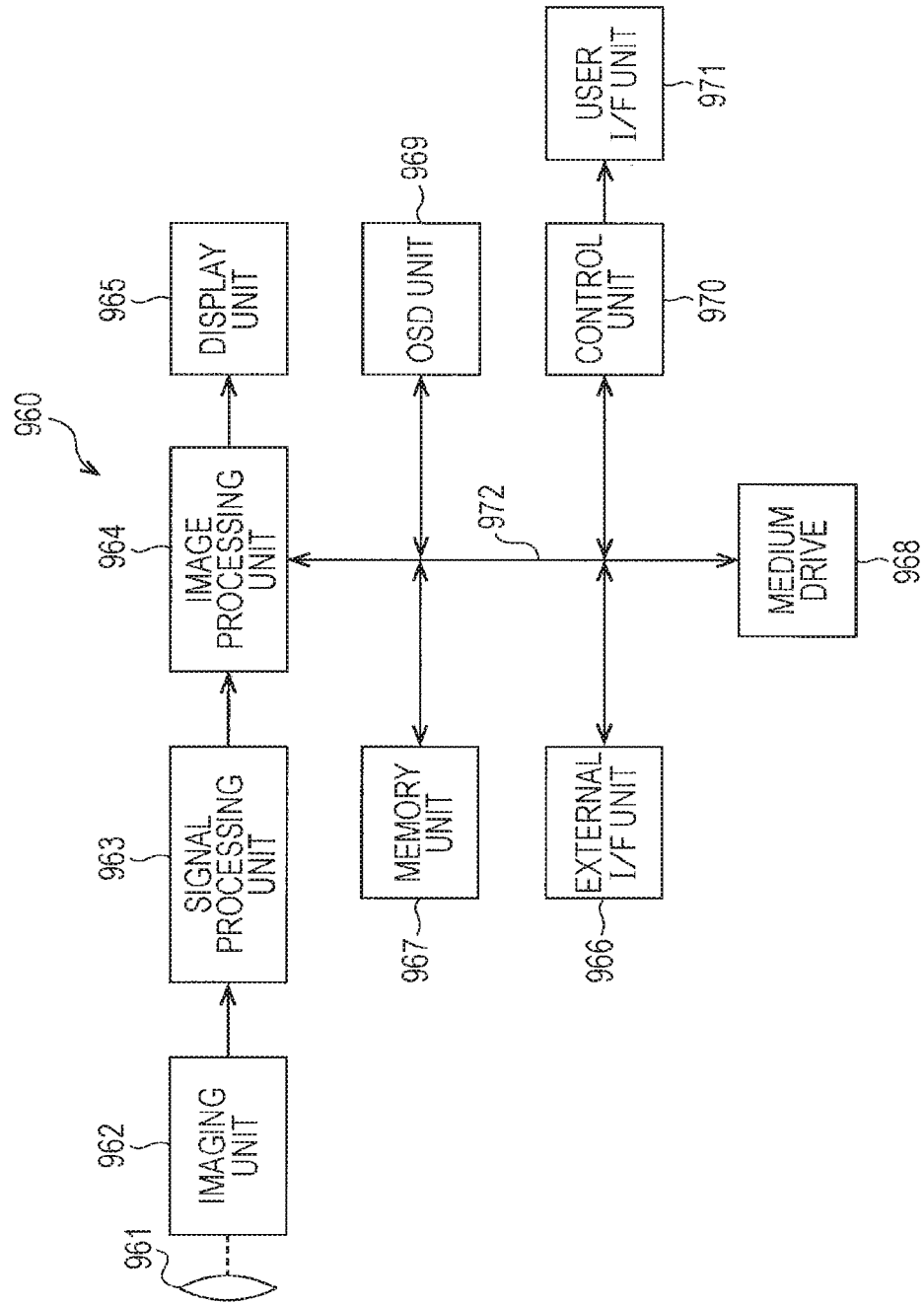
FIG. 31 is a block diagram illustrating an example of a schematic configuration of an imaging apparatus.

FIG. 31 illustrates an example of a schematic configuration of an imaging apparatus to which the foregoing embodiments are applied. An imaging apparatus 960 captures an image of an object to generate image data, encodes the image data, and records the encoded image data on a recording medium.

The imaging apparatus 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 serves to connect the image processing unit 964, the external interface 966, the memory 967, the medium drive 968, the OSD 969, and the control unit 970 to one another.

The optical block 961 includes a focus lens, an aperture mechanism, and so forth. The optical block 961 forms an optical image of the object on an imaging surface of the imaging unit 962. The imaging unit 962 includes an image sensor such as a CCD (Charge Coupled Device) or CMOS (Complementary Metal Oxide Semiconductor) image sensor, and converts the optical image formed on the imaging surface into an image signal serving as an electrical signal by performing photoelectric conversion. The imaging unit 962 then outputs the image signal to the signal processing unit 963.

The signal processing unit 963 performs various camera signal processing operations, such as knee correction, gamma correction, and color correction, on the image signal input from the imaging unit 962. The signal processing unit 963 outputs the image data subjected to the camera signal processing operations to the image processing unit 964.

The image processing unit 964 encodes the image data input from the signal processing unit 963 to generate encoded data. The image processing unit 964 then outputs the generated encoded data to the external interface 966 or the medium drive 968. Further, the image processing unit 964 decodes the encoded data input from the external interface 966 or the medium drive 968 to generate image data. The image processing unit 964 then outputs the generated image data to the display unit 965. In addition, the image processing unit 964 may also output the image data input from the signal processing unit 963 to the display unit 965 to cause an image to be displayed. In addition, the image processing unit 964 may also superimpose display data acquired from the OSD 969 on the image to be output to the display unit 965.

The OSD 969 generates a GUI image such as a menu, a button, or a cursor, and outputs the generated image to the image processing unit 964.

The external interface 966 is formed as, for example, a USB input/output terminal. The external interface 966 connects, for example, the imaging apparatus 960 to a printer when printing an image. A drive is further connected to the external interface 966, if necessary. A removable medium such as a magnetic disk or an optical disk is placed in the drive, and a program read from the removable medium may be installed into the imaging apparatus 960. In addition, the external interface 966 may also be formed as a network interface to be connected to a network such as a LAN or the Internet. In other words, the external interface 966 functions as a transmission means in the imaging apparatus 960.

The recording medium to be placed in the medium drive 968 may be, for example, any readable/writable removable medium such as a magnetic disk, a magneto-optical disk, an optical disk, or a semiconductor memory. Alternatively, a recording medium may be fixedly attached to the medium drive 968, and may form a built-in hard disk drive or a non-portable storage unit such as an SSD (Solid State Drive).

The control unit 970 includes a processor such as a CPU, and memories such as a RAM and a ROM. The memories store a program to be executed by the CPU, program data, and so forth. The program stored in the memories is read and executed by the CPU when, for example, the imaging apparatus 960 is started. The CPU executes the program to control the operation of the imaging apparatus 960 in accordance with, for example, an operation signal input from the user interface 971.

The user interface 971 is connected to the control unit 970. The user interface 9'71 includes, for example, buttons, switches, and so forth for allowing the user to operate the imaging apparatus 960. The user interface 971 detects an operation of the user via the above-described components to generate an operation signal, and outputs the generated operation signal to the control unit 970.

In the imaging apparatus 960 having the configuration described above, the image processing unit 964 has the function of the image encoding device and the image decoding device according to the foregoing embodiments. Accordingly, processing efficiency can be improved when the imaging apparatus 960 encodes and decodes an image.

<8. Exemplary Applications of Scalable Coding>

[First System]

Next, a specific example of use of scalable coded data which has been scalably coded (hierarchically coded) described above with reference to FIG. 24 to FIG. 26 will be described. Scalable coding is used for, for example, the selection of data to be transmitted, as in an example illustrated in FIG. 32.

Figure 32:
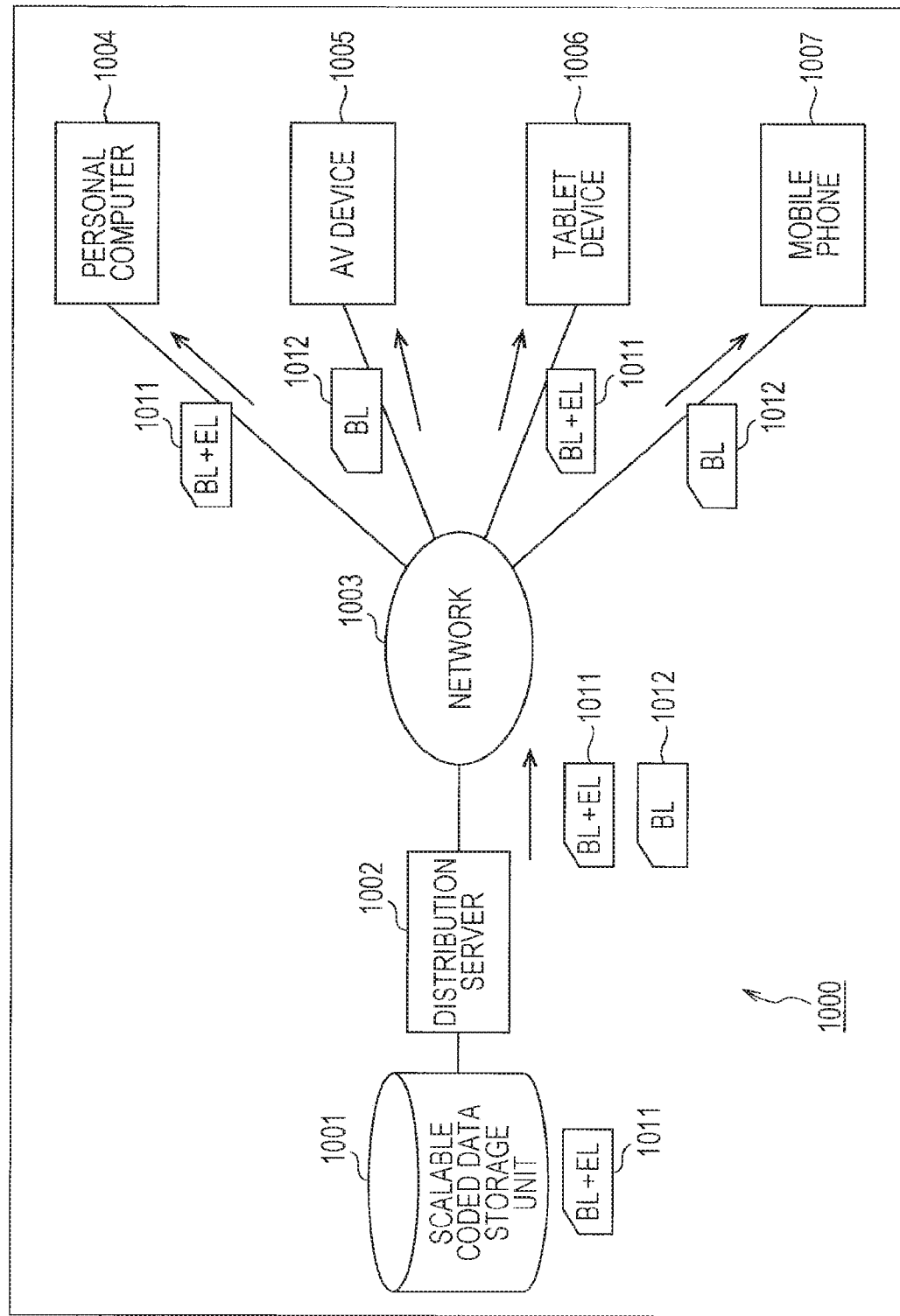
FIG. 32 is a block diagram illustrating an example of the use of scalable coding.

In a data transmission system 1000 illustrated in FIG. 32, a distribution server 1002 reads scalable coded data stored in a scalable coded data storage unit 1001, and distributes the scalable coded data to terminal devices, such as a personal computer 1004, an AV device 1005, a tablet device 1006, and a mobile phone 1007, via a network 1003.

In this case, the distribution server 1002 selects encoded data having desired quality in accordance with the performance of the terminal device, the communication environment, and the like, and transmits the selected encoded data. Even if the distribution server 1002 transmits data having quality higher than necessary, the terminal device may not be able to always obtain a high-quality image, and delay or overflow may be caused. In addition, such data may occupy the communication bandwidth more than necessary, or may increase the load on the terminal device more than necessary. Conversely, even if the distribution server 1002 transmits data having quality lower than necessary, the terminal device may not be able to obtain an image with a sufficient quality. Thus, the distribution server 1002 reads the scalable coded data stored in the scalable coded data storage unit 1001, if necessary, as encoded data having quality appropriate for the performance of the terminal device, communication environment, and the like, and transmits the read encoded data.

For example, it is assumed that the scalable coded data storage unit 1001 stores scalable coded data (BL+EL) 1011 which has been scalably coded. The scalable coded data (BL+EL) 1011 is encoded data including a base layer and an enhancement layer, and is data which is decoded to obtain both an image of the base layer and an image of the enhancement layer.

The distribution server 1002 selects an appropriate layer in accordance with the performance of a terminal device that transmits data, the communication environment, and the like, and reads the data of the layer. For example, the distribution server 1002 reads high-quality scalable coded data (BL+EL) 1011 from the scalable coded data storage unit 1001, and transmits the read scalable coded data (BL+EL) 1011 to devices having high processing capabilities, namely, the personal computer 1004 or the tablet device 1006, as it is. In contrast, for example, the distribution server 1002 extracts the data of the base layer from the scalable coded data (BL+EL) 1011, and transmits the extracted data of the base layer to devices having low processing capabilities, namely, the AV device 1005 and the mobile phone 1007, as scalable coded data (BL) 1012 having the same content as the scalable coded data (BL+EL) 1011 but having lower quality than the scalable coded data (BL+EL) 1011.

The use of scalable coded data in this manner facilitates the adjustment of the amount of data, thereby suppressing the occurrence of delay or overflow and suppressing an unnecessary increase in the load on a terminal device or a communication medium. Furthermore, the scalable coded data (BL+EL) 1011 has reduced redundancy between layers, and therefore has a smaller amount of data than data having individually encoded data of the respective layers. Accordingly, the storage area of the scalable coded data storage unit 1001 can be more efficiently utilized.

Note that since various devices such as the personal computer 1004, the AV device 1005, the tablet device 1006, and the mobile phone 1007 are applicable as terminal devices, the hardware performance of terminal devices differs from device to device. In addition, since various applications may be executed by terminal devices, the software capabilities of the applications may vary. Furthermore, the network 1003 serving as a communication medium may be implemented as any communication line network which can be wired, wireless, or both, such as the Internet and a LAN (Local Area Network), and data transmission capabilities vary. Such performance and capabilities may vary depending on other communication and the like.

Accordingly, prior to the start of transmission of data, the distribution server 1002 may communicate with a terminal device to which the data is to be transmitted, and may obtain information concerning the capabilities of the terminal device, such as the hardware performance of the terminal device or the performance of application (software) executed by the terminal device, and also information concerning the communication environment, such as the available bandwidth of the network 1003. In addition, the distribution server 1002 may select an appropriate layer on the basis of the obtained information.

Note that a layer may be extracted by a terminal device. For example, the personal computer 1004 may decode the transmitted scalable coded data (BL+EL) 1011, and display an image of a base layer or an image of an enhancement layer. Alternatively, for example, the personal computer 1004 may extract the scalable coded data (BL) 1012 of the base layer from the transmitted scalable coded data (BL+EL) 1011, store the extracted scalable coded data (BL) 1012, transfer the extracted scalable coded data (BL) 1012 to another device, or decode the extracted scalable coded data (BL) 1012 to display an image of the base layer.

As a matter of course, the number of scalable coded data storage units 1001, the number of distribution servers 1002, the number of networks 1003, and the number of terminal devices may be arbitrary. In addition, while a description has been given of an example in which the distribution server 1002 transmits data to a terminal device, examples of use are not limited thereto. The data transmission system 1000 may be used in any system that selects and transmits an appropriate layer, when transmitting encoded data which has been scalably coded to a terminal device, in accordance with the capabilities of the terminal device, the communication environment, and the like.

In addition, the present technology can also be applied to the data transmission system 1000 illustrated in FIG. 32 as described above in a manner similar to application to the hierarchical encoding and hierarchical decoding described above with reference to FIG. 24 to FIG. 26, thereby achieving advantages similar to the advantages described above with reference to FIG. 24 to FIG. 26.

[Second System]

Figure 33:
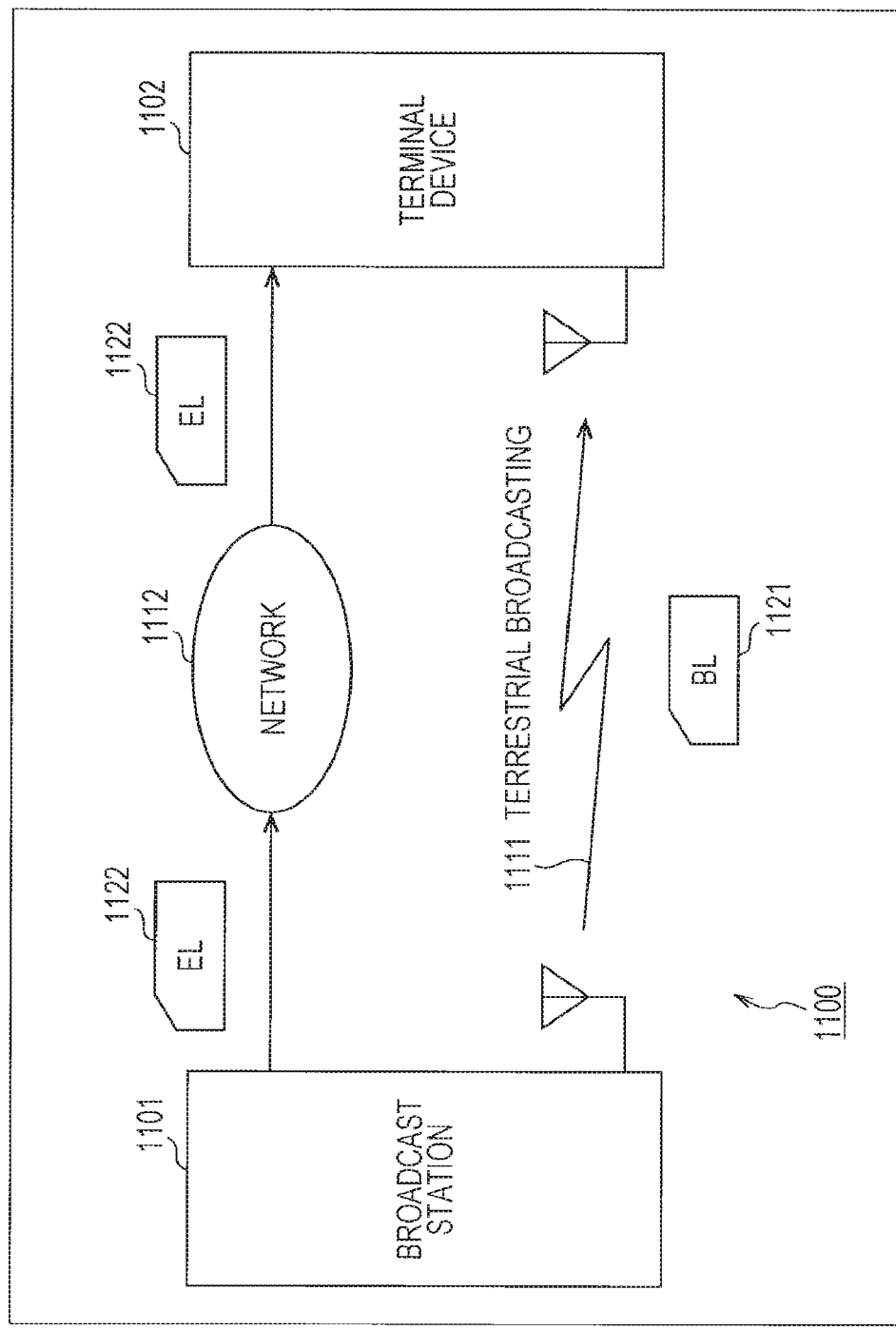
FIG. 33 is a block diagram illustrating another example of the use of scalable coding.

Scalable coding is also used for, for example, as in an example illustrated in FIG. 33, transmission via a plurality of communication media.

In a data transmission system 1100 illustrated in FIG. 33, a broadcast station 1101 transmits scalable coded data (BL) 1121 of a base layer via terrestrial broadcasting 1111.

The broadcast station 1101 further transmits (e.g. packetizes and transmits) scalable coded data (EL) 1122 of an enhancement layer via a desired network 1112 formed of a communication network which can be wired, wireless, or both.

A terminal device 1102 has a function for receiving the terrestrial broadcasting 1111 from the broadcast station 1101, and receives the scalable coded data (BL) 1121 of the base layer transmitted via the terrestrial broadcasting 1111. The terminal device 1102 further has a communication function for performing communication via the network 1112, and receives the scalable coded data (EL) 1122 of the enhancement layer transmitted via the network 1112.

The terminal device 1102 decodes the scalable coded data (BL) 1121 of the base layer acquired via the terrestrial broadcasting 1111 in accordance with, for example, a user instruction or the like to obtain an image of the base layer, stores the scalable coded data (BL) 1121, or transfers the scalable coded data (BL) 1121 to another device.

Further, the terminal device 1102 combines the scalable coded data (BL) 1121 of the base layer acquired via the terrestrial broadcasting 1111 with the scalable coded data (EL) 1122 of the enhancement layer acquired via the network 1112 in accordance with, for example, a user instruction or the like to obtain scalable coded data (BL+EL), and decodes the scalable coded data (BL+EL) to obtain an image of the enhancement layer, stores the scalable coded data (BL+EL), or transfers the scalable coded data (BL+EL) to another device.

As described above, scalable coded data can be transmitted via, for example, a communication medium that is different from one layer to another. Thus, the load can be distributed, and delay or overflow can be suppressed from occurring.

Further, a communication medium to be used for transmission may be made selectable for each layer in accordance with the situation. For example, the scalable coded data (BL) 1121 of the base layer having a relatively large amount of data may be transmitted via a communication medium having a large bandwidth, and the scalable coded data (EL) 1122 of the enhancement layer having a relatively small amount of data may be transmitted via a communication medium having a narrow bandwidth. Alternatively, for example, the communication medium via which the scalable coded data (EL) 1122 of the enhancement layer is to be transmitted may be switched between the network 1112 and the terrestrial broadcasting 1111 in accordance with the available bandwidth of the network 1112. As a matter of course, the above similarly applies to data of an arbitrary layer.

Control in the manner described above can further suppress an increase in the load of data transmission.

As a matter of course, the number of layers is arbitrary, and the number of communication media to be used for transmission is also arbitrary. In addition, the number of terminal devices 1102 to which data is to be distributed is also arbitrary. In addition, while a description has been given in the context of broadcasting from the broadcast station 1101 by way of example, examples of use are not limited thereto. The data transmission system 1100 may be applied to any system that divides encoded data which has been subjected to scalable coding into a plurality of segments in units of layers and that transmits the data segments via a plurality of lines.

Furthermore, the present technology can also be applied to the data transmission system 1100 illustrated in FIG. 33 as described above in a manner similar to application to the hierarchical encoding and hierarchical decoding described above with reference to FIG. 24 to FIG. 26, thereby achieving advantages similar to the advantages described above with reference to FIG. 24 to FIG. 26.

[Third System]

Figure 34:
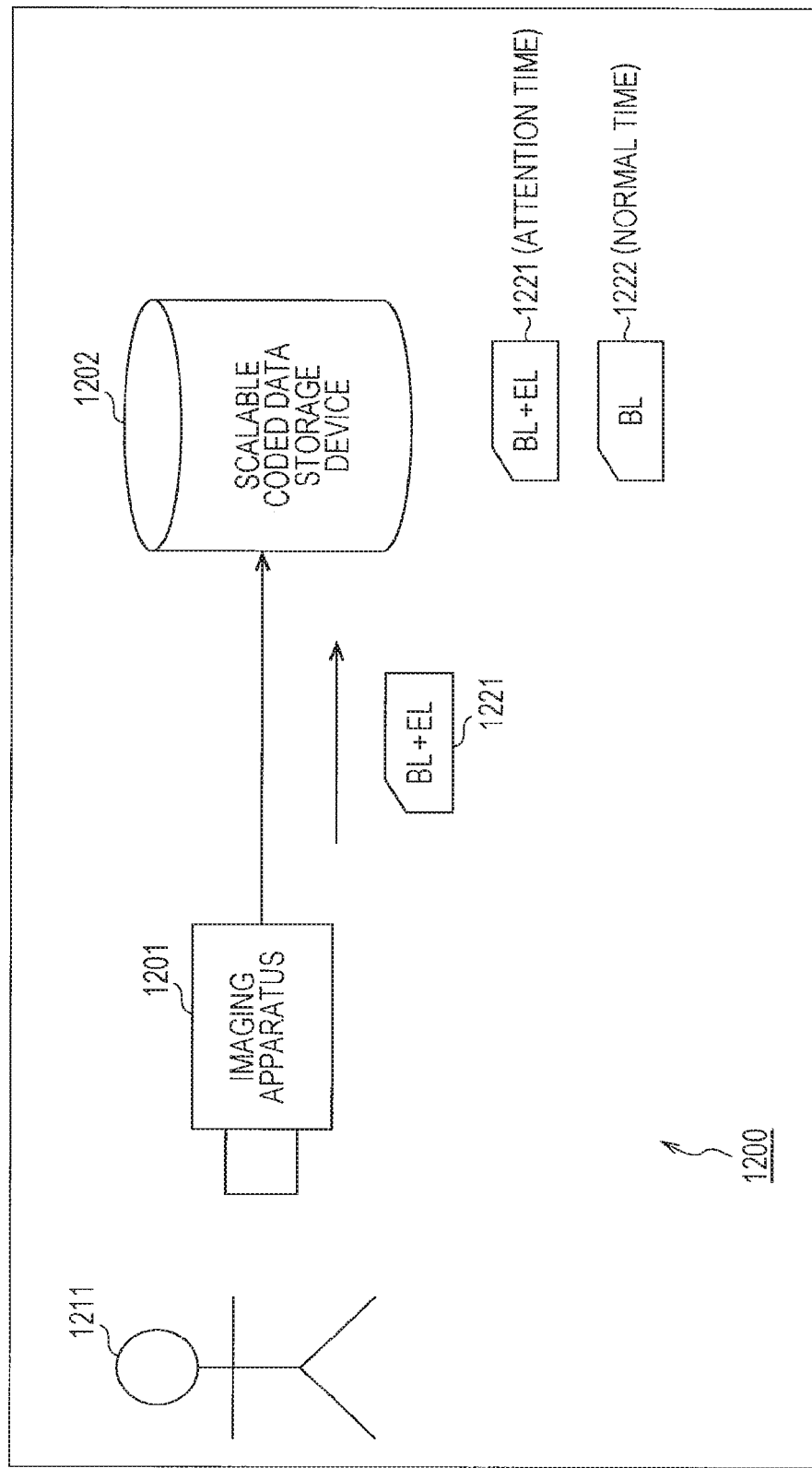
FIG. 34 is a block diagram illustrating still another example of the use of scalable coding.

Scalable coding is also used for, for example, as in an example illustrated in FIG. 34, the storage of encoded data.

In an imaging system 1200 illustrated in FIG. 34, an imaging apparatus 1201 performs scalable coding on image data obtained by capturing an image of an object 1211, and supplies the resulting data to a scalable coded data storage device 1202 as scalable coded data (BL+EL) 1221.

The scalable coded data storage device 1202 stores the scalable coded data (BL+EL) 1221 supplied from the imaging apparatus 1201 at the quality corresponding to the situation. For example, in normal time, the scalable coded data storage device 1202 extracts data of a base layer from the scalable coded data (BL+EL) 1221, and stores the extracted data of the base layer as scalable coded data (BL) 1222 of the base layer having a low quality and a small amount of data. In contrast, for example, in attention time, the scalable coded data storage device 1202 stores the scalable coded data (BL+EL) 1221 having a high quality and a large amount of data, as it is.

Accordingly, the scalable coded data storage device 1202 can save an image at high quality only when necessary. This can suppress an increase in the amount of data while suppressing a reduction in the worth of the image due to a reduction in quality, and can improve use efficiency of the storage area.

For example, it is assumed that the imaging apparatus 1201 is a security camera. If an object to be monitored (e.g., intruder) does not appear in a captured image (normal time), it may be probable that the captured image does not have important content. Thus, a reduction in the amount of data is prioritized, and the image data (scalable coded data) of the image is stored at low quality. In contrast, if an object to be monitored appears as the object 1211 in a captured image (attention time), it may be probable that the captured image has important content. Thus, image quality is prioritized, and the image data (scalable coded data) of the image is stored at high quality.

Note that either the normal time or the attention time may be determined by, for example, the scalable coded data storage device 1202 by analyzing an image. Alternatively, the imaging apparatus 1201 may determine the normal time or the attention time, and may transmit the determination result to the scalable coded data storage device 1202.

Note that the determination of either the normal time or the attention time may be based on an arbitrary standard, and an image on which the determination is based may have any content. As a matter of course, conditions other than the content of an image may be used as the determination standard. The state may be changed in accordance with, for example, the magnitude, waveform, or the like of recorded audio, or may be changed at intervals of a predetermined period of time. Alternatively, the state may be changed in accordance with an external instruction such as a user instruction.

In addition, while a description has been given of an example of changing between two states, namely, normal time and attention time, the number of states is arbitrary, and the state change may be made between more than two states, such as normal time, less attention time, attention time, and highly attention time. Note that the upper limit number of states to be changed depends on the number of layers of scalable coded data.

Furthermore, the imaging apparatus 1201 may be configured to determine the number of layers of scalable coding in accordance with the state. For example, in normal time, the imaging apparatus 1201 may generate scalable coded data (BL) 1222 of the base layer having a low quality and a small amount of data, and supply the generated scalable coded data (BL) 1222 to the scalable coded data storage device 1202. Further, for example, in attention time, the imaging apparatus 1201 may generate scalable coded data (BL+EL) 1221 of the base layer having a high quality and a large amount of data, and supply the generated scalable coded data (BL+EL) 1221 to the scalable coded data storage device 1202.

While a security camera has been described as an example, the imaging system 1200 may be used in any application, and the application is not limited to a security camera.

In addition, the present technology can also be applied to the imaging system 1200 illustrated in FIG. 34 as described above in a manner similar to application to the hierarchical encoding and hierarchical decoding described above with reference to FIG. 24 to FIG. 26, thereby achieving advantages similar to the advantages described above with reference to FIG. 24 to FIG. 26.

Note that an example in which various pieces of information such as the parameters of the adaptive offset filter are multiplexed in an encoded stream and are transmitted from the encoder side to the decoder side has been described herein. However, the technique for transmitting such pieces of information is not limited to this example. For example, these pieces of information may be transmitted or recorded as separate data associated with the encoded bit stream without being multiplexed into the encoded bit stream. The term "associate", as used herein, means allowing an image (which may be part of an image, such as a slice or block) included in a bit stream to be linked to information corresponding to the image when the image is decoded. That is, the information may be transmitted on a transmission path different from that for the image (or bit stream). Further, the information may be recorded on a recording medium different from that for the image (or bit stream) (or recorded in a different recording area of the same recording medium). Furthermore, the information and the image (or bit stream) may be associated with each other in arbitrary units such as a plurality of frames, one frame, or a portion in a frame.

While preferred embodiments of the present disclosure have been described in detail with reference to the accompanying drawings, the present disclosure is not limited to such examples. It is apparent that any person having ordinary knowledge in the field of art to which the present disclosure pertains could achieve various changes or modifications within the scope of the technical idea as defined in the CLAIMS, and it is to be understood that such changes or modifications may also fall within the technical scope of the present disclosure.

Note that the present technology may also provide following configurations.

(1) An image processing device including:
an acquisition unit that acquires parameters of an adaptive offset filter in units of a largest coding unit from an encoded stream in which the parameters of the adaptive offset filter are set using the largest coding unit as a unit of transmission;
a decoding unit that performs a decoding process on the encoded stream and that generates an image; and
an adaptive offset filter unit that performs adaptive offset filtering on the image generated by the decoding unit, in units of a largest coding unit using the parameters acquired by the acquisition unit.

(2) The image processing device according to (1) above, wherein
the parameters of the adaptive offset filter include a type of the adaptive offset filter and an offset value.

(3) The image processing device according to (1) or (2) above, further comprising
a deblocking filter unit that performs deblocking filtering on the image generated by the decoding unit,
wherein the adaptive offset filter unit performs adaptive offset filtering on an image on which the deblocking filter unit has performed deblocking filtering.

(4) The image processing device according to any of (1) through (3) above, wherein
the acquisition unit acquires, from the encoded stream, identification data identifying a parameter of a previous largest coding unit on which adaptive offset filtering has been performed before a current largest coding unit as being the same as a parameter of the current largest coding unit, and
the adaptive offset filter unit performs adaptive offset filtering on the image generated by the decoding unit, in units of a largest coding unit using the identification data acquired by the acquisition unit.

(5) The image processing device according to any of (1) through (3) above, wherein
the acquisition unit acquires, from the encoded stream, identification data identifying whether or not to use a parameter of a previous largest coding unit on which adaptive offset filtering has been performed before a current largest coding unit, and
the adaptive offset filter unit performs adaptive offset filtering on the image generated by the decoding unit, in units of a largest coding unit using the identification data acquired by the acquisition unit.

(6) The image processing device according to any of (1) through (3) above, wherein
the acquisition unit acquires, from the encoded stream, identification data identifying whether or not to use a copy of a parameter of a previous largest coding unit on which adaptive offset filtering has been performed before a current largest coding unit, and
the adaptive offset filter unit performs adaptive offset filtering on the image generated by the decoding unit, in units of a largest coding unit using the identification data acquired by the acquisition unit.

(7) The image processing device according to any of (1) through (3) above, wherein
the acquisition unit acquires, from the encoded stream, identification data specifying a largest coding unit that is identical to a current largest coding unit in terms of a parameter, from within previous largest coding units on which adaptive offset filtering has been performed before the current largest coding unit, and
the adaptive offset filter unit performs adaptive offset filtering on the image generated by the decoding unit, in units of a largest coding unit using the identification data acquired by the acquisition unit.

(8) The image processing device according to any of (1) through (7) above, wherein
the parameters of the adaptive offset filter are transmitted at timing of the beginning of a largest coding unit.

(9) The image processing device according to any of (1) through (8) above, wherein
the decoding unit performs a decoding process in units each having a hierarchical structure.

(10) An image processing method including:
acquiring parameters of an adaptive offset filter in units of a largest coding unit from an encoded stream in which the parameters of the adaptive offset filter are set using the largest coding unit as a unit of transmission;
performing a decoding process on the encoded stream to generate an image; and
performing adaptive offset filtering on the generated image in units of a largest coding unit using the acquired parameters,
wherein the image processing method is performed by an image processing device.

(11) An image processing device including:
a setting unit that sets parameters of an adaptive offset filter using a largest coding unit as a unit of transmission;
an adaptive offset filter unit that performs adaptive offset filtering on an image which has been subjected to a local decoding process in a case where an image is encoded, in units of a largest coding unit using the parameters set by the setting unit;
an encoding unit that performs an encoding process on an image on which the adaptive offset filter unit has performed adaptive offset filtering, and that generates an encoded stream using the image; and
a transmission unit that transmits the parameters set by the setting unit and the encoded stream generated by the encoding unit.

(12) The image processing device according to (11) above, wherein
the parameters of the adaptive offset filter include a type of the adaptive offset filter and an offset value.

(13) The image processing device according to (11) or (12) above, further including
a deblocking filter unit that performs deblocking filtering on a locally decoded image,
wherein the adaptive offset filter unit performs adaptive offset filtering on an image on which the deblocking filter unit has performed deblocking filtering.

(14) The image processing device according to any of (11) through (13) above, wherein
the setting unit sets identification data identifying a parameter of a previous largest coding unit on which adaptive offset filtering has been performed before a current largest coding unit as being the same as a parameter of the current largest coding unit, and the transmission unit transmits the identification data set by the setting unit and the encoded stream generated by the encoding unit.

(15) The image processing device according to any of (11) through (13) above, wherein the setting unit sets identification data identifying whether or not to use a parameter of a previous largest coding unit on which adaptive offset filtering has been performed before a current largest coding unit, and the transmission unit transmits the identification data set by the setting unit and the encoded stream generated by the encoding unit.

(16) The image processing device according to any of (11) through (13) above, wherein the setting unit sets identification data identifying whether or not to use a copy of a parameter of a previous largest coding unit on which adaptive offset filtering has been performed before a current largest coding unit, and the transmission unit transmits the identification data set by the setting unit and the encoded stream generated by the encoding unit.

(17) The image processing device according to any of (11) through (13) above, wherein the setting unit sets identification data specifying a largest coding unit that is identical to a current largest coding unit in terms of a parameter, from within previous largest coding units on which adaptive offset filtering has been performed before the current largest coding unit, and the transmission unit transmits the identification data set by the setting unit and the encoded stream generated by the encoding unit.

(18) The image processing device according to any of (11) through (17) above, wherein the transmission unit transmits the parameters of the adaptive offset filter set by the setting unit at timing of the beginning of a largest coding unit.

(19) The image processing device according to any of (11) through (18) above, wherein the encoding unit: performs an encoding process in units each having a hierarchical structure.

(20) An image processing method including:

setting parameters of an adaptive offset filter using a largest coding unit as a unit of transmission;

performing adaptive offset filtering on an image which has been subjected to a local decoding process in a case where an image is encoded, in units of a largest coding unit using the set parameters;

performing an encoding process on an image on which adaptive offset filtering has been performed, to generate an encoded stream using the image; and transmitting the set parameters and the generated encoded stream, wherein the image processing method is performed by an image processing device.

REFERENCE SIGNS LIST

11 image encoding device, 26 lossless encoding unit, 31 deblocking filter, 41 adaptive offset filter, 42 adaptive loop filter, 51 image decoding device, 62 lossless decoding unit, 66 deblocking filter, 81 adaptive offset filter, 82 adaptive loop filter, 211 type and offset determination unit, 212 offset processing unit, 213 image buffer, 214 coefficient reading unit, 215 offset buffer, 215-1 EO buffer, 215-2 BO buffer, 216 parameter setting unit, 217/coefficient writing unit, 221 syntax writing unit, 251 syntax reading unit, 261 parameter receiving unit, 262 coefficient reading unit, 263 offset buffer, 263-1 EO buffer, 263-2 BO buffer, 264 coefficient writing unit, 265 offset processing unit, 266 image buffer

The invention claimed is:

1. An image processing device comprising:
a memory; and
a processor coupled to the memory and configured to:
set filtering parameters of an adaptive offset filter for each largest coding unit (LCU) at a beginning of the corresponding LCU,
perform adaptive offset filtering on portions of an image that correspond to each LCU, the image having been subjected to a local decoding process, in a case where the image is encoded in units of LCU by using the set filtering parameters of the adaptive offset filter, the processor performing adaptive offset filtering being further configured to
determine whether there is a matching offset stored in an offset buffer, a buffer type being an edge offset buffer or a band offset buffer based on the type of adaptive offset filter,
perform a coefficient writing process in response to a determination that there is no matching offset stored in the offset buffer, wherein the processor for performing the coefficient writing process is further configured to
determine whether a type index is edge offset or band offset, and
select the determined buffer,
perform an encoding process on the image on which the adaptive offset filtering has been performed to generate an encoded stream, the encoded stream being arranged into LCU using the image, wherein the adaptive offset parameters are written to a header portion of the encoded stream in units of the LCU, and
transmit the parameters of the adaptive offset filter applicable to each LCU, wherein the parameters of the adaptive offset filter are transmitted sequentially at the beginning of each corresponding LCU starting from a position that is closest to the beginning of a buffer among available positions.

2. The image processing device according to claim 1, wherein the processor is further configured to
determine filtering parameters for a current largest coding unit that indicate the type of adaptive filter offset and an offset value.

3. The image processing device according to claim 1, where the processor is further configured to
perform deblocking filtering on a decoded image to generate the image, wherein the adaptive offset filtering is performed on the image on which the deblocking filtering has been performed.

4. The image processing device according to claim 1, wherein the processor is further configured to
set filtering parameters for a current largest coding unit that identify a parameter of a previously processed largest coding unit and that indicate using the identified parameter of the previously processed largest coding unit as a corresponding parameter of the largest coding unit.

5. The image processing device according to claim 1, wherein the processor is further configured to
set filtering parameters for a current largest coding unit that indicate whether to use a parameter of a previously processed largest coding unit as a corresponding parameter of the current largest coding unit.

6. The image processing device according to claim 1, wherein the processor is further configured to
set filtering parameters for a current largest coding unit that indicate whether to use a copy of filtering settings for a previously processed largest coding unit stored in a buffer as filtering settings for the current largest coding unit.

7. The image processing device according to claim 1, wherein the processor is further configured to
set filtering parameters for a current largest coding unit that specify a previously processed largest coding unit and that indicate using filtering settings for the previously processed largest coding unit as filtering settings for the current largest coding unit.

8. The image processing device according to claim 1, wherein the processor is further configured to
perform an encoding process in units that correspond to a hierarchical nature.

9. An image processing method, comprising:
setting filtering parameters of an adaptive offset filter for each largest coding unit (LCU) at a beginning of the corresponding LCU;
performing adaptive offset filtering on portions of an image that correspond to each LCU, the image having been subjected to a local decoding process, in a case where the image is encoded in units of LCU by using the set filtering parameters of the adaptive offset filter, wherein performing adaptive offset filtering includes
determining whether there is a matching offset stored in an offset buffer, a buffer type being an edge offset buffer or a band offset buffer based on the type of adaptive offset filter;
performing a coefficient writing process in response to a determination that there is no matching offset stored in the offset buffer, wherein performing the coefficient writing process includes
determining whether a type index is edge offset or band offset; and
selecting the determined buffer;
performing an encoding process on the image on which the adaptive offset filtering has been performed to generate an encoded stream, the encoded stream being arranged into LCU using the image, wherein the adaptive offset parameters are written to a header portion of the encoded stream in units of the LCU; and
transmitting the parameters of the adaptive offset filter applicable to each LCU, wherein the parameters of the adaptive offset filter are transmitted sequentially at the beginning of each corresponding LCU starting from a position that is closest to the beginning of a buffer among available positions.

10. The method of claim 9, further comprising:
determining filtering parameters for a current largest coding unit that indicate the type of adaptive filter offset and an offset value.

11. The method of claim 9, further comprising:
performing deblocking filtering on a decoded image to generate the image, wherein the adaptive offset filtering is performed on the image on which the deblocking filtering has been performed.

12. The method of claim 9, further comprising:
setting filtering parameters for a current largest coding unit that identify a parameter of a previously processed largest coding unit and that indicate using the identified parameter of the previously processed largest coding unit as a corresponding parameter of the largest coding unit.

13. The method of claim 9, further comprising:
setting filtering parameters for a current largest coding unit that indicate whether to use a parameter of a previously processed largest coding unit as a corresponding parameter of the current largest coding unit.

14. The method of claim 9, further comprising:
setting filtering parameters for a current largest coding unit that indicate whether to use a copy of filtering settings for a previously processed largest coding unit stored in a buffer as filtering settings for the current largest coding unit.

15. The method of claim 9, further comprising:
setting filtering parameters for a current largest coding unit that specify a previously processed largest coding unit and that indicate using filtering settings for the previously processed largest coding unit as filtering settings for the current largest coding unit.

16. The method of claim 9, further comprising:
performing an encoding process in units that correspond to a hierarchical nature.

17. A non-transitory computer-readable storage medium storing computer-readable instructions thereon which, when executed by a computer, cause the computer to perform a method, the method comprising:
setting filtering parameters of an adaptive offset filter for each largest coding unit (LCU) at a beginning of the corresponding LCU;
performing adaptive offset filtering on portions of an image that correspond to each LCU, the image having been subjected to a local decoding process, in a case where the image is encoded in units of LCU by using the set filtering parameters of the adaptive offset filter, wherein performing adaptive offset filtering includes
determining whether there is a matching offset stored in an offset buffer, a buffer type being an edge offset buffer or a band offset buffer based on the type of adaptive offset filter;
performing a coefficient writing process in response to a determination that there is no matching offset stored in the offset buffer, wherein performing the coefficient writing process includes
determining whether a type index is edge offset or band offset; and
selecting the determined buffer;
performing an encoding process on the image on which the adaptive offset filtering has been performed to generate an encoded stream, the encoded stream being arranged into LCU using the image, wherein the adaptive offset parameters are written to a header portion of the encoded stream in units of the LCU; and
transmitting the parameters of the adaptive offset filter applicable to each LCU, wherein the parameters of the adaptive offset filter are transmitted sequentially at the beginning of each corresponding LCU starting from a position that is closest to the beginning of a buffer among available positions.

18. The non-transitory computer-readable storage medium of claim 17, further comprising:
determining filtering parameters for a current largest coding unit that indicate the type of adaptive filter offset and an offset value.

* * * * *